United States Patent [19]
Altschuler et al.

[11] Patent Number: 6,154,767
[45] Date of Patent: Nov. 28, 2000

[54] METHODS AND APPARATUS FOR USING ATTRIBUTE TRANSITION PROBABILITY MODELS FOR PRE-FETCHING RESOURCES

[75] Inventors: Steven J. Altschuler, Redmond; Greg Ridgeway, Bellevue, both of Wash.

[73] Assignee: Microsoft Corporation, Redmond, Wash.

[21] Appl. No.: 09/007,898

[22] Filed: Jan. 15, 1998

[51] Int. Cl.[7] .................................................. G06F 13/00
[52] U.S. Cl. ......................... 709/203; 709/216; 709/217; 709/218; 707/501; 711/137
[58] Field of Search ........................... 711/137; 707/501; 709/223, 217, 218, 219, 203, 213, 216; 706/21

[56] References Cited

U.S. PATENT DOCUMENTS

| | | | |
|---|---|---|---|
| 5,727,129 | 3/1998 | Barrett et al. | 709/217 |
| 5,802,292 | 9/1998 | Mogul | 709/203 |
| 5,832,231 | 11/1998 | Raman et al. | 709/218 |
| 5,878,223 | 3/1999 | Becker et al. | 709/223 |
| 5,881,231 | 3/1999 | Takagi et al. | 709/217 |
| 5,961,602 | 10/1999 | Thompson et al. | 709/218 |

OTHER PUBLICATIONS

RFC 2068, HTTP/1.1. [Online] http://www.ietf.org/rfc/rfc2068.txt, Jan. 1997.

Markatos et al., "A Top–10 Approach to Prefetching on the Web." [Online] http://www.ics.forth.gr/proj/arch–vlsi/OS/www.html, Aug. 1996.

Bestavros, A. "Speculative Data Dissemination and Service" Proc of ICDE'96, New Orleans, Louisiana. Mar. 1996. [Online] http://www.cs.bu.edu/faculty/best/res/papers/icde96.ps.

Touch et al. "An Experiment in Latency Reduction" IEEE Infocom, Toronto, Jun. 1994, pp. 175–181 [Online] ftp://ftp.isi.edu/pub/hpcc–papers/touch/infocom94.ps.Z.

U.S. application No. 09/007,900, Altschuler et al., filed Jan. 15, 1998.

U.S. application No. 09/007,901, Altschuler et al., filed Jan. 15, 1998.

U.S. application No. 09/007,902, Altschuler et al., filed Jan. 15, 1998.

*Primary Examiner*—Eddie P. Chan
*Assistant Examiner*—Yamir Encarnacion
*Attorney, Agent, or Firm*—Michaelson & Wallace; Peter L. Michaelson

[57] ABSTRACT

Building resource (e.g., Internet content) and attribute transition probability models and using such models for pre-fetching resources, editing resource link topology, building resource link topology templates, and collaborative filtering.

53 Claims, 35 Drawing Sheets

| USER ID (144) | RESOURCE ID (146) | SESSION ID (148) |
|---|---|---|
| 1 | A | 1 |
| 1 | B | 1 |
| 1 | C | 1 |
| 1 | B | 2 |
| 1 | C | 2 |
| 2 | A | 1 |
| 2 | D | 1 |
| . | . | . |
| . | . | . |
| . | . | . |

142'

300

| RESOURCE i (164) | RESOURCE j (166) | TRANSITION PROBABILITY (168) |
|---|---|---|
| A | B | 0.5 |
| A | C | 0.5 |
| A | D | 0.5 |
| B | C | 1.0 |
| . | . | . |
| . | . | . |
| . | . | . |

162'

| RESOURCE i | RESOURCE j | TRANSITION PROBABILITY |
|:---:|:---:|:---:|
| A | C | 1.0 |
| B | C | 1.0 |
| C | D | 0.5 |
| C | E | 0.5 |
| A | D | 1.0 |
| B | E | 1.0 |

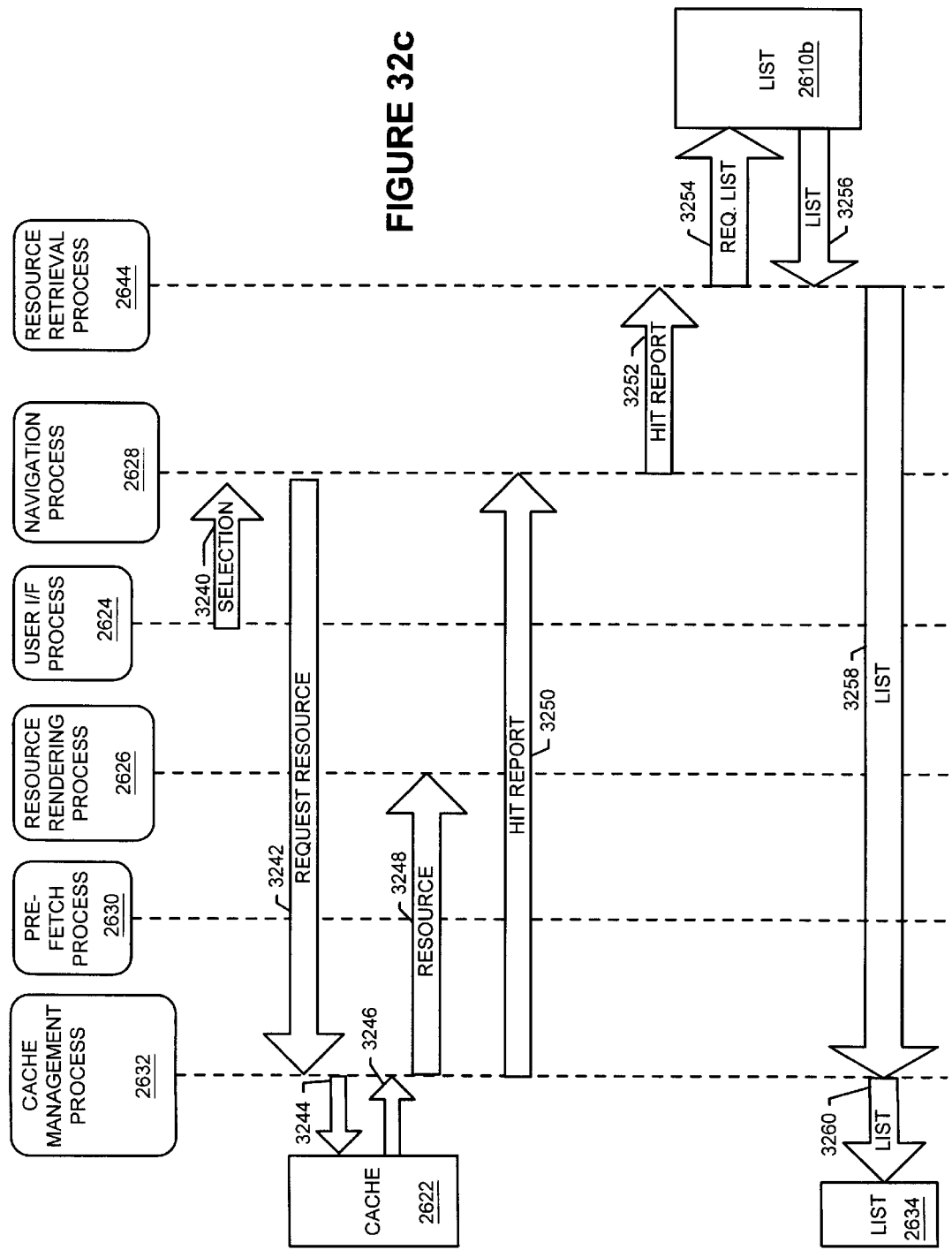

FIGURE 34a

| ATTRIBUTE i | ATTRIBUTE j | TRANSITION PROBABILITY i -> j |
|---|---|---|
| NEWS | SPORTS | 0.50 |
| NEWS | FINANCIAL | 0.15 |
| NEWS | WEATHER | 0.05 |
| NEWS | FASHION | 0.03 |
| NEWS | ART | 0.01 |

| ATTRIBUTE TYPE | RESOURCE NAME/LOCATION |
|---|---|
| FOREIGN POLICY | URL 1 |
| CULTURAL EVENTS | URL 2 |
| ART | URL 3 |
| ART | URL 4 |
| ART | URL 5 |
| FINANCIAL | URL 6 |

3450

METHODS AND APPARATUS FOR USING ATTRIBUTE TRANSITION PROBABILITY MODELS FOR PRE-FETCHING RESOURCES

BACKGROUND OF THE INVENTION a. Field of the Invention

The present invention concerns building resource (such as Internet content for example) and attribute transition probability models and using such models to predict future resource and attribute transitions. The present invention also concerns the use of such resource and attribute transition probability models for pre-fetching resources, for editing a resource link topology, for building resource link topology templates, and for suggesting resources based on resource transitions by others (or "collaborative filtering"). In particular, the present invention may be used in an environment in which a client, which may be linked via a network (such as the Internet for example) with a server, accesses resources from the server.

b. Related Art

In recent decades, and in the past five to ten years in particular, computers have become interconnected by networks by an ever increasing extent; initially, via local area networks (or "LANs"), and more recently via LANs, wide area networks (or "WANs") and the Internet. The proliferation of networks, in conjunction with the increased availability of inexpensive data storage means, has afforded computer users unprecedented access to a wealth of data. Such data may be presented to a user (or "rendered") in the form of text, images, audio, video, etc.

The Internet is one means of inter-networking local area networks and individual computers. The popularity of the Internet has exploded in recent years. Many feel that this explosive growth was fueled by the ability to link (e.g., via Hyper-text links) resources (e.g., World Wide Web pages) so that users could seamlessly transition from various resources, even when such resources were stored at geographically remote resource servers. More specifically, Hyper-text markup language (or "HTML") permits documents to include hyper-text links. These hyper-text links, which are typically rendered in a text file as text in a different font or color, include network address information to related resources. More specifically, the hyper-text link has an associated uniform resource locator (or "URL") which is an Internet address at which the linked resource is located. When a user activates a hyper-text link, for example by clicking a mouse when a displayed cursor coincides with the text associated with the hyper-text link, the related resource is accessed, downloaded, and rendered to the user. The related resource may be accessed by the same resource server that provided a previously rendered resource, or may be accessed by a geographically remote resource server. Such transiting from resource to resource, by activating hyper-text links for example, is commonly referred to as "surfing" (or "Internet surfing" or "World Wide Web surfing".)

As stated above, resources may take on many forms such as HTML pages, text, graphics, images, audio and video. Unfortunately, however, certain resources, such as video information for example, require a relatively large amount of data to be rendered by a machine. Compression algorithms, such as MPEG (Motion Pictures Expert Group) encoding have reduced the amount of data needed to render video. However, certain limitations remain which limit the speed with which resources can be the communicated and rendered. For example, limitations in storage access time, limits the speed with which a server can access a requested resource. Bandwidth limitations of communications paths between an end user (client) and the resource server limits the speed at which the resource can be communicated (or downloaded) to the client. In many cases, a client accesses the Internet via an Internet service provider (or "ISP"). The communications path between the client and its Internet service provider, a twisted copper wire pair telephone line, is typically the limiting factor as far as communication bandwidth limitations. Limitations in communications protocols used at input/output interfaces at the client may also limit the speed at which the resource can be communicated to the client. Finally, limitations in the processing speed of the processor(s) of the client may limit the speed with which the resource is rendered on an output peripheral, such as a video display monitor or a speaker for example.

The limitations in processing speed, storage access, and communications protocols used at input/output interfaces are, as a practical matter, insignificant for the communication and rendering of most type of data, particularly due to technical advances and a relatively low cost of replacing older technology. However, the bandwidth limitations of the physical communications paths, particularly between an end user (client) and its Internet service provider, represent the main obstacle to communicating and rendering data intensive information. Although technology (e.g., coaxial cable, optical fiber, etc.) exists for permitting high bandwidth communication, the cost of deploying such high bandwidth communications paths to each and every client in a geographically diverse network is enormous.

Since limitations in the bandwidth of communications paths are unlikely to be solved in the near future, methods and apparatus are needed to overcome the problems caused by this bottleneck so that desired resources may be quickly rendered at a client location. Even if the bandwidth of communications paths are upgraded such that even real time communication of video data is possible, historically, the appetite for resource data has often approached, and indeed exceeded, the then existing means of communicating and rendering it. Thus, methods and apparatus are needed, and are likely to be needed in the future, to permit desired resources to be quickly rendered at a client location.

The concept of caching has been employed to overcome bottlenecks in accessing data. For example, in the context of a computer system in which a processor must access stored data or program instructions, cache memory has been used. A cache memory device is a small, fast memory which should contain most frequently accessed data (or "words") from a larger, slower memory. Disk drive based memory affords large amounts of storage capacity at a relatively low cost. Data and program instructions needed by the processor are often stored on disk drive based memory even though access to disk drive memory is slow relative to the processing speed of modern microprocessors. A cost effective, prior art solution to this problem provided a cache memory between the processor and the disk memory system. The operating principle of the disk cache memory is the same as that of a central processing unit (or CPU) cache. More specifically, a first time an instruction or data location is addressed, it must be accessed from the lower speed disk memory. During this initial access, the instruction or data is also stored in cache memory. Subsequent accesses to the same instruction or data are done via the faster cache memory, thereby minimizing access time and enhancing overall system performance. However, since storage capacity of the cache is limited, and typically is much smaller than the storage capacity of the disk storage, the cache often becomes filled and some of its contents must be changed (e.g., with a replacement or flushing algorithm) as new instructions or data are accessed from the disk storage. The cache is managed, in various ways, in an attempt to have it store the instruction or data most likely to be needed at a given time. When the cache is accessed and contains requested data, a cache "hit" occurs. Otherwise, if the cache does not contain the requested data, a cache "miss" occurs. Thus, the data stored in the cache are typically managed in an attempt to maximize the cache hit-to-miss ratio.

In the context of a problem addressed by the present invention, some client computers are provided with cache memory for storing previously accessed and rendered resources on the premise that a user will likely want to render such resources again. Since, as discussed above, resources may require a relatively large amount of data and since cache memory is limited, such resource caches are typically managed in accordance with simple "least recently used" (or "LRU") management algorithm. More specifically, resources retrieved and/or rendered by a client are time stamped. As the resource cache fills, the oldest resources are discarded to make room for more recently retrieved and/or rendered resources.

Although client resource caches managed in accordance with the least recently used algorithm permit cached resources to be accessed quickly, such an approach is reactive; it caches only resources already requested and accessed. Further, this known caching method is only useful to the extent that the premise that rendered resources will likely be rendered again holds true.

In view of the foregoing, methods and systems for quickly rendering desired resources are needed. For example, the present inventors have recognized that methods and systems are needed for predicting which resource will be requested. Moreover, the present inventors have recognized that methods and systems are needed for prefetching the predicted resource, for example, during idle transmission and/or processing times.

Limited bandwidth and the limitations of the least recently used caching method are not the only present roadblocks to a truly rich Internet experience. As discussed above, hyper-text links have been used to permit Internet users to quickly navigate through resources. However, human factor and aesthetic considerations place a practical limit on the number of hyper-text links on a given HTML page. In the past, defining the topology of an Internet site by placement of hyper-text links was done based on intuition of a human Internet site designer; often with less than desirable results. Thus, a tool for editing and designing the topology of a resource server site, such as an Internet site for example, is needed. The present inventors have recognized that methods and systems are needed to edit link topology based on resource or attribute transition probabilities.

SUMMARY OF THE INVENTION

The present invention provides methods and apparatus for building resource and attribute transition probability models, and methods and apparatus for using such models, to pre-fetch resources, edit resource link topology, and build resource link topology templates. Such models may also be used for collaborative filtering.

More specifically, the present invention includes methods and apparatus to build server-side resource transition probability models. Such models are built based on data from relatively many users (or clients) but a relatively limited number of resources (e.g., resources of a single Internet site). Once built, such models may be used by appropriately configured systems to (a) pre-fetch, and cache at a client or server, resources to better utilize processing, data bus, and communications resources, (b) edit resource transition possibilities (link topology) to optimize the navigation of resources at a server, and/or (c) build resource link topology templates.

The present invention includes methods and apparatus for using resource pre-fetching to better utilize processing resources and bandwidth of communications channels. In general, resource pre-fetching by the client utilizes idle bandwidth; resource pre-fetching by the resource server utilizes idle processing and/or data bus resources of the server. Resource pre-fetching may occur at both the client and the server.

Basically, after a client receives a requested resource, bandwidth on a communications path between the client and the server is available, while the resource is being rendered by a resource rendering process or while a user is sensing and/or interpreting the rendered resource. The present invention includes methods and apparatus for exploiting this idle communications bandwidth. More specifically, based on the previously requested resource (or based on previously requested resources), the methods and apparatus of the present invention use a list of transitions to other resources, in descending order of probability, to pre-fetch other resources. Such pre-fetched resources are stored at a client resource cache.

The methods and apparatus of the present invention provide the resource server with a resource cache. During times when the server has available (or idle) processing resources, the server loads resources into its resource cache based on both the resource transition model and the resource (s) most recently requested by a server. Whether or not data bus (e.g., a SCSI bus) resources are available may also be checked. In this way, resources likely to be requested may be made available in faster cache memory.

As discussed above, Internet sites may include resources (such as HTML pages, for example) that include one or more links (such as hyper-text links, for example) to other resources. The present invention includes methods and apparatus for using the server-side resource transition model discussed above to edit such Internet sites so that clients may navigate through server resources more efficiently. For example, if a resource (R1) has a link to another resource (R2) and the transition probability from R1 to R2 is low, that link may be removed. If, on the other hand, the resource R1 does not have a link to the other resource R2 and the transition probability from R1 to R2 is high, a link from resource R1 to resource R2 may be added to resource R1. The present invention includes methods and apparatus for generating templates of the link topology of resources at a site in a similar manner.

The present invention further includes methods and apparatus for building client-side attribute transition models at the client, based on a relatively small number of users (e.g., one) but a relatively large number of resources (e.g., potentially all resources of the Internet). In the above described server-side resource transition probability models, though the number of users was large, this was not a problem because the model was used to model the behavior of an "average" or "typical" user. However, in the client-side attribute transition model discussed below, resources cannot be combined to an "average" or "typical" resource; such a model may used to pre-fetch resources which should therefore be distinguished in some way. However, given an almost infinite number of potential resources available on the Internet, a massive dimension reduction of resources is desired. Such a dimension reduction may be accomplished by classifying resources into one or more categories or "attributes". For example, a resource which describes how to photograph stars may be classified to include attributes of "photography" and "astronomy", or more generally (thereby further reducing dimensions), "hobbies" and "sciences".

The present invention also includes methods and apparatus for using the client-side attribute transition probability model to pre-fetch resources. The client-side attribute transition probability model can be used to predict or suggest a resource which may be of interest to a user based on other, similar, users. Such predictions or suggestions are referred to as "collaborative filtering".

Finally, the present invention includes methods and apparatus for comparing the client-side attribute transition model with such models of other clients in a collaborative filtering process. In this way, resources may be pre-fetched or recommended to a user based on the attribute transition model of the client, as well as other clients. For example, client-side attribute transition models may be transmitted to and "clustered" at a proxy in accordance with the known Gibbs algorithm, the known EM algorithm, a hybrid Gibbs-EM algorithm, or another known or proprietary clustering algorithm.

BRIEF DESCRIPTION OF THE DRAWINGS

FIG. 7b is a process diagram of an alternative client which may be used in the system of FIG. 7a.

FIG. 17 depicts an exemplary data structure for communicating a resource request, which may be used in the exemplary system of FIG. 7a.

FIG. 18 depicts an exemplary data structure for returning a resource or other data, which may be used in the exemplary system of FIG. 7a.

FIG. 19 depicts an exemplary data structure for reporting a client resource cache hit of a pre-fetched resource, which may be used in the exemplary system of FIG. 7a.

FIG. 26b is a process diagram of an alternative client which may be used in the system of FIG. 26a.

FIGS. 32a, 32b and 32c are, collectively, a messaging diagram which illustrates the operation of a pre-fetch process which uses a client-side attribute transition probability model.

FIG. 34a is a partial exemplary attribute transition probability model and

FIG. 34b is a list of attributes of resources, linked with a rendered resource, both of which are used to describe a pre-fetch process of the present invention.

DETAILED DESCRIPTION

§1. SUMMARY OF DETAILED DESCRIPTION

The present invention concerns novel methods and apparatus for building resource and attribute transition probability models, and methods and apparatus for using such models to pre-fetch resources, edit resource link topology, and build resource link topology templates. Such models may also be used for collaborative filtering. The following description is presented to enable one skilled in the art to make and use the invention, and is provided in the context of particular applications and their requirements. Various modifications to the described embodiments will be apparent to those skilled in the art, and the general principles set forth below may be applied to other embodiments and applications. Thus, the present invention is not intended to be limited to the embodiments shown.

In the following, methods and apparatus for building a server-side resource transition probability model are described. Then, methods and apparatus which use a resource transition probability model for pre-fetching and caching resources are described. Next, methods and apparatus which use a resource transition probability model for editing a resource topology (or generating resource link topology templates) are described. Thereafter, methods and apparatus for building a client-side attribute transition probability model are described. Then, methods and apparatus which use an attribute transition probability model to pre-fetch resources are described. Finally, the use of an attribute transition probability model for collaborative filtering is described.

§2. SERVER-SIDE MODEL BUILDING (RESOURCE TRANSITION PROBABILITY MODEL)

In the following, the function, structure, and operation of an exemplary embodiment of a system for building a server-side resource transition probability model will be described.

§2.1 FUNCTION OF SERVER-SIDE RESOURCE TRANSITION PROBABILITY MODEL (model building, pre-fetching, editing)

A purpose of the present invention is to build server-side resource transition probability models. Such models are built based on data from relatively many users (or clients) but a relatively limited number of resources (e.g., resources of a single Internet site). Once built, such models may be used by appropriately configured systems to (a) pre-fetch, and cache at a client or server, resources to better utilize processing, data bus, and communications resources, (b) edit resource transition possibilities (link topology) to optimize the navigation of resources at a server, and/or (c) build resource link topology templates.

§2.2 STRUCTURE OF SERVER-SIDE MODEL BUILDING SYSTEM

Figure 1:
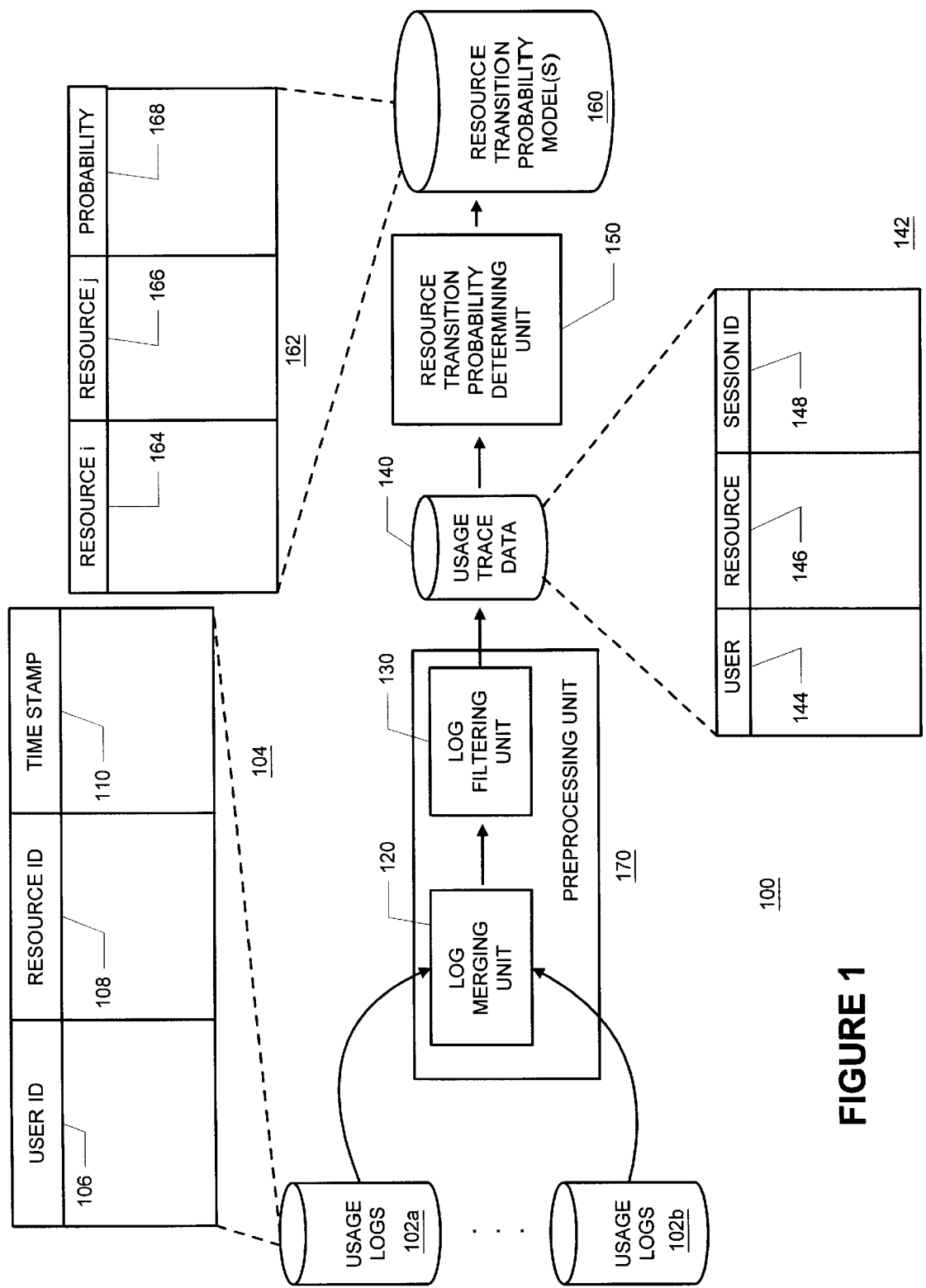
FIG. 1 is a high level diagram which depicts building server-side resource transition probability models in accordance with the present invention.

FIG. 1 is a high level diagram which depicts a system 100 for building resource transition probability models from logged usage data. The system 100 will be described in the context of an Internet site having a number of distributed servers. In this example, a resource may be HTML pages, URL requests, sound bites, JPEG files, MPEG files, software applications (e.g., JAVA™ applets), a graphics interface format (or "GIF") file, etc.

Each of the distributed servers of the Internet site will generate a usage log 102, shown as containing illustrative usage logs 102a, . . . , 102b. Alternatively, a centralized usage log may be compiled based on usage information from the distributed servers. A usage log 102 will include records 104 which include information of a user (or client) ID 106, a resource ID 108 and a time stamp 110. The user ID 106 is a data structure which permits a server to distinguish, though not necessarily identify, different clients. As is known to those familiar with the Internet, this data structure may be a "cookie." A cookie is generated by a server, stored at the client, and includes a name value and may further include an expiration date value, a domain value, and a path value. The resource ID 108 is a data structure which identifies the resource and preferably also identifies a category (e.g., HTML page, JPEG file, MPEG file, sound bit, GIF, etc.) to which the resource belongs. The resource ID 108 may be a URL (i.e., the World Wide Web address at which the resource is located). The time stamp data structure 110 may include a time and date or a time relative to a reference time.

Periodically, subject to a manual request, or subject to certain factors or conditions, the usage logs 102 are provided to a pre-processing unit 170. The pre-processing unit 170 includes a log merging unit 120 and a log filtering unit 130. Basically, the log merging unit functions to combine usage logs from a plurality of distributed servers. The log filtering unit 130 functions to remove resources that are not relevant to transitions. For example, an HTML page may embed, and thus always retrieve, a toolbar GIF file or a particular JPEG file. Thus, a client (or user) does not transition from the HTML page to the GIF file and JEPG file; rather, these files are automatically provided when the client transitions to the HTML page. Accordingly, the log filtering unit 130 may operate to remove records of such "transition irrelevant" resources. In this regard, the log filtering unit may access stored site topology information (not shown). In this way, when resources having related resources are accessed, resources accessed pursuant to site topology rather than user selection may be filtered out of resource transition probability models.

The log filtering unit 130 may also serve to limit the usage log records 104 used to create a resource transition probability model to that of one user or a group of users. The smallest level of granularity in usage prediction is to base an individual's future behavior on his(her) past behavior. Although such data is highly relevant, as a practical matter, it may be difficult to collect sufficient data to accurately predict resource transitions. The next level of granularity is to group "like" (e.g., from the same geographic location, having similar characteristics, etc.) users. Such a grouping provides a moderate amount of moderately relevant data. Finally, all users may be grouped together. This provides a large amount of less relevant data.

The log filtering unit 130 may serve to limit the temporal scope of usage log data used in building a resource transition probability model. More specifically, the data collection time period (or "sample period") is predetermined and will depend on the type of resources and the interrelationship between resources. For example, an Internet site having relatively static content, such as a site with resources related to movie reviews may have a resource transition model which, once created, is updated weekly. This is because in an Internet site having relatively static content, usage data will remain fairly relevant, notwithstanding its age. On the other hand, an Internet site having relatively dynamic content, such as a site with resources related to daily news stories or even financial market information may have a resource transition model which is replaced daily or hourly. This is because in an Internet site having relatively dynamic and changing content, usage data will become irrelevant (or "stale") within a relatively short time.

Finally, the log filtering unit 130 may serve to vary or limit the scope of the resource server "site". For example, in the context of an Internet site, the usage logs 104 may include all resources of the entire site, or be filtered to include only sub-sites such as resources within a virtual root (or "VROOT").

From the usage logs 102, the pre-processing unit 170 produces usage trace data 140. The usage trace data 140 includes records 142. A usage trace data record 142 includes user information 144 (which may correspond to the user ID data 106 of the usage log records 104), resource identification information 146 (which may correspond to the resource ID data 108 of the usage log records 104), and session ID data 148. Though not shown, the usage trace data records 142 may also include a field containing the time stamp 110 information. Such information may be used to analyze pauses in user selections. A session is defined as activity by a user followed by a period of inactivity. Some Internet sites permit relatively large files to be downloaded. Such downloading may take on the order of an hour. Accordingly, in such Internet sites, the period of inactivity may be on the order of an hour. As will be appreciated by those skilled in the art, the period of inactivity will be pre-determined, and may be based on a number of factors, including for example, typical or expected usage patterns of their site. The session ID data 148 identifies a session in which a particular user (or client) may have transitioned through resources.

A resource transition probability determining unit 150 functions to generate resource transition probability model (s) 160 from the usage trace data 140. Basically, the probability determining unit determines the probability that a user which consumed or requested one resource, will consume or request another resource (for example, a resource directly linked with the first resource) in the same session.

Figures 2, 3, 4:
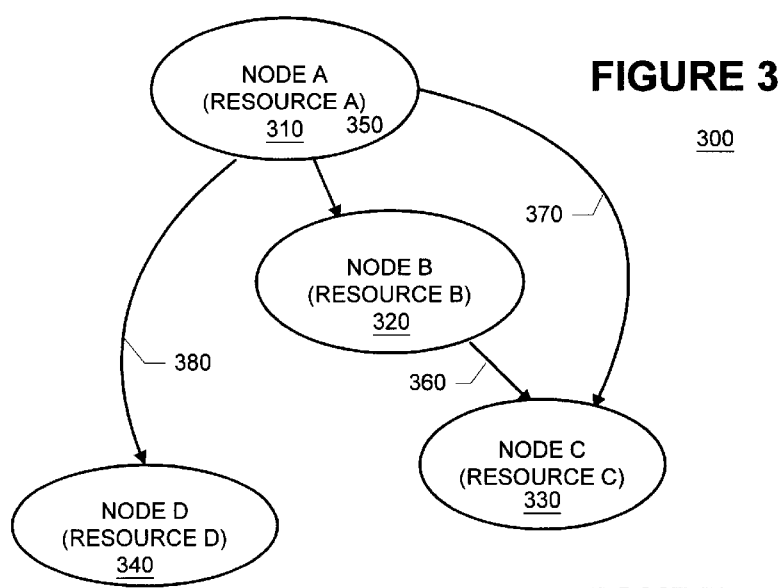
FIG. 2 is an exemplary data structure of usage log records used by the server-side resource transition probability model building process of the present invention.
FIG. 3 is a graph, which illustrates a part of an exemplary server-side resource transition probability model building process, and in which nodes correspond to resources and edges correspond to resource transitions.
FIG. 4 is an exemplary data structure of a resource transition probability table, built by a building process of the present invention based on the usage log records of FIG. 2.

FIGS. 2 through 4 illustrate an exemplary operation of the resource transition probability determining unit 150 on exemplary usage trace data. FIG. 2 is an exemplary data structure of a usage trace data record 142' used by the server-side resource transition model building process of the present invention. This usage trace data indicates that a first user (USER_ID=1) has requested resources A, B, and C, during a first session, the first user then requested resources B and C in a second session, and a second user (USER_ID=2) has requested resources A and D in a first session.

FIG. 3 is a graph 300, which illustrates a part of the exemplary server-side resource transition model building process, and in which nodes correspond to resources and edges correspond to resource transitions. More specifically, the graph 300 includes node A 310 which corresponds to resource A, node B 320 which corresponds to resource B, node C 330 which corresponds to resource C, node D 340 which corresponds to resource D, edge 350 which depicts a transition from resource A to resource B, edge 360 which depicts a transition from resource B to resource C, edge 370 which depicts a transition from resource A to resource C, and edge 380 which depicts a transition from resource A to resource D.

The nodes include a count of a number of times within a sample period that a resource associated with the node has been requested. Thus, referring to both FIGS. 2 and 3, node A 310 would have a value of 2 since user 1 requested resource A in its first session and user 2 requested resource A in its first session, node B would have a value of 2 since user 1 requested resource B in both its first and second sessions, node C would have a value of 2 since user 1 requested resource C in both its first and second sessions, and node D would have a value of 1 since user 2 requested resource D in its first session.

Similarly, the edges include a count of the number of transitions (direct and indirect) between the resources associated with the nodes. Thus, referring to both FIGS. 2 and 3, edge 350 would have a value of 1 because user 1 transitioned from resource A to resource B in its first session, edge 360 would have a value of 2 because user 1 transitioned from resource B to resource C in both its first and second sessions, edge 370 would have a value of 1 because user 1 transitioned from resource A to resource C (albeit indirectly via resource B) in its first session, and edge 380 would have a value of 1 since user 2 transitioned from resource A to resource D during its first session.

Alternatively, resource request counts may be stored in a tree data structure of depth two (2) as an efficient way of storing a potentially very large matrix. Each resource of interest has a corresponding tree. In a tree, the first layer of the tree contains a node corresponding to a resource. This node stores a count of the number of user-sessions that have requested the associated resource. Nodes in the second layer of the tree are associated with other resources. These nodes contain counts of user-sessions that requested the resource associated with it, after having first requested the resource associated with the node of the first layer.

In the above examples, a counter may be incremented for each occurrence (i.e., resource request) for each user-session. Alternatively, the counter may be incremented only once per user-session, even if the user requested the resource more than once during the session. The better counting method will depend on whether or not cache hits are reported.

FIG. 4 is an exemplary data structure of a resource transition probability model 162', built by the building process of the present invention based on the usage log records 142' of FIG. 2. Referring now to FIGS. 3 and 4, the transition probability 168 between resource A and resource B is 0.5 since of the two (2) user-sessions that requested resource A (recall that the value of node A is 2), only one (1) transitioned to resource B (recall that the value of edge 350 is 1). The transition probability 168 between resource A and resource C is also 0.5 since of the two (2) user-sessions that requested resource A, only one (1) transitioned to resource C (recall that the value of edge 370 is 1). The transition probability 168 between resource A and resource D is also 0.5 since of the two (2) user-sessions that requested resource A, only one (1) transitioned to resource D (recall that the value of edge 380 is 1). Finally, the transition probability 168 between resource B and resource C is 1.0 since of the two (2) user-sessions that requested resource B (recall that the value of node B 320 is 2), two (2) transitioned to resource C (recall that the value of node 360 is 2).

The resource transition probabilities may be reasonably approximated by a first order Markov property. That is, the probability that a user requests a specific resource, given his(her) most recent request, is independent of all previous resource requests. For example, the probability that a user will render resource X after rendering resource Y may be defined by: {number of user-sessions requesting (or rendering) resource Y and then resource X+K1} divided by {number of user-sessions requesting (or rendering) resource Y+K2}, where K1 and K2 are non-negative parameters of a prior distribution. Basically, the constants K1 and K2 are prior belief estimates. That is, before any data is gathered, the manager of an Internet site may have an intuition as to how users will navigate the site. As more data is gathered, these constants become less and less significant. Default values of one (1) may be provided, particularly to the constant K2 so that the probability is not undefined.

In a modified embodiment, when building the resource transition probability model, possible resource transitions that are not made may also be considered. For example, values associated with the edges may be decreased, for example, by an amount of 1 or less, when a resource transition is possible but does not occur.

If the rendering of a requested resource is interrupted, the count related to the request may be ignored or discounted. Various error codes may be filtered as desired by the resource server.

Accordingly, in the exemplary embodiment 100 of FIG. 1, the resource transition probabilities may be determined by (i) counting the number of requests for each resource, (ii) counting the number of transitions (direct and indirect) between resources, and (iii) for each possible transition, dividing the number of transitions between resources by the number of requests for the starting resource. Conditional probabilities (e.g., the probability that a user will request resource Z given requests for resources X and Y) may also or alternatively be determined, for example based on n-order Markov processes, where n is two (2) or more.

Figures 20A, 20B:
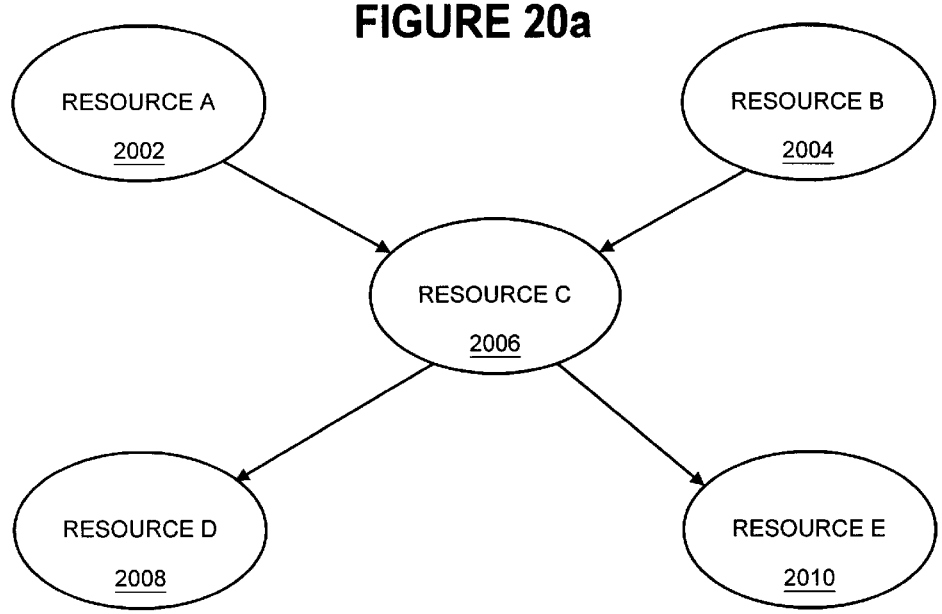
FIG. 20a is a graph and FIG. 20b is a resource transition probability table which illustrate statistical independence of resource transition probabilities.

When determining resource transition probabilities, the probabilities of transitions via intermediate resources are ignored. For example, referring to FIGS. 20a and 20b, suppose a first user transitions from resource A 2002 to resource C 2006 and then to resource D 2008 and a second user (or the same user in a different session) transitions from resource B 2004 to resource C 2006 and then to resource E 2010. The resource transition probabilities are shown in the table of FIG. 20b. If the transitions were independent (i.e., if the probabilities of intermediate transitions were accounted for), then the probability of transitioning from resource A 2002 to resource D 2008 (P=1.0) would be equal to the probability of transiting from resource A 2002 to resource C 2006 (P=1.0) times the probability of transitioning from resource C 2006 to resource D 2008 (P=0.5) which is clearly not the case.

Before sufficient usage log data is available, transition probabilities may be determined based on heuristics. Such heuristically determined transition probabilities may be referred to as "templates" and may be determined based on guesses by a human editor. Such predetermined transition probabilities may be updated or disposed of when adequate user log data becomes available. Alternatively, to reiterate, such prior belief estimates may be provided as constants such as the non-negative parameters of prior distribution discussed above.

The above described method of determining resource transition probabilities assumes that all users are the same. Although the log filtering unit 130 may serve to group usage data based on the users, such a log filtering unit 130, shown in FIG. 1, may not optimally group users or may require additional information which explicitly defines user types. Furthermore, two separate steps, namely (i) filtering and (ii) determining resource transition probabilities for the various groups of users are required. In alternative methods of the present invention, the steps of clustering usage data and determining resource transition probabilities may be effected simultaneously.

Figure 35:
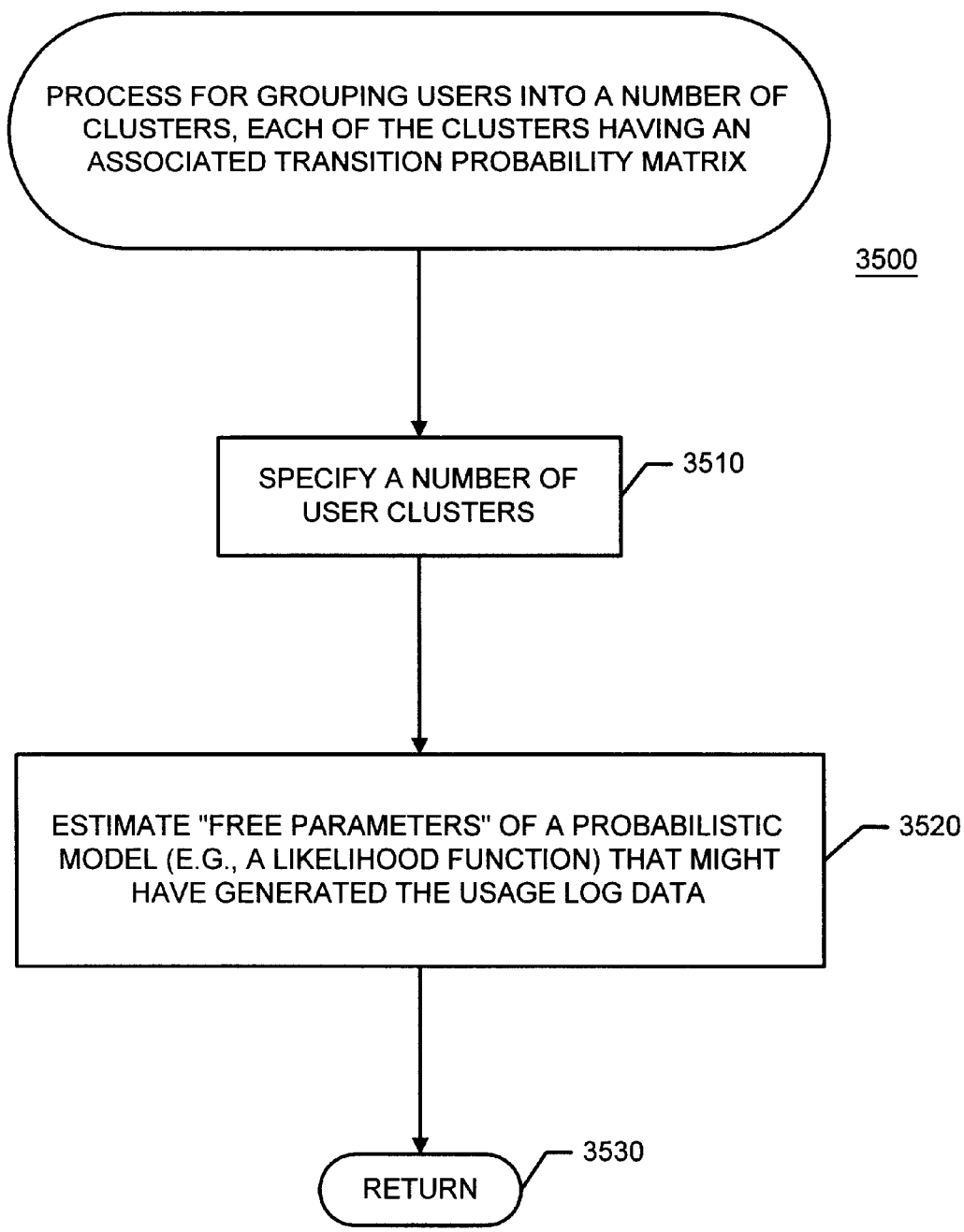
FIG. 35 is a high level flow diagram of a process for grouping users into a number of clusters, each of the clusters having an associated resource transition probability matrix.

FIG. 35 is a high level flow diagram of a process 3500 for clustering users to define a number of transition probability matrices. First, as shown in step 3510, a number of "clusters" of users is specified. The number of clusters specified may be a tuning parameter; however, it is assumed that using ten (10) clusters is a good starting point for clustering users visiting an Internet site. Alternatively, the number of clusters specified may be averaged over or estimated using known statistical methods such as reversible jump Markov Chain Monte Carlo algorithms.

Next, as shown in step 3520, "free parameters" of a probabilistic model (e.g., a likelihood function) that might have generated the actual usage log data are estimated. For example, since an Internet site has a finite number of resources, a simple way of modeling a first order Markov process on the finite set of resources is to construct a resource transition probability matrix, the elements of which contain the probability of transiting between two resources. The table below is an example of a resource transition probability matrix. In the table below, the letters on the left indicate the last resource requested by a user and the letters on the top indicate the next resource that the user will request. The distribution over the next requested resource is given by the row in the matrix corresponding to the last requested resource.

|   | A | B | C | D |
|---|---|---|---|---|
| A | 0.0 | 0.4 | 0.5 | 0.1 |
| B | 0.6 | 0.0 | 0.3 | 0.1 |
| C | 0.2 | 0.1 | 0.0 | 0.7 |
| D | 0.8 | 0.1 | 0.1 | 0.0 |

As shown above, if the user last requested resource B, then the probability that the user will next request resource A is 0.6, the probability that the user will next request resource C is 0.3, and the probability that the user will next request resource D is 0.1. Each of the rows in the matrix must sum to one. The values of the diagonal of the matrix are set to zero because the resulting models are used for prefetching and caching resources. Thus, even if usage logs indicate that users do repeatedly request the same resource, such a resource would already have been cached. Since, most Internet sites have much more than four (4) resources, in practice, the resource transition probability matrix will be much larger (e.g., on the order of 100 by 100).

As discussed above, the elements of the matrix are determined by (i) counting the number of times users request a first resource to generate a first count, (ii) counting the number of times users request a second resource (immediately) after requesting the first resource to generate a second count, and (iii) dividing the second count by the first. Again, this model is fairly simple because it assumes that all users are the same. Again, in the refined methods, such as the process depicted in FIG. 35, to account for the diversity of users, a number of user types is specified. Each of these user types will have an associated resource transition probability matrix. Under this modeling framework, parameter estimation is much more challenging because an unobserved quantity, i.e., a cluster identifier, exists for each sequence of resource requests. The table below shows an example of data that may be observed from users traversing an Internet site.

| CLUSTER | USER/SESSION | SEQUENCE OF RESOURCE TRANSITIONS |
|---|---|---|
| ? | 1 | ABDBCEFA |
| ? | 2 | DBCEFA |
| ? | 3 | BDFECAE |
| ? | 4 | FEACEBD |
| ? | 5 | FAEDABCEAFEDC |
| . | . | . |
| . | . | . |
| . | . | . |

As discussed above in step 3520 of FIG. 35, free parameters of a probabilistic model that might have generated the usage log data are estimated. These free parameters may be used to infer the cluster identifiers and the associated resource transition probability matrices.

The following likelihood function is a mathematical expression for the probability that the actual usage data would be observed given the parameters of the function.

$$f(n|\underline{p}, \underline{P}, \delta) = \prod_{k=1}^{N}\prod_{l=1}^{m}\left((l)p_{i_0^{(k)}}\prod_{i=1}^{s}\prod_{j=1}^{s}(l)p_{i,j}^{n_{i,j}^{(k)}}\right)^{\delta_l^{(k)}} \quad (1)$$

where i≡Origin resource index.
j≡Destination resource index.
k≡Observed processes index.
l≡Cluster index.
N≡The number of observed processes.
$i_0$≡The initial state of the process.
$n_{ij}$≡The number of times a process transitioned from resource i to resource j.
m≡The number of clusters.
s≡The number of resources.
$p_l$≡A probability vector of length s which specifies an initial state distribution of cluster l.
$P_l$≡An s by s matrix of transition probabilities for cluster l.
α≡A probability vector of length m that contains the proportion of processes coming from any particular cluster. Basically, the term within the parentheses computes the probability that user k made the transitions that they did assuming that they are from cluster l. The term in the parentheses before the double product is called "the initial state distribution" and specifies the probability that user k started his(her) traversal through the Internet site from the resource from which he(she) started. The double product term is a product of all the probabilities of transitions that user k made. The $(l)P_{ij}$ term is element i,j in the resource transition probability matrix for cluster l. The exponent is an indicator of the cluster identifier and is 1 if user k is a member of cluster l and is 0 otherwise. Finally, the double product preceding the parentheses indicates that the above calculations are performed over all clusters and all users. The free parameters are p, P and δ.

The refined methods of the present invention employ Bayesian inference and maximum likelihood inference approaches for estimating the free parameters. More specifically, regarding the Bayesian inference approach, applying Bayes theorem provides:

$$P(\text{assumed parameters}|\text{usage data}) = \quad (2)$$

$$\frac{P(\text{usage data}|\text{assumed parameters})P(\text{assumed parameters})}{P(\text{usage data})}$$

where P(A/B)≡The probability of A given B.

The probability of the assumed parameters given the usage data (P(assumed parameters|usage data)) is known as the "posterior". Finally, the probability of the usage data given the assumed parameters is known as the likelihood. Thus, the likelihood (P(usage data|assumed parameters) may be expressed as shown in equation (1).

The probability of the assumed parameters (P(assumed parameters)) is a prior distribution which represents beliefs about the parameters before observing the data. In one implementation, non-informative (or "flat") priors are assumed to represent ambivalence toward the parameter values. Accordingly, a non-informative (or uninformative) Dirichlet hyperprior is used as a prior distribution function for parameters of the model. Then δ will be a distributed multinomial (1,α). A non-informative Dirichlet (1) hyperprior for the hyperparameter α corresponds to a uniform prior distribution over the m-dimensional simplex. Similarly, every row in every transition matrix will also have a non-informative Dirichlet prior distribution over the s-dimensional simplex. To reiterate, the prior distribution functions of the free parameters of the likelihood function are as follows:

$$\delta^{(k)} \sim \text{Mult}(1,\underline{\alpha})$$

$$\underline{\alpha} \sim \text{Dirichlet}(\underline{1}_m)$$

$$(l)p \sim \text{Dirichlet}(\underline{1}_s) \quad (3)$$

$$(l)P_{i,all\,j} \sim \text{Dirichlet}(\underline{1}_s), \text{ where } (l)P_{i,all\,j} \text{ is the } i^{th} \text{ row of } (l)P$$

The joint distribution is proportional to the likelihood multiplied by the prior densities and therefore may be represented as:

$$f(\underline{p}, \underline{P}, \underline{\delta}, \underline{\alpha}|\underline{n}) \propto \quad (4)$$

$$\prod_{k=1}^{N}\prod_{l=1}^{m}\left((l)p_{i_0^{(k)}}\prod_{i=1}^{s}\prod_{j=1}^{s}P_{i,j}^{n_{i,j}^{(k)}}\right)^{\delta_l^{(k)}} \cdot \prod_{k=1}^{N}\prod_{l=1}^{m}\alpha_l^{\delta_l^{(k)}} \cdot 1 \cdot 1 \cdot 1$$

Assuming that the first order Markov assumption is correct, this joint distribution captures all of the information about the process clustering that is contained in the data. However, this distribution is rather complex and all of the usual distribution summary values (mean, variance, etc.) are extremely difficult to extract. Using a Markov Chain Monte Carlo ("MCMC") approach to sample from this distribution avoids this problem with a degree of computational cost.

Markov Chain Monte Carlo algorithms provide a method for drawing from complicated distribution functions. The form of the posterior distribution lends itself to a class of MCMC algorithms known as Gibbs samplers. Implementations of a Gibbs sampler partition the parameter space into "blocks" or "sets" of parameters where drawing from the distribution of the block given all of the other blocks is simple. Iterations of the Gibbs sampler in turn draw new values for each block of parameters from these block conditional distributions.

The parameter space may be partitioned as follows. The rows of every transition matrix, the vector $\alpha$, and each $\delta$ will be block updated. The block conditionals are found from the above posterior.

$$f((l)p|(l)p^-, \underline{n}) \propto \prod_{k=1}^{N} (l)p_{i_o^{(k)}}^{\delta_l^{(k)}} \qquad (5)$$

$$= \prod_{k=1}^{N} \prod_{i=1}^{s} (l)p_i^{\delta_l^{(k)} \cdot I(i_o^{(k)} = i)}$$

$$= \prod_{i=1}^{s} (l)p_i^{\sum_{k=1}^{N} \delta_l^{(k)} \cdot I(i_o^{(k)} = i)}$$

$$\equiv \text{Dirichet}\left(1 + \sum_{k=1}^{N} \delta_l^{(k)} I(i_o^{(k)} = 1), \ldots, 1 + \sum_{k=1}^{N} \delta_l^{(k)} I(i_o^{(k)} = s)\right)$$

$$f((l)P_{i\cdot}|(l)P_{i\cdot}^-, \underline{n}) \propto \prod_{k=1}^{N} \left(\prod_{j=1}^{s} (l)P_{ij}^{n_{ij}^{(k)}}\right)^{\delta_l^{(k)}} \qquad (6)$$

$$= \prod_{j=1}^{s} (l)P_{ij}^{\sum_{k=1}^{N} \delta_l^{(k)} n_{ij}^{(k)}}$$

$$\equiv \text{Dirichet}\left(1 + \sum_{k=1}^{N} \delta_l^{(k)} n_{i1}^{(k)}, \ldots, 1 + \sum_{k=1}^{N} \delta_l^{(k)} n_{is}^{(k)}\right)$$

$$f(\underline{\alpha}|\underline{\alpha}^-, \underline{n}) \propto \prod_{l=1}^{m} \alpha_l^{\sum_{k=1}^{N} \delta_l^{(k)}} \qquad (7)$$

$$\equiv \text{Dirichet}\left(1 + \sum_{k=1}^{N} \delta_1^{(k)}, \ldots, + \sum_{k=1}^{N} \delta_m^{(k)}\right)$$

$$f(\delta^{(k)}|\delta^{(k)-}, \underline{n}) \propto \prod_{l=1}^{m} \left(a_l \cdot (l)p_{i_o^{(k)}} \prod_{i=1}^{s} \prod_{j=1}^{s} (l)p_{ij}^{n_{ij}^{(k)}}\right)^{\delta_l^{(k)}} \qquad (8)$$

$$\equiv \text{Mult}\left(1, \frac{1}{z}[a_1 \cdot (1)p_{i_o^{(k)}} \prod_{i=1}^{s} \prod_{j=1}^{s} (1)P_{ij}^{n_{ij}^{(k)}}, \ldots,\right.$$

$$\left. a_m \cdot (m)p_{i_o^{(k)}} \prod_{i=1}^{s} \prod_{j=1}^{s} (m)P_{ij}^{n_{ij}^{(k)}}\right]\right)$$

$$\text{where } z = \sum_{l=1}^{m} a_l \cdot (l)p_{i_o^{(k)}} \prod_{i=1}^{s} \prod_{j=1}^{s} (l)P_{ij}^{n_{ij}^{(k)}}$$

The row updates are drawn from a distribution where the expected value is approximately the maximum likelihood estimator (or "MLE") for the row if the cluster assignments, $\delta$, were known. The vector $\alpha$ is drawn from a distribution where the expected value is approximately the mixture proportions if, again, the cluster assignments were known. Lastly, the cluster assignments are drawn such that probability of each cluster is proportional to the mixture probability times the likelihood of the observation coming from the associated transition matrix.

The implementation of this algorithm initially fills in all of the transition matrices with $s^{-1}$ and the vector $\alpha$ with $m^{-1}$ and randomly assigns the $\delta$ to one of the m clusters. The algorithm proceeds by first updating all of the rows of P, then updates $\alpha$, and lastly updates $\delta$. This constitutes one iteration. After a large number of iterations (approximately 10,000, but this depends on the data and dimension of the problem), the sequence of parameter values will approximate the joint posterior distribution and hence, arbitrary functionals of the posterior distribution may be computed.

Regarding the maximum likelihood inference approach for estimating the free parameters, an Expectation Maximization (or "EM") algorithm may be used. EM algorithms iterate between obtaining maximum likelihood estimates for the unknown parameters given the complete data and computing the expected value of the missing data given the parameters. In this implementation, the algorithm iterates between computing maximum likelihood estimates for the transition matrices and reevaluating the cluster assignments.

In the Gibbs sampling algorithm discussed above, the $\underline{\delta}^{(k)}$'s were coerced to put probability one (1) on one cluster and zero (0) on all of the others. Then assessment of $\text{Pr}(1 \rightarrow k)$ $(=\alpha_L)$ comes directly from the distribution of the Monte Carlo sample of $\underline{\delta}^{(k)}$. As opposed to the Gibbs sampling algorithm, the $\delta$'s now represent a probability vector where $\delta_l$ indicates the probability that the process was generated from cluster l. Despite this difference, similarities between the Gibbs sampling algorithm and the EM algorithm will be evident.

The likelihood function has to be modified to adapt to this alternate interpretation of $\delta$. This version of the likelihood has the same meaning as that discussed above but its mathematical form would have been much more difficult to handle in the Bayesian framework.

$$f(\underline{n}|\underline{p}, \underline{P}, \underline{\delta}) = \prod_{k=1}^{N} \text{Pr}\left(\underline{n}^{(k)}|\underline{\delta}^{(k)}, \underline{p}, \underline{P}\right) \qquad (9)$$

$$= \prod_{k=1}^{N} \left[\sum_{l=1}^{m} \text{Pr}\left(l \rightarrow k|\underline{\delta}^{(k)}, \underline{p}, \underline{P}\right) \cdot \text{Pr}\left(\underline{n}^{(k)}|l \rightarrow k, \underline{\delta}^{(k)}, \underline{p}, \underline{P}\right)\right]$$

$$= \prod_{k=1}^{N} \left[\sum_{l=1}^{m} \left(\delta_l^{(k)} \cdot (l)P_{i_o^{(k)}} \prod_{i=o}^{s} \prod_{j=o}^{s} (l)P_{ij}^{n_{ij}^{(k)}}\right)\right]$$

To initialize the algorithm, the processes are randomly assigned to the m clusters. That is, the $\delta$'s are randomly selected to represent assignment to one of the m clusters and $\alpha$ is the mean of the $\delta$'s. With this complete data, maximum likelihood estimators (or "MLEs") for the initial state distribution and the transitions matrices may be determined as follows:

$$(l)p_i = \frac{\sum_{k=1}^{N} \delta_l^{(k)} I(i_o^{(k)} = i)}{\sum_{k=1}^{N} \delta_l^{(k)}} \qquad (10)$$

-continued $$(l)P_{i,j} = \frac{\sum_{k=1}^{N} \delta_l^{(k)} n_{i,j}^{(k)}}{\prod_{j=1}^{s} \sum_{k=1}^{N} \delta_l^{(k)} n_{i,j}^{(k)}} \quad (11)$$

This equation is similar to equation 5 set forth above. Conditioning on the values of p and P, the cluster probabilities can be computed similar to equation 7 set forth above.

$$\delta_l^{(k)} = P\left(l \to k | \underline{n}^{(k)}, (l)p, (l)P\right) \quad (12)$$

$$\propto P\left(\underline{n}^{(k)} | l \to k, (l)p, (l)P\right) P(l \to k)$$

$$= \left((l)p_{i_o^{(k)}} \prod_{i=o}^{s} \prod_{j=o}^{s} (l)P_{i,j}^{n_{i,j}^{(k)}}\right) \cdot \alpha_l$$

Each vector $\delta^{(k)}$ is then normalized to sum to unity. Lastly, the mixture probability vector $\alpha$ is updated as the mean of the $\delta$'s.

The EM algorithm is known to converge slowly in some situations. An alternative algorithm is proposed here. The algorithm is to force the $\delta$'s to assign probability one to one of the clusters and zero to the remaining. Hartigan's k-means algorithm is an example of this type of constrained EM algorithm for multivariate normal data. To make this modification, in lieu of equation 12 set forth above, $\delta^{(k)}$ is assigned to the cluster from which has the highest probability of generating process k. The algorithm converges when an entire iteration is completed with no processes being reassigned.

A major drawback to the EM approach is the lack of standard errors. Gibbs sampling produces the estimates of the standard deviation of the marginal posterior density for any parameter of interest. EM, on the other hand, is solely a maximization method. Variants of the EM algorithm like the SEM algorithm (Supplemented EM) rely on normal approximations to the sampling distribution of the parameter estimates. In practice, these estimates are often quite reasonable. For the case at hand, however, the observed information matrix can be quite difficult to calculate. The "label switching problem" does not exist for EM algorithms.

The constrained EM algorithm lacks accuracy and detail but has the advantage of speed. The Gibbs sampler on the other hand can be used to compute arbitrary functionals of the distribution quite easily but takes several orders of magnitude longer to iterate to reasonable accuracy. Thus, a hybrid algorithm may be useful to borrow from the strengths and diminish the effect of the weaknesses of both algorithms.

In a further implementation used for applied process cluster problems, the constrained EM algorithm is iterated to convergence. The cluster assignments from the constrained EM algorithm provide initial assignments for the Gibbs sampler. Then, with a relatively short burn-in period (i.e., less iterations needed), the Gibbs algorithm runs until it obtains decent estimates for the posterior means and variance of the parameters. Of course, other clustering methods and likelihood functions may be used.

Having described examples of resource transition probability model building processes, the use of such processes in a networked client-server environment is now described below.

Figure 5:
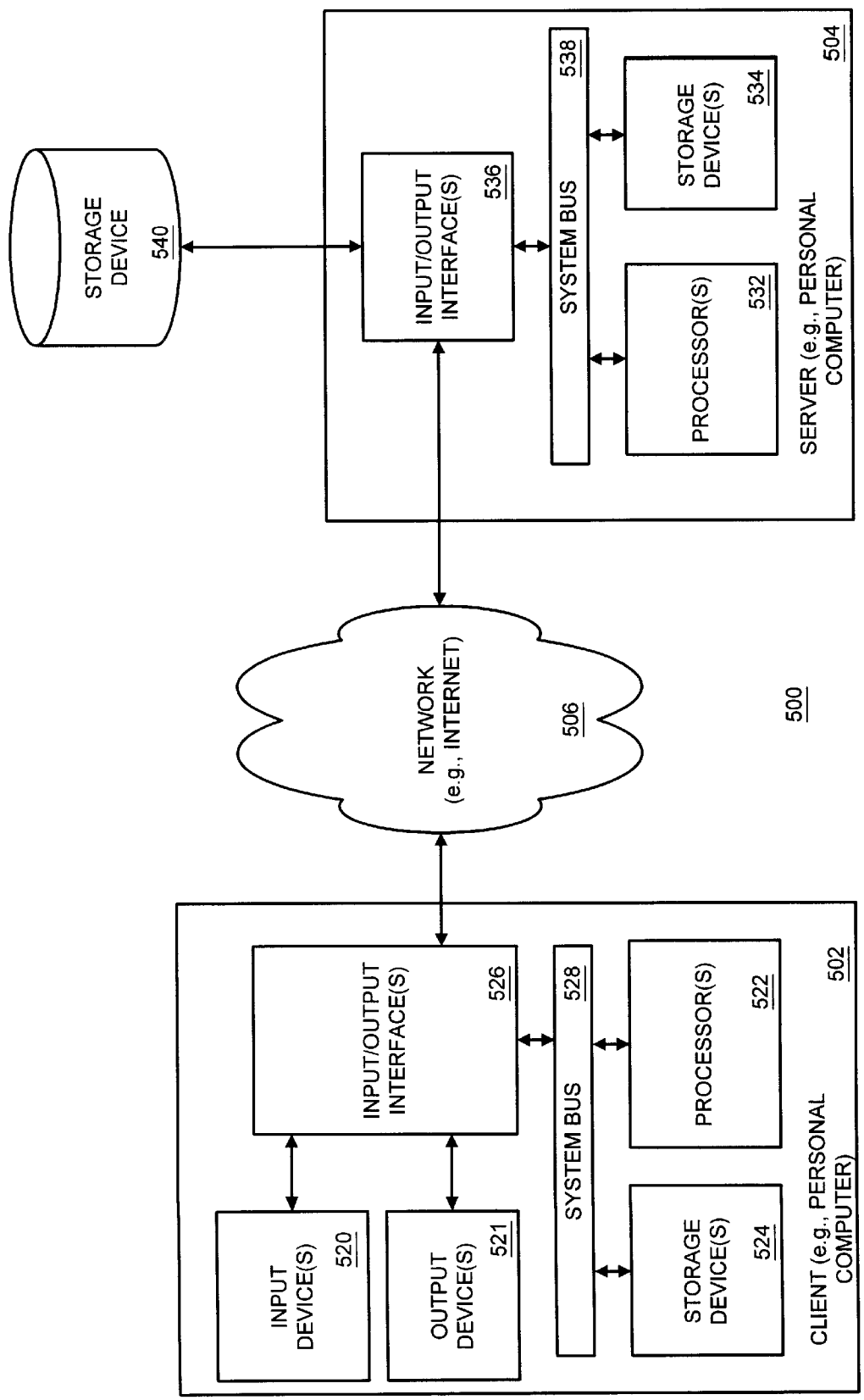
FIG. 5 is a high level block diagram of a networked client and server.

FIG. 5 is a high level block diagram of a network environment 500 in which the server-side resource transition probability model building system 100 of the present invention may operate. The environment 500 includes, inter alia, a client (e.g., a personal computer) 502 which may communicate data via a network (e.g., the Internet) 506, and a server (e.g., a personal computer) 504 which may also communicate data via the network 506.

The client 502 may include processor(s) 522, storage device(s) 524, and input/output interface(s) 526, which share a system bus 528. The storage device(s) 524 stores program instructions for implementing at least a portion of the process of the present invention. At least a portion of the process of the present invention may be effected when the processor(s) 522 executes the stored (and/or downloaded) program instructions. The input/output interface(s) 526 permits communication with the network 506, for example via an ISDN (or Integrated Services Digital Network) line termination device. The input/output interface(s) 526 further functions to condition inputs provided via an input device(s) 520 (e.g., a keyboard, mouse, and/or other man-machine interface) and to condition outputs provided to an output device(s) 521 (e.g., a video display, audio speakers, etc.).

Similarly, the server (e.g., a personal computer) 504 may include a processors) 532, storage device(s) 534, and input/output interface(s) 536, which share a system bus 538. The storage device(s) 534 stores program instructions for implementing at least a portion of the process of the present invention. At least a portion of the process of the present invention may be effected when the processor(s) 532 executes the stored (and/or downloaded) program instructions. The input/output interfaces) 536 permits communication with the network 506, for example via a modem bank. The input/output interface(s) 536 (e.g., a Small Computer System Interface (or "SCSI") protocol unit) may also permit records, such as usage log records, and data, such as resource data, to be written to and read from a database stored on a storage device (e.g., a magnetic or optical disk) 540.

The network 506 may include, inter alia, bridges, routers, switching systems, multiplexers, etc., to forward data to an addressed (e.g., in accordance with the TCP/IP (Transmission Control Protocol/Internet Protocol) protocol) destination.

Figure 6:
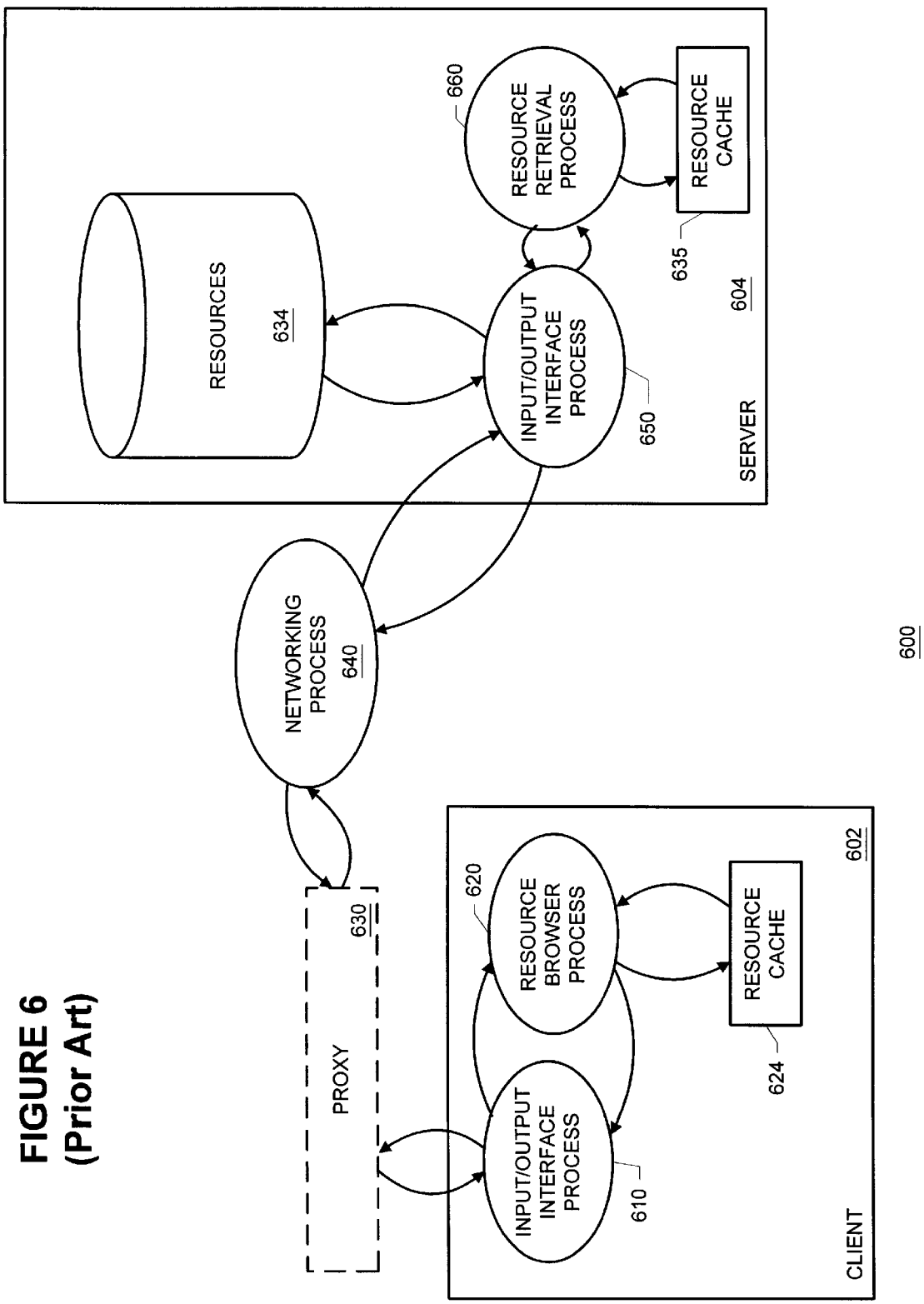
FIG. 6 is a high level process diagram of a networked client and server in which the client may browse resources of the server.

FIG. 6 is a high level process diagram of a networked client 602 and server 604 in which the client 602 may browse resources 634 of the server 604. The client 602 may include a resource browser process (or more generally, a resource requester) 620. When a resource is requested, the resource browser process 620 first checks a local resource cache 624 to determine if the resource is available at the client 602. If the requested resource is available, it is retrieved and rendered. If, on the other hand, the requested resource is not available locally at the client 602, the resource browser process 620 will submit a request for the resource, via an input/output interface process 610, possibly a proxy 630 such as America Online or a local Internet service provider, a networking process 640, and an input/output interface process 650 of a server 604, to a resource retrieval process (or more generally, a resource retriever) 660 of the server 604. The resource retrieval process 660 may first check a high speed memory resource cache 635 to determine whether the requested resource is available. If the requested resource is not available at the resource cache 635, the resource retrieval process 660 may request, via the input/output interface process 650 (e.g., a SCSI card) of the server 604, the resource from a larger, slower speed, storage device 634. In either case, the resource retrieval process 660 returns the requested resource, for example, via the input/ output interface process 650 of the server 604, the networking process 640, possibly a proxy 630, and the input/output interface process 610 of the client 602, to the resource browser process 620 of the client 602. These processes may be used in known systems, such as those that manage client resource caches 624 in accordance with a least recently used ("LRU") replacement algorithm.

Figure 7A:
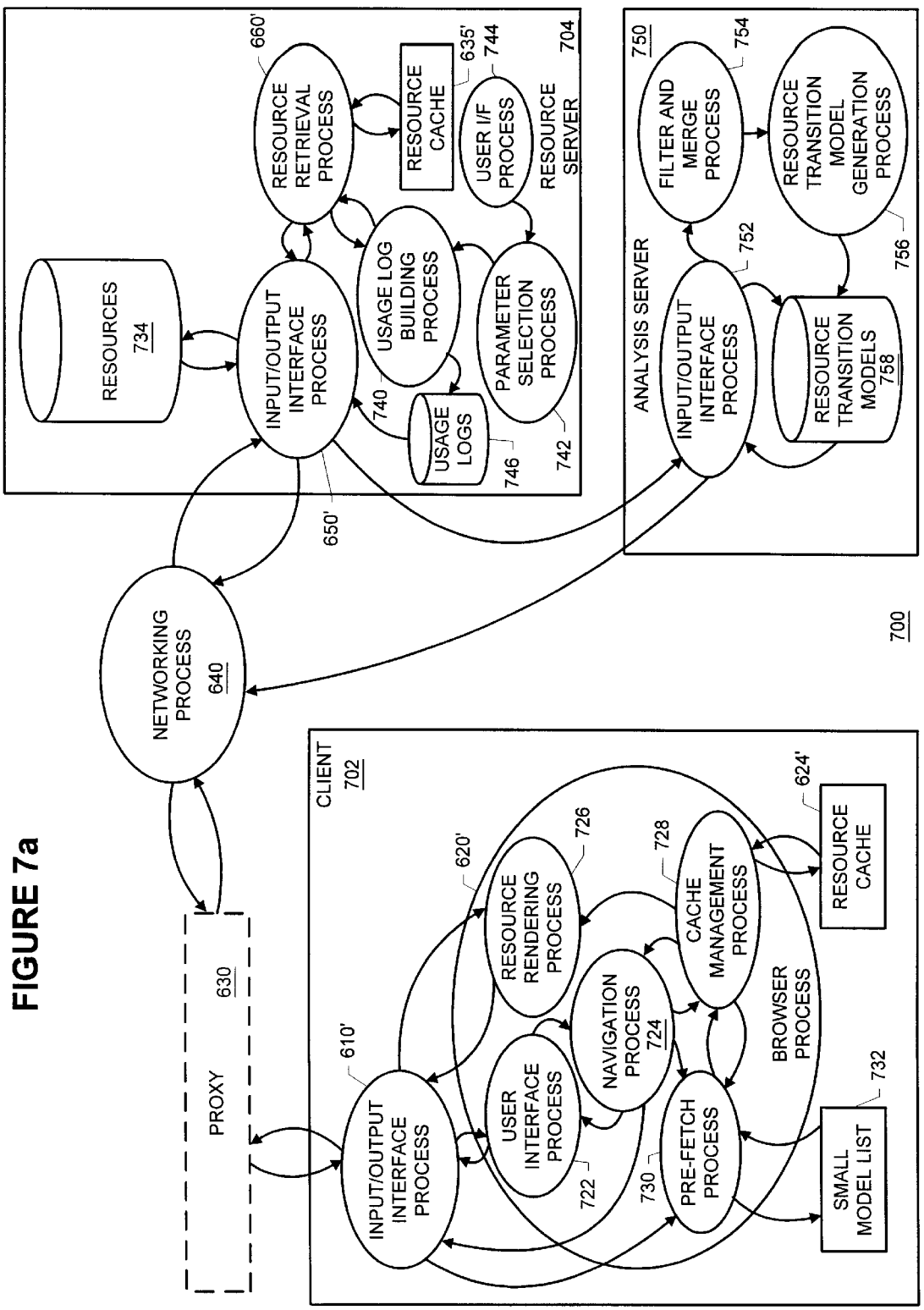
FIG. 7a is a process diagram of processes which may be used in exemplary server-side resource transition probability model building and pre-fetching processes of the present invention.

FIG. 7a is a process diagram of a system 700 which may be used to effect exemplary server-side resource transition probability model building and pre-fetching processes of the present invention. Basically, the system 700 includes a client 702, a networking process 640, a resource server 704, and an analysis server 750. Although shown separately, the processes of the resource server 704 and the analysis server 750 may be carried out by a single server.

Basically, the client 702 functions to (a) accept user selections for resources, (b) request resources from its resource cache or a server, (c) download and render resources, (d) download and store lists of resource transition probabilities, (e) manage cached resources, and (f) pre-fetch and cache resources based on a list of resource transition probabilities. Basically, the resource server 704 functions to (a) service requests for resources, whether the requests are in response to a user selection or pre-fetch, and (b) logging usage when appropriate. Finally, the analysis server 750 basically functions to generate resource transition probability models based on usage logs.

The client 702 includes a storage area 732 for storing a small (resource transition probability) model list and a storage area 624' for caching resources. The client also includes an input/output interface process 610' and a browser process (or more generally, a resource requester) 620'. The input/output interface process 610' may include, for example, video driver protocols, audio driver protocols, networking layer protocols, and input device interfaces. The browser process 620' may include a user interface process (or more generally, a user interface) 722, a navigation process (or more generally, a navigator) 724, a resource rendering process (or more generally, a resource renderer) 726, a cache management process (or more generally, a cache manager) 728, and a resource pre-fetch process (or more generally, a resource pre-fetcher) 730. As shown in FIG. 7a, the user interface process 722 can interact and exchange data with the input/output interface process 610' and the navigation process 724. The navigation process 724 may further interact and exchange data with the input/output interface process 610', the cache management process 728, and the pre-fetch process 730. The resource rendering process 726 may interact and exchange data with the input/output interface process 610' and may receive data from the cache management process 728. The cache management process 728 may further interact and exchange data with the pre-fetch process 730 and the resource cache 624'. The pre-fetch process 730 may further interact and exchange data with the input/output interface process 610' and the small model list 732.

Figure 7B:
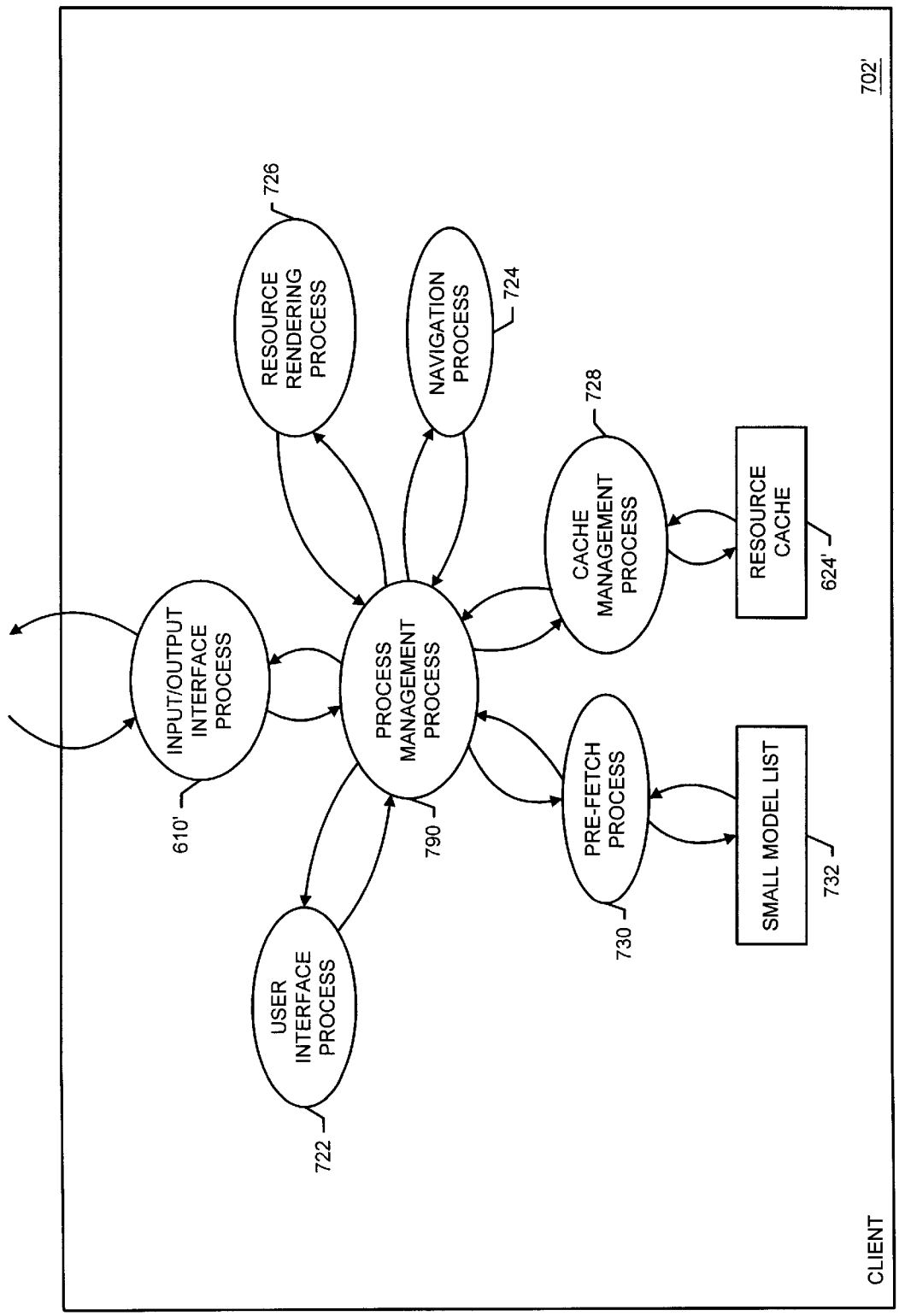

FIG. 7b is a process diagram of an alternative client 702'. The alternative client 702' is similar to the client 702 of FIG. 7a, but differs in that a process management process (or more generally, a process manager) 790 is added. The process management process 790 provides a centralized control of the input/output interface process 610', the user interface process (or more generally, a user interface) 722, the navigation process (or more generally, a navigator) 724, the resource rendering process (or more generally, a resource renderer) 726, the cache management process (or more generally, a cache manager) 728, and the pre-fetch process (or more generally, a pre-fetcher) 730. Further, the process management process 790 may facilitate inter-process communications.

The resource server 704, shown in FIG. 7a, includes a storage area 635' for storing cached resources, a storage area 734 for storing resources, a storage area 746 for storing usage log information, an input/output interface process 650', a resource retrieval process (or more generally, a resource retriever) 660', a usage log building process (or more generally, a usage recorder) 740, a parameter selection process (or more generally, a parameter selector) 742, and a user interface process (or more generally, a user interface) 744. The input/output interface process 650' of the resource server may interact and exchange data with a networking process 640 of the network 506, an input/output interface process 752 of the analysis server 750, resource storage area 734, the resource retrieval process 660', and the usage log storage area 746. The resource retrieval process 660' may further interact and exchange data with the usage log building process 740 and the resource cache storage area 635'. The usage log building process 740 may further interact with and provide data to the usage log storage area 746. The user interface process 744 may interact with and provide data to the parameter selection process 742, which may interact with and provide data to the usage log building process 740.

The analysis server 750 includes an input/output interface process 752, a filter and merge process (or more generally, a filter/merger) 754 (optional), a resource transition probability model generation process (or more generally, a resource transition probability model generator) 756, and a storage area for storing resource transition probability models 758.

§2.3 OPERATION OF SERVER-SIDE MODEL BUILDING SYSTEM

Figure 8:
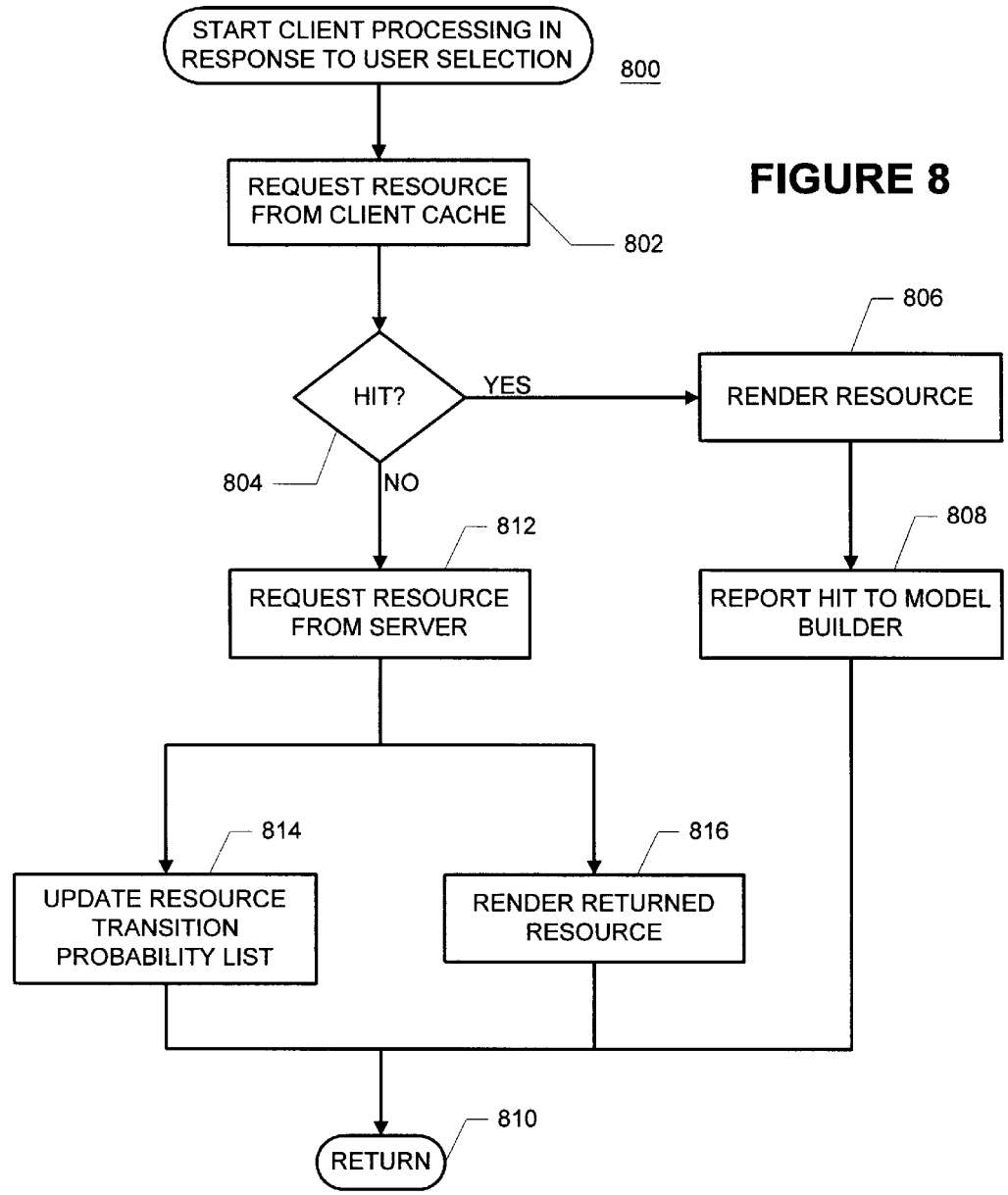
FIG. 8 is a flow diagram of processing, carried out by a client, in the exemplary server-side resource transition probability model building process of the present invention.

The operation of the exemplary server-side resource transition probability model building system 100 will now be described with reference to FIGS. 8 through 12. FIG. 8 is a flow diagram of processing 800, carried out by a client 702 in response to a user resource selection (or "resource request"), in the exemplary server-side model building process of the present invention. First, as shown in step 802, the resource is requested from the resource cache 624' of the client 702. Referring back to FIG. 7a, this step may be carried out by navigation process 724 and cache management process 728. If, as shown in steps 804, 806 and 808 in FIG. 8, the requested resource is available from the resource cache 624' (i.e., a "hit"), the resource is rendered (may be carried out by resource rendering process 726) and the hit is reported to the resource transition model builder (may be carried out by navigation process 724). In a modified embodiment, the server will send a new table to the client (not previously sent with a pre-fetched resource) in response to the cache hit. If, on the other hand, the requested resource is not available from the resource cache 624', the client 702 requests the resource from the server 704 as shown in step 812. This step may be carried out by the cache management process 728, the navigation process 724, and the input/output interface process 610'.

Figure 9A:
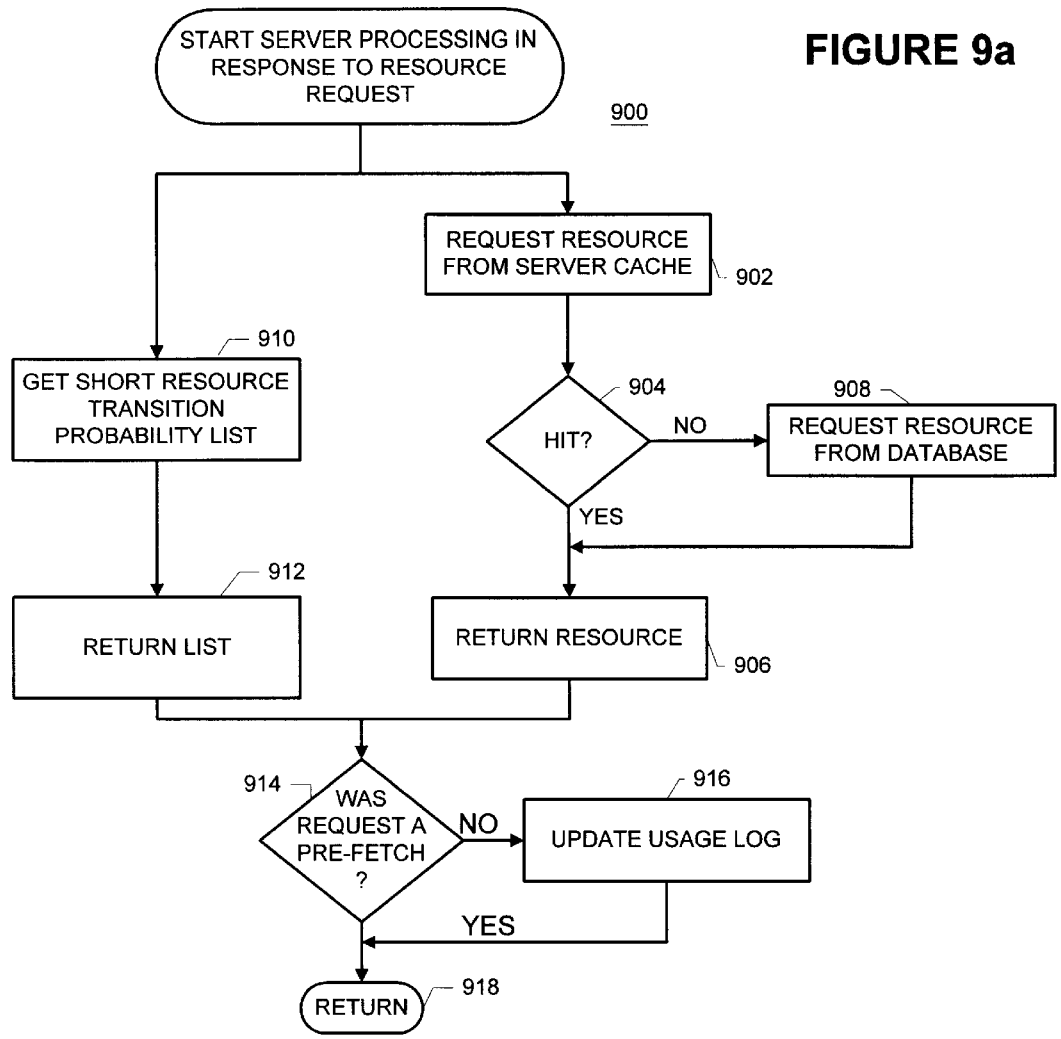
FIG. 9a and 9b are flow diagrams of processing, carried out by a server, in the exemplary server-side resource transition probability model building process of the present invention.

Skipping ahead to FIG. 9a, which is a flow diagram of processing 900, carried out by the resource server 704, in response to the client resource request, the resource server 704 first requests the resource from its resource cache 635' as shown in step 902. Referring back to FIG. 7a, this step may be carried out by the resource retrieval process 660'. If, as shown in steps 904 and 908 in FIG. 9a, the resource is not available from the resource cache 635', the resource is requested from the resource storage area 734. This step may be carried out by the resource retrieval process 660' also. Thereafter, as shown in step 906, the resource, whether obtained from the resource cache 635' or the resource storage area 734, is returned to the requesting client 702. Again, this step may be carried out by the resource retrieval process 660' and the input/output inter face process 650'. Before, after, or concurrently with steps 902, 904, 906, and 908, as shown in steps 910 and 912, a short list of resource transition probabilities is also returned to the requesting client 702. These steps may be carried out by the input/output interface process 752. Finally, as shown in step 914, if the requested resource was requested in response to a pre-fetch request, processing continues at return node 918. If, on the other hand, the requested resource was not requested in response to a pre-fetch request (e.g., if the request was in response to a user selection), the usage log 746 is updated as shown in steps 914 and 916. This step may be carried out by the usage log building process 740.

The above described server processing 900 may be modified or refined as follows. First, if the request is a pre-fetch request, the server will only process such a request if it is sufficiently idle. That is, the resource server 704 will first serve explicit resource requests before serving pre-fetch requests for a resource that a user "might" want. Second, again, if the request is a pre-fetch request, the server might only send certain types of resources (e.g., non-image resources). Finally, if the client 702 submitting the pre-fetch resource request subsequently submits a resource request pursuant to a user selection processing, by resource server 704 of the pre-fetch resource request may be aborted.

Figure 9B:
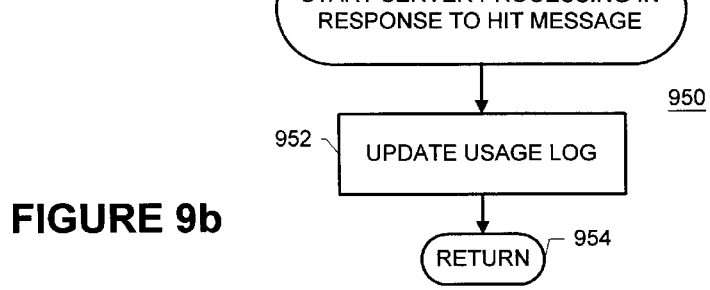

Recall from FIG. 8 that if a requested resource is available from the client's resource cache 635', such a hit (if the resource was pre-fetched) is reported to the resource server 704. As shown in FIG. 9b, the resource server processes such a hit report by updating the usage log 746 as shown in steps 950 and 952. Processing continues from return node 954.

Returning now to FIG. 8, as shown in step 814, the small resource transition probability model list 732 of the client 702 is updated based on the returned list. This step may be carried out by the pre-fetch process 730. Before, after or concurrently with step 814, the returned resource is rendered by the client 702 as shown in step 816. This step may be carried out by the resource rendering process 726.

Figure 10:
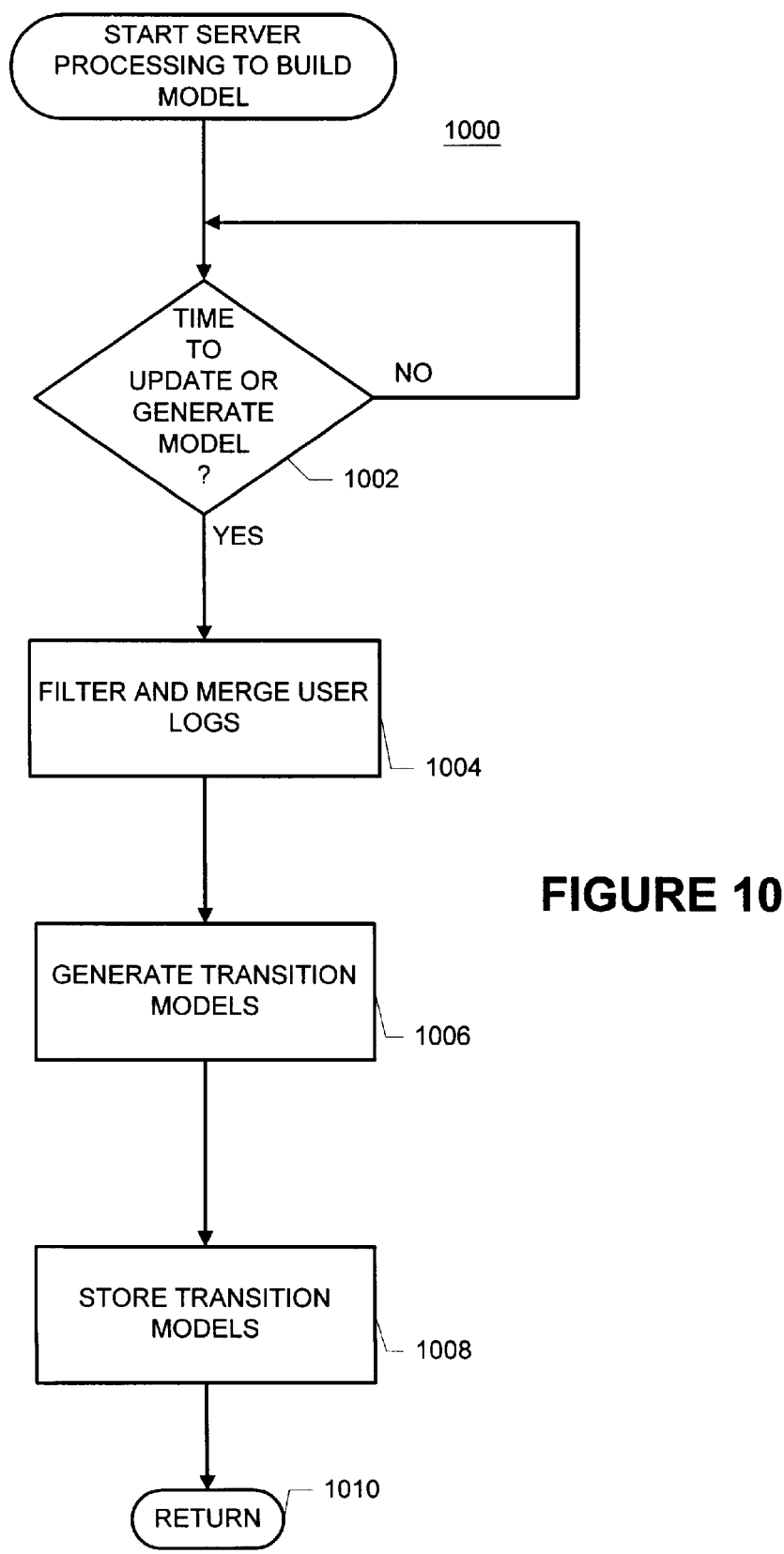
FIG. 10 is a flow diagram of processing, carried out by a server, in an exemplary server-side resource transition probability model building processes of the present invention.

FIG. 10 is a flow diagram of processing 1000, carried out by the analysis server 750, in an exemplary model building processes of the present invention. First, as shown in decision step 1002, it is determined whether it is time to update (or create a new or replace) a resource transition model. The data collection time period (or "sample period") is predetermined and will depend on the type of resources and the interrelationship between resources. For example, an Internet site having relatively static content, such as a site with resources related to movie reviews, may have a resource transition model which, once created, is updated weekly. On the other hand, an Internet site having relatively dynamic content, such as a site with resources related to daily news stories or even financial market information, may have a resource transition model with is replaced daily or hourly. Alternatively, the sample period may be defined by the filtering process discussed above with reference to FIG. 1. In any event, once it is determined that it is time to update, generate, or replace a resource transition model, as shown in step 1004, if necessary, usage logs are merged and filtered as discussed above with reference to FIG. 1. These steps may be carried out by filter and merge process 754. Next, as shown in step 1006 in FIG. 10, resource transition probability models are generated as discussed above with reference to FIGS. 2 through 4. This step may be carried out by the resource transition probability model generation process 756. Finally, the generated resource transition probability models are stored as shown in step 1008. Processing continues as shown in FIG. 10, at return node 1010.

Figure 11:
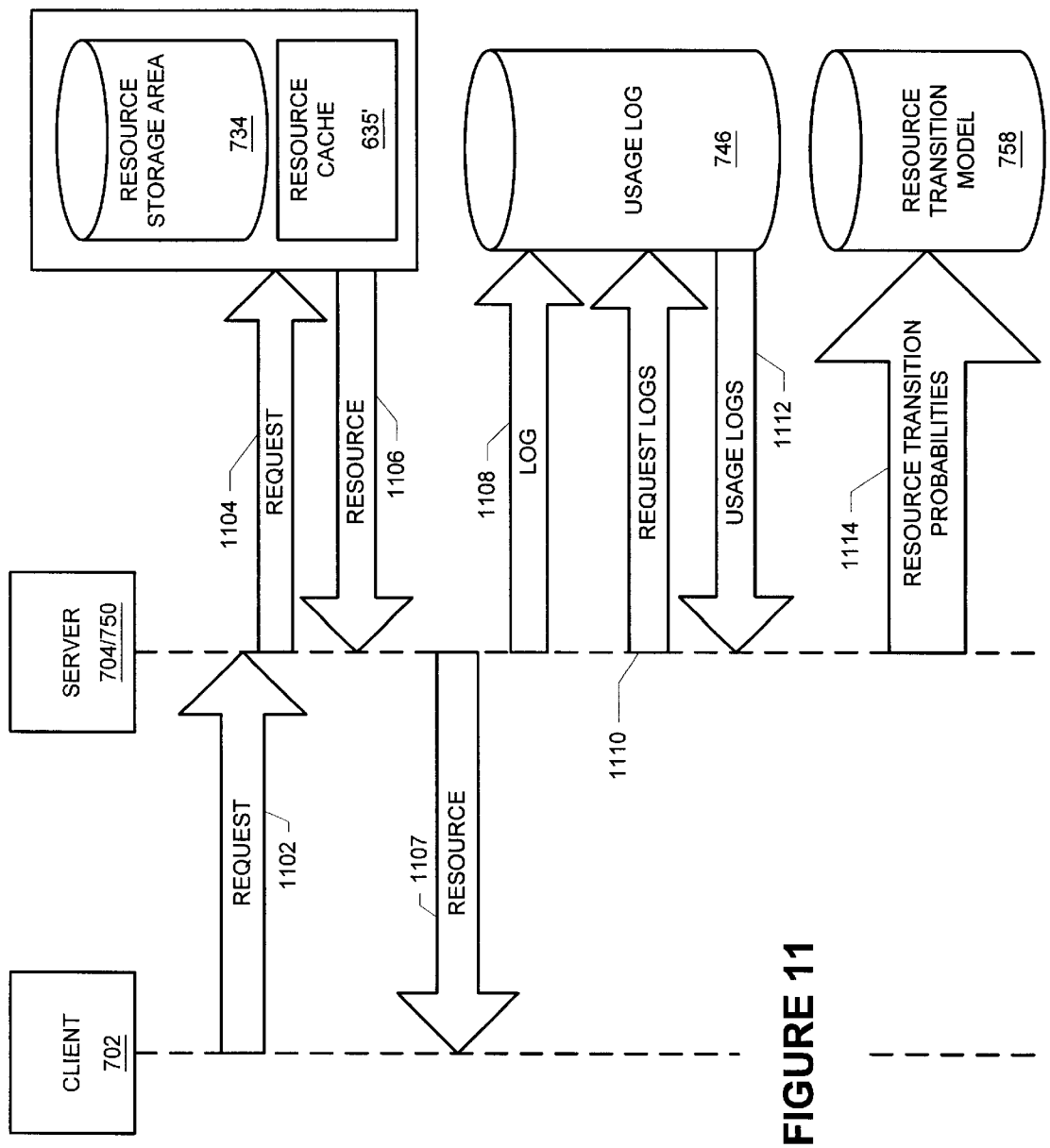
FIG. 11 is a high level messaging diagram of an exemplary server-side resource transition probability model building process of the present invention.
Figure 12:
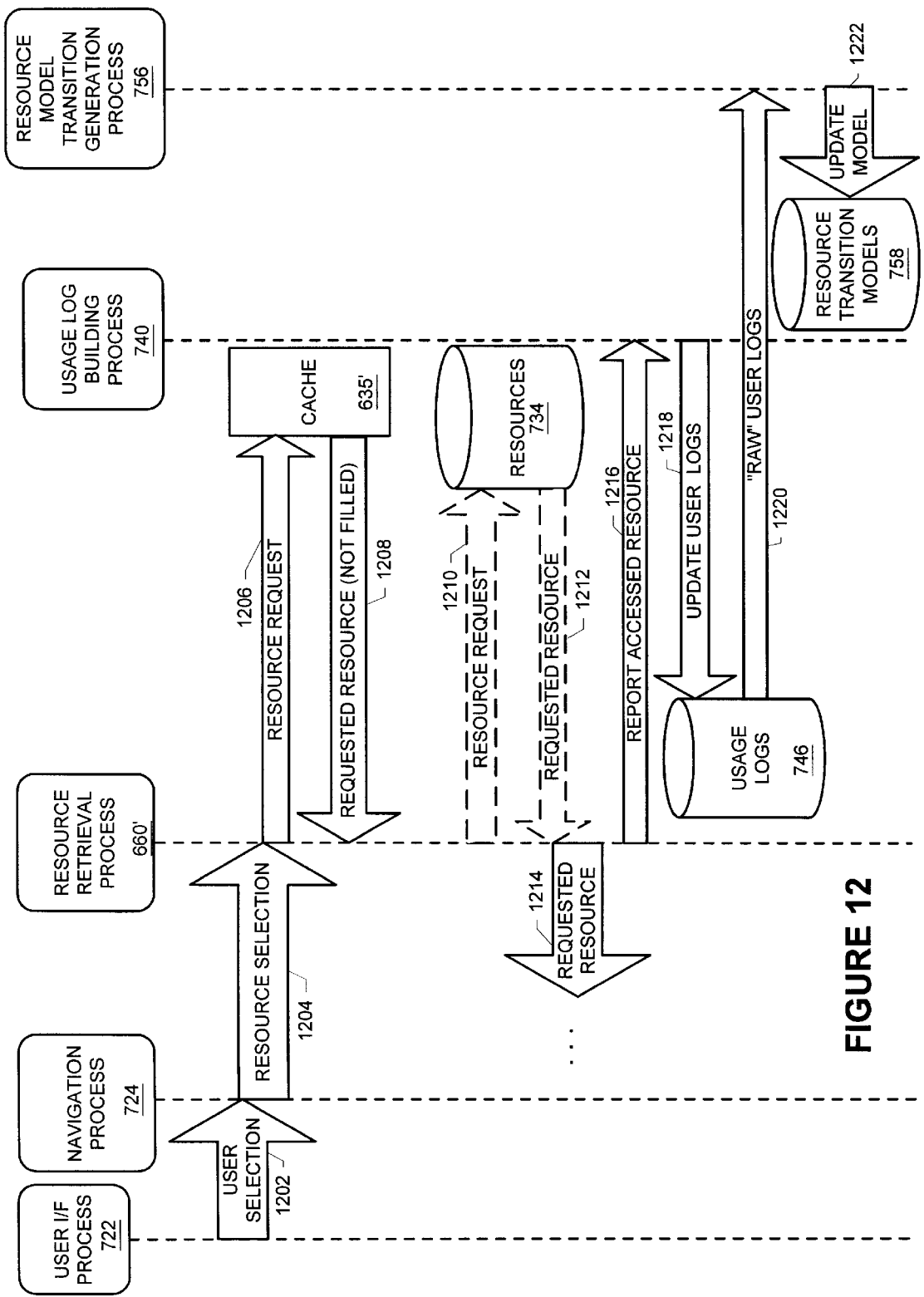
FIG. 12 is a more detailed messaging diagram of an exemplary server-side resource transition probability model building process of the present invention.
Figure 17:
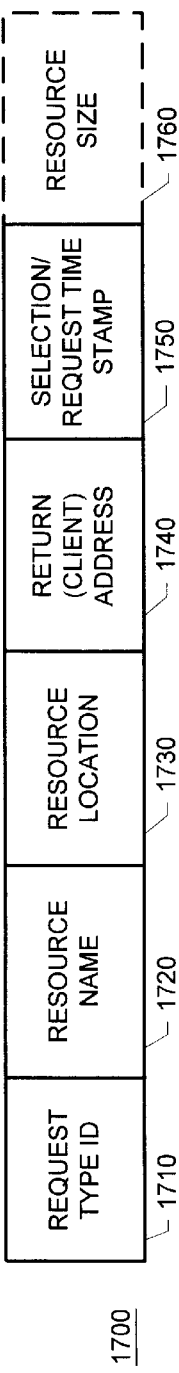
Figure 18:
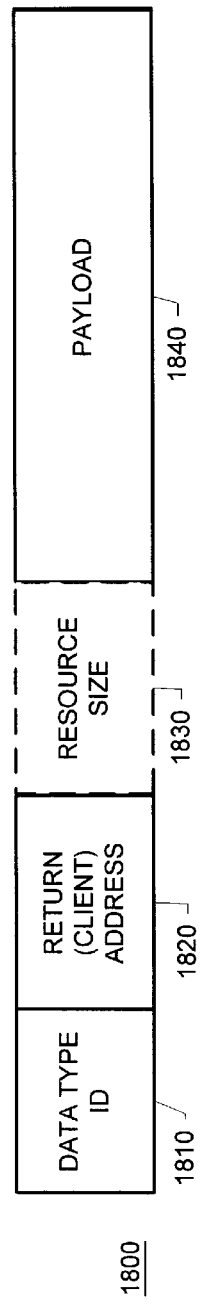

FIG. 11 is a high level messaging diagram of an exemplary server-side resource transition probability model building process carried out by the exemplary system 700. FIG. 12 is a more detailed messaging diagram of an exemplary server-side resource transition probability model building process of the exemplary system 700. FIG. 17 depicts an exemplary data structure for communicating a resource request, which may be used in the exemplary system 700 of FIG. 7a. FIG. 18 depicts an exemplary data structure for returning a resource, which may be used in the exemplary system 700 of FIG. 7a. Finally, FIG. 19 depicts an exemplary data structure for reporting a client resource cache hit (of a pre-fetched resource), which may be used in the exemplary system 700 of FIG. 7a.

At a high level, FIG. 17 depicts an exemplary data structure 1700 for communicating a resource request from a client 702 to a resource server 704. As shown in FIG. 17, the resource request data structure 1700 may include a request type ID field 1710, a resource name field 1720, a resource location field 1730, a return (client) address field 1740, a selection and/or request time stamp field 1750, and an optional resource size field 1760. The request type ID field will include data to indicate whether the request is the result of a user selection or a pre-fetch determination. The resource name field 1720 and/or the resource location field 1730 serve to identify the requested resource. The resource name field 1720 may be a URL file name which includes directories and sub-directories at which the resource is stored. The resource location field 1730 may be the Internet address of the resource server 704 at which the resource is stored. The return address field 1740 includes information (e.g., an Internet address) of a client 702 making the request so that the resource server knows where to return the requested resource. The return address field 1740 may also be the Internet address and a node of a proxy 630 through which the client 702 access the Internet. The time stamp field 1750 includes time at which the user selection, or resource request was made. Alternatively, this information is not needed if the resource server time stamps resource requests when they are received or returned. (However, as will be discussed below, if the resource is requested pursuant to a "pre-fetch" request, this field is not needed or is not used.) Finally, the optional resource size field 1760 may be provided to express the size (e.g., in bytes) of the requested resource. Such information may be used when determining whether sufficient bandwidth is available to pre-fetch the resource and/or whether sufficient idle processing time is available to pre-render the resource. A field including user identification information (not shown), such as a cookie or a global unique identifier (or "GUID") for example, may also be included in the data structure 1700.

At a high level, FIG. 18 depicts an exemplary data structure 1800 for communicating a resource or other data, such as a resource transition probability list, from a resource server 704 to a requesting client 702. As shown, the data structure 1800 includes a data type ID field 1810, a return (client) address field 1820, an optional resource size field 1830, and a payload section 1840. The data type ID field 1810 may be used to identify the type of data carried on the payload 1840. For example, the data may be a selected resource, a pre-fetch resource, or a resource transition probability list. The return address field 1820 includes address information (such as the Internet address of a client 702 or proxy 630) which permits the data to be forwarded to the appropriate entity. The optional resource size field 1830 includes information regarding the size (e.g., number of bytes) of the data carried in the payload 1840. If the payload includes a resource, it should also include the address of the resource.

Figure 19:
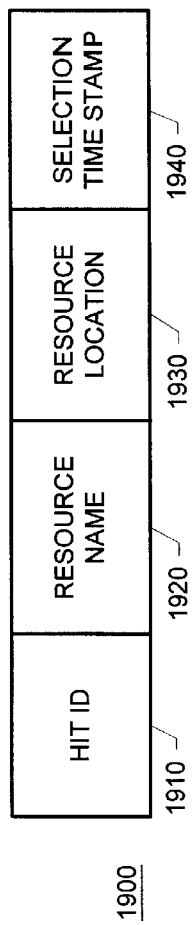

At a high level, FIG. 19 depicts an exemplary data structure 1900 for reporting a client resource cache hit (of a pre-fetch resource) from a client 702 to a resource server 704. The data hit report data structure 1900 may include a hit ID field 1910, a resource name field 1920, a resource location field 1930, and an optional selection time stamp field 1940. The hit ID field 1910 identifies the message as a resource cache hit report message. The resource name and location fields 1920 and 1930, respectively, correspond to the resource name and location fields 1720 and 1730, respectively, of resource request data structure 1700 discussed above with reference to FIG. 17. The optional selection time stamp field 1940 includes information which indicates a time at which a user selected a resource which was found at the client resource cache. This field is not needed if the resource server 704 time stamps the message 1900. A field including user identification information (not shown), such as a cookie or global unique identifier (or "GUID") for example, may also be included in the data structure 1900.

Referring first to FIGS. 7, 9a and 9b, and 11, the client 702 submits a resource request 1102 to the resource server 704. Referring back to FIG. 17, the request 1102 may have data structure 1700. The resource server relays a request 1104 for the resource, first to the resource cache 635', and then, in the event of a cache "miss", to the resource storage area 734. The resource 1106 is returned to the server 704 which, in turn, returns the resource 1107 to the client 702. Referring back to FIG. 18, the returned resource 1106 may be in the payload 1840 of data structure 1800. The further processing of the resource at the client 702 is irrelevant for purposes of describing the server-side resource transition probability model. If the request 1102 was the result of a user selection, not a pre-fetch determination, the resource server 704 then sends a log 1108 of the request and provision of the resource to usage log 746. At some predetermined time, the analysis server 750 submits a request 1110 for the usage logs 746. The requested logs 1112 are returned in response. After the usage logs are merged, filtered, and provided to a resource transition model generation process, the resource transition probabilities 1114 are provided to the resource transition probability model storage area 758.

Referring now to FIGS. 7 and 12, the flow of data and messages between the processes of system 700 is now described. In the following description, for purposes of simplicity, the input/output interface processes 610', 650' and 752 of the client 702, resource server 704, and analysis server 750, respectively, and the networking process 640 are not shown in FIG. 12. First, the user interface process 722 provides a user selection message 1202 to the navigation process 724. The user selection message may be generated by the user interface process 722 based on a user input, such as a mouse click on a hyper-text link of an HTML page. The navigation process 724 forms a resource selection request 1204 which is forwarded, via the input/output interface process 610', optional proxy 630, networking process 640, and input/output interface process 650', to the resource retrieval process 660'. Referring back to FIG. 17, the resource request communication 1204 may be in the form of data structure 1700. The request type ID field 1710 will indicate that the request is pursuant to a user selection. Information in the other fields will be as discussed above with reference to FIG. 17. In response, the resource retrieval process 660' first forms a resource request 1206 to the server's resource cache 635'. If the resource is available from the resource cache 635', it is returned in communication 1208. If, on the other hand, the resource is not available from the resource cache 635', it is returned as a miss in communication 1208. Further, if the resource was not available from the resource cache 635', the resource retrieval process 660' submits a request 1210 for the resource, via the input/output interface process 650', to the resource storage area 734, and the requested resource is returned in communication 1212.

Whether the resource is obtained from the resource cache 635' or the resource storage area 734, it is returned to the navigation process 724 of the requesting client 702 in communication 1214. Referring back to FIG. 18, the communication 1214 may be in the form of the data structure 1800. The data type ID field 1810 of the data structure will indicate that the payload 1840 contains a selected resource. Before, after, or concurrently with the communication 1214, the resource retrieval process 660' reports the access of the resource in communication 1216 to the usage log building process 740. The usage log building process 740 provides an update 1218 to the usage logs stored in storage area 746.

At a predetermined time, user logs are transmitted, via input/output interface process 650', and input/output interface process 752, to resource model transition generating process 756. Although not shown in FIG. 12, these logs may first be provided to the filter and merge process 754. The provision of the usage logs may be in response to a request generated at the resource server 704 or in response to a request (not shown) generated by the analysis server 750. Finally, the resource model transition generation process 756 provides an updated model (or new or replacement model), in communication 1222, to the storage area 758 for the resource transition probability models.

Having described the function, structure, and operation of an exemplary system for building a server-side resource transition probability model(s), the use of such models, for example to pre-fetch resources or to edit the topology of a resource site, will be discussed below. The source of the server-side resource transition probability model is not particularly relevant for purposes of the pre-fetching and editing applications; the models may be generated internally (as described) or purchased or accessed from an independent entity.

§3. PRE-FETCHING USING SERVER-SIDE MODEL

As discussed above, resource pre-fetching can be used to better utilize processing resources and bandwidth of communications channels. In general, resource pre-fetching by the client utilizes idle bandwidth, and resource pre-fetching by the resource server utilizes idle processing and/or data bus resources of the server. Although resource pre-fetching may occur at both the client and the server, each type of pre-fetching will be separately described.

§3.1 CLIENT PRE-FETCHING

§3.1.1 FUNCTION OF PRE-FETCHING USING SERVER SIDE MODEL

Basically, after a client 702 receives a requested resource, bandwidth on a communications path between the client 702 and the server 704 is available, while the resource is being rendered by the resource rendering process 726 or while a user is sensing and/or interpreting the rendered resource. The present invention permits this idle communications bandwidth to be exploited. More specifically, based on the previously requested resource (or based on previously requested resources), a list of transitions to other resources, in descending order of probability, is used to pre-fetch other resources. Such pre-fetched resources are stored at a client resource cache 624'.

§3.1.2 STRUCTURE OF PRE-FETCHING USING SERVER-SIDE MODEL

The structure of the pre-fetching system 700 is similar to that described above with reference to FIG. 7a. However, if the resource transition probability models are purchased from a third party, the processes 752, 754 and 756 of the analysis server 750 are not needed.

§3.1.3 OPERATION OF PRE-FETCHING USING SERVER-SIDE MODEL

In many instances, particularly with modem-based communications, a communication channel is maintained between the client and the server. While the client is rendering resources or a user is sensing (e.g., viewing, reading, and/or listening to) the rendered resource, the maintained communications channel is idle. Similarly, when the user is sensing the rendered resource, processing resources of the client may be relatively idle. Further, the processing resources of the server may be idle at times. The pre-fetching aspect of the present invention exploits such idle communications and processing resources.

The operation of resource pre-fetching using a server-side resource transition probability model will now be described with reference to FIGS. 7, 13, 14, 15, 16a and 16b. Basically, when a client 702 requests a resource in response to a user selection, the server 704 returns the requested resource and a resource transition probability list to the client 702. Under appropriate conditions (e.g., idle bandwidth on a communications channel between the client 702 and server 704), the client will pre-fetch a resource based on the list.

Figure 13:
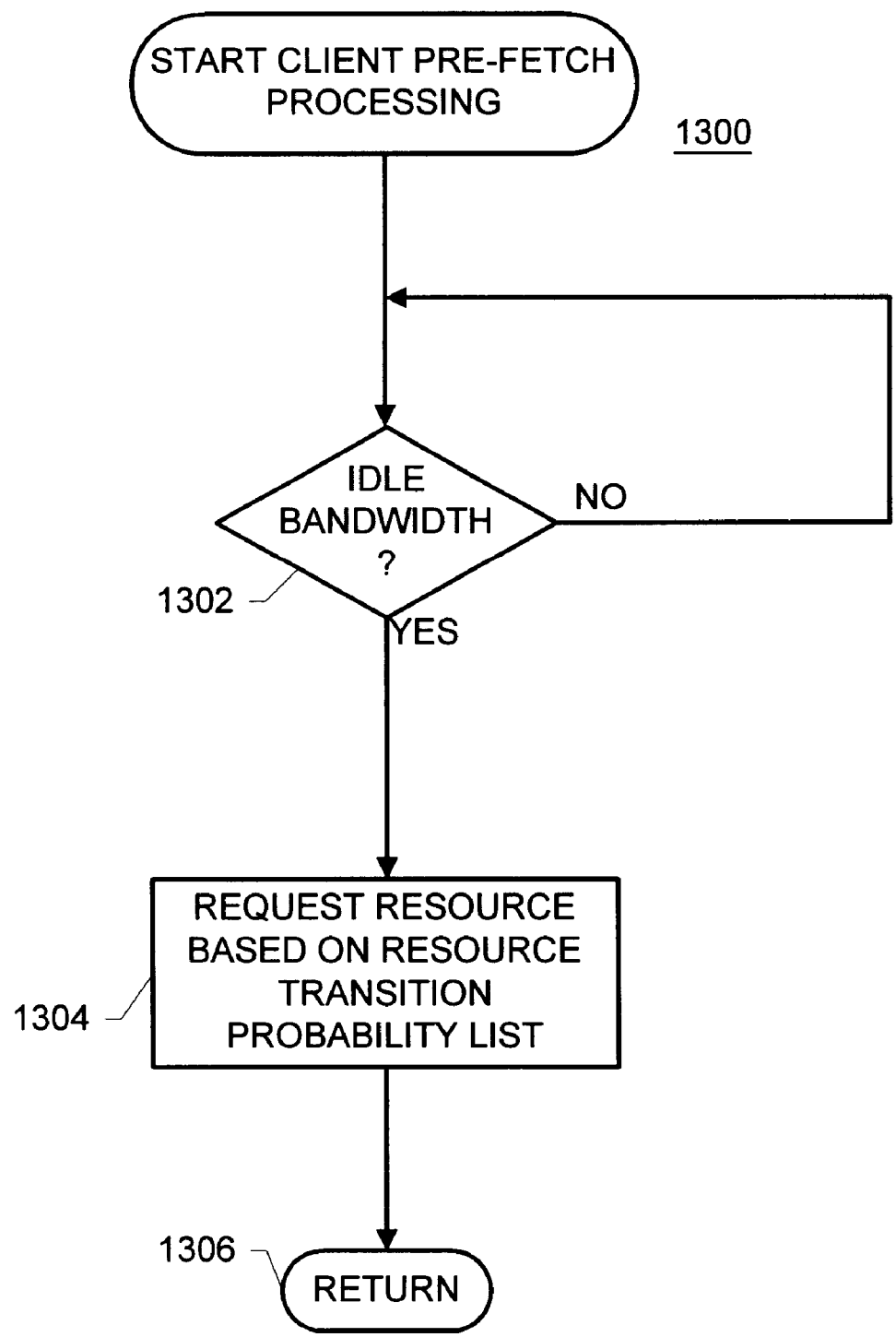
FIG. 13 is a flow diagram of processing, carried out by a client, in a pre-fetching process of the present invention.

FIG. 13 is a flow diagram of processing, carried out by a client, in a pre-fetching process 1300 of the present invention. First, as shown in decision step 1302, the communications path between the client 702 and the resource server 704 is monitored, in a known way, to determine whether or not idle bandwidth is available. If idle bandwidth is available, then, as shown in steps 1302 and 1304, a resource is requested based on the resource transition probability list 732. More specifically, the most probable transition from the last requested resource is determined based on the ordered list from the resource transition probability model. The resource associated with the most probable transition is then pre-fetched. These steps may be carried out by pre-fetch process 730.

Figure 14:
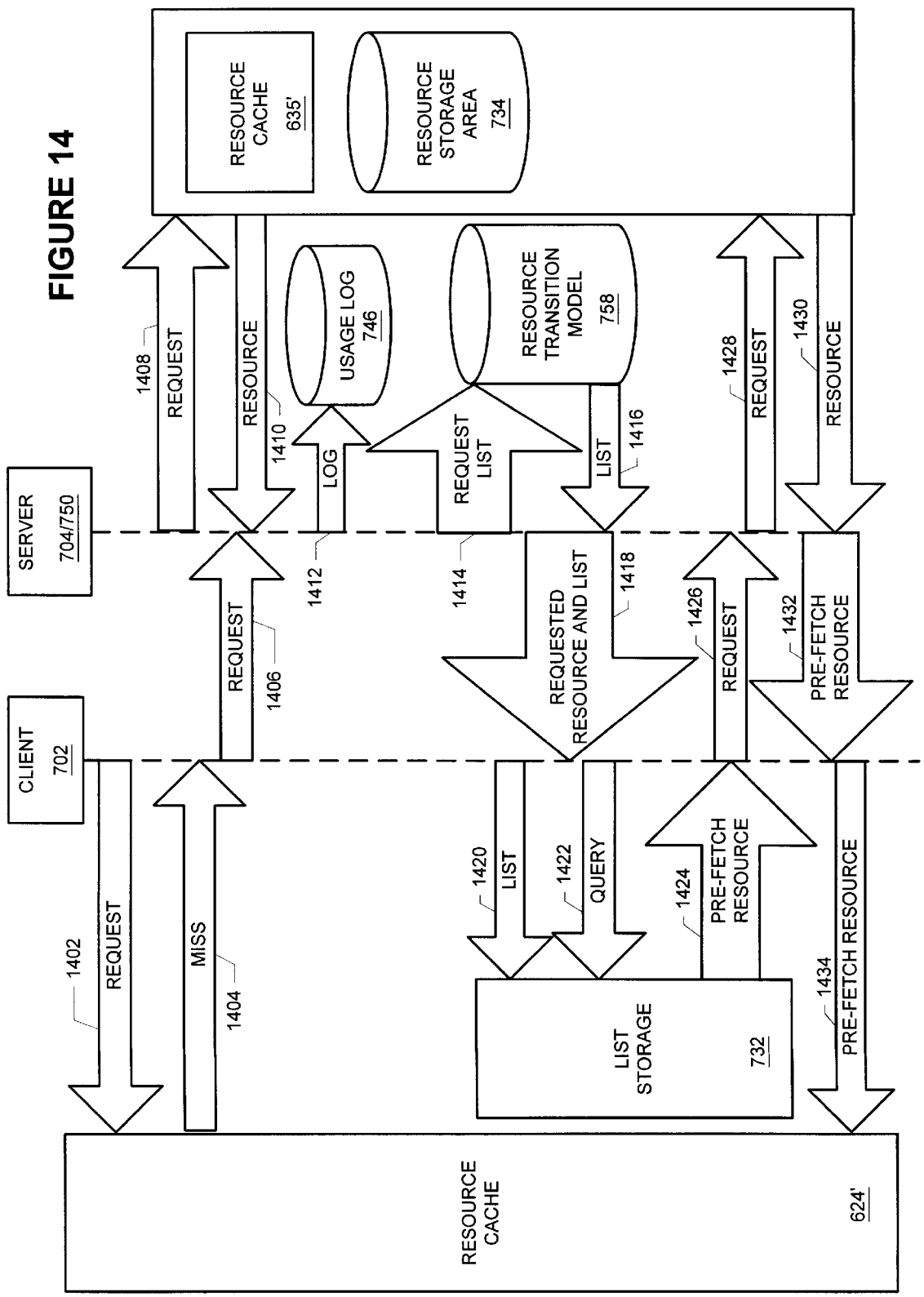
FIG. 14 is a high level messaging diagram of an exemplary process for pre-fetching resources based on a resource transition probability model.
Figure 15:
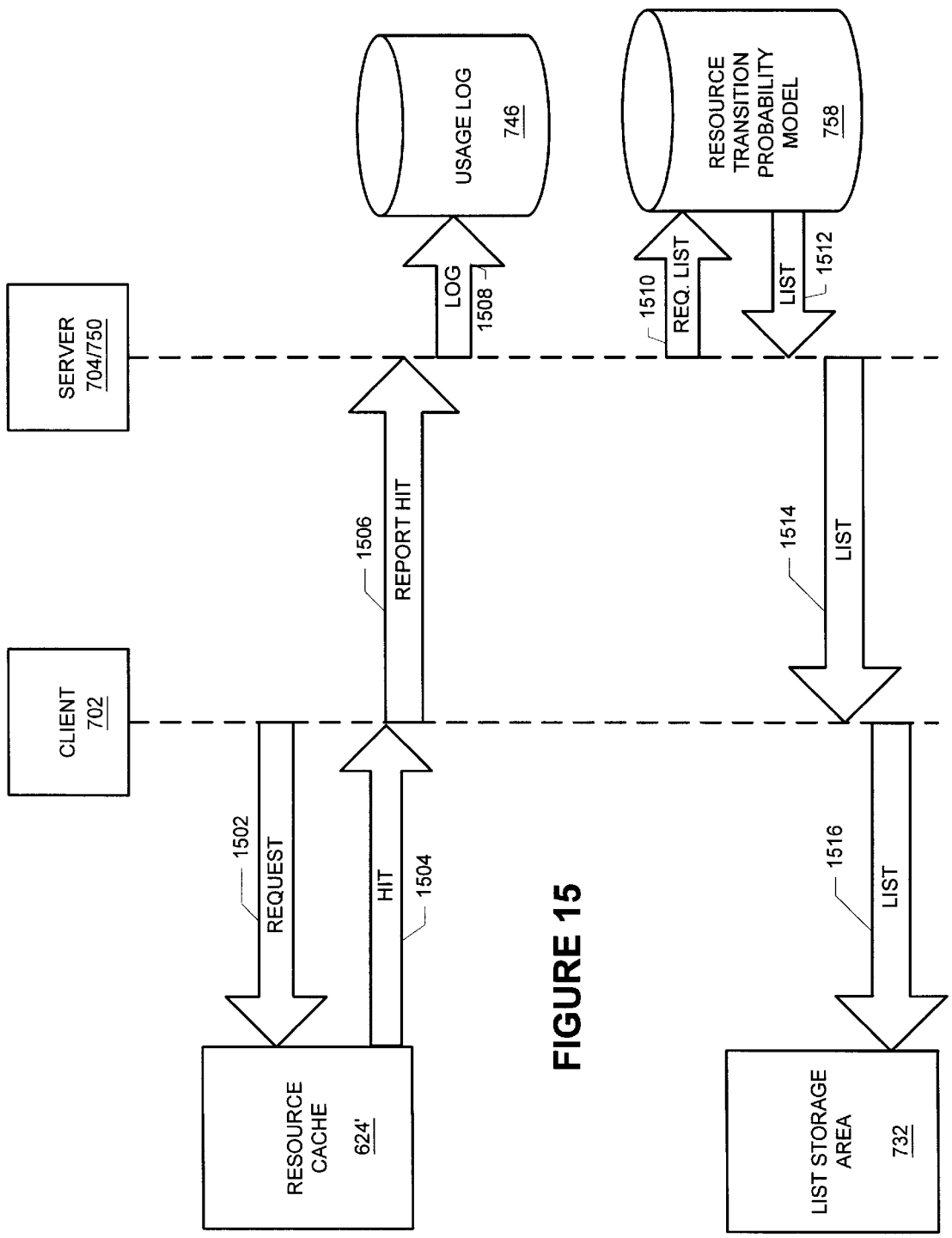
FIG. 15 is a high level messaging diagram of an exemplary process of logging resource transitions to cached resources.
Figure 16A:
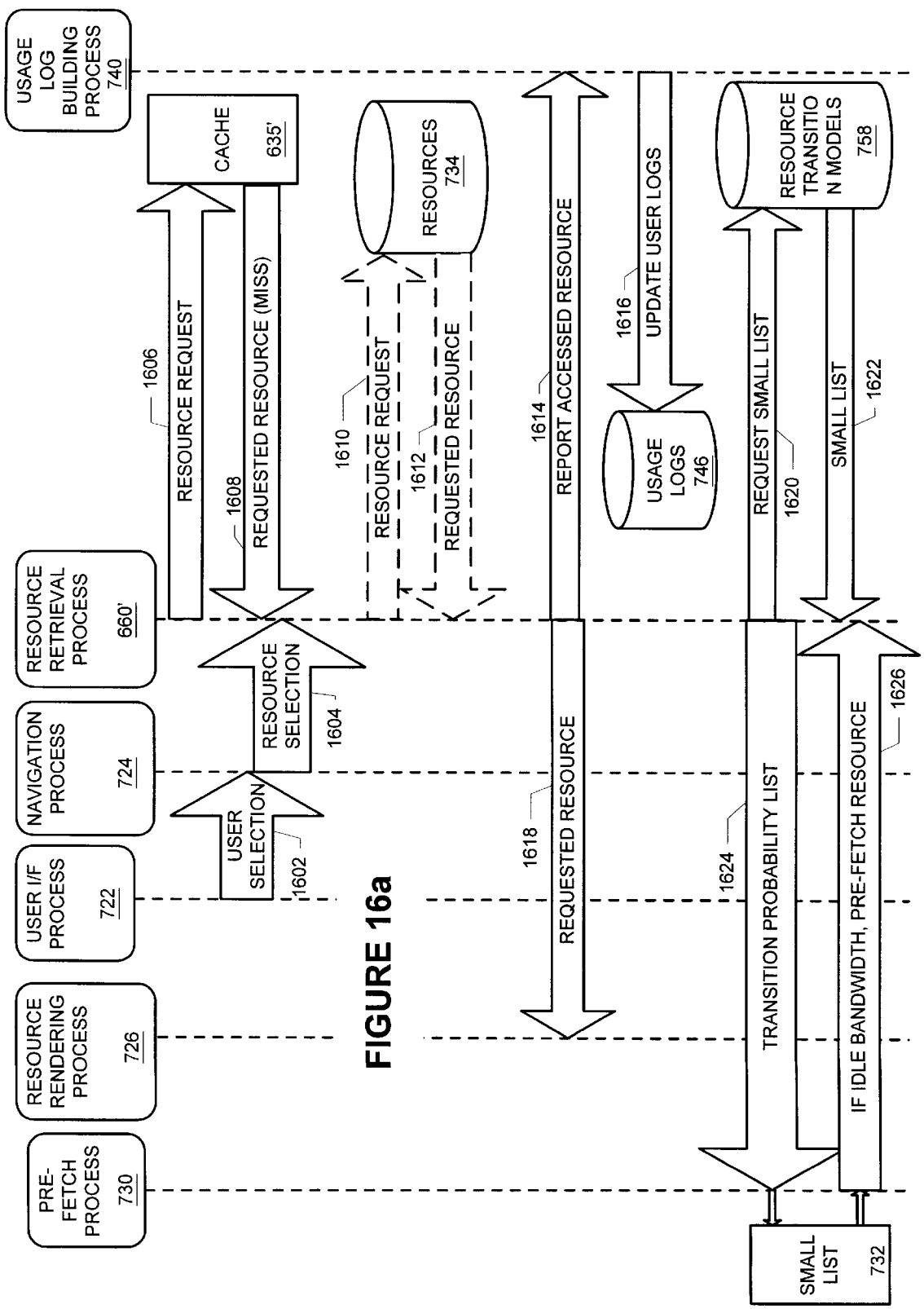
FIGS. 16a and 16b, collectively, are a messaging diagram of an exemplary process for pre-fetching resources based on a resource transition probability model.
Figure 16B:
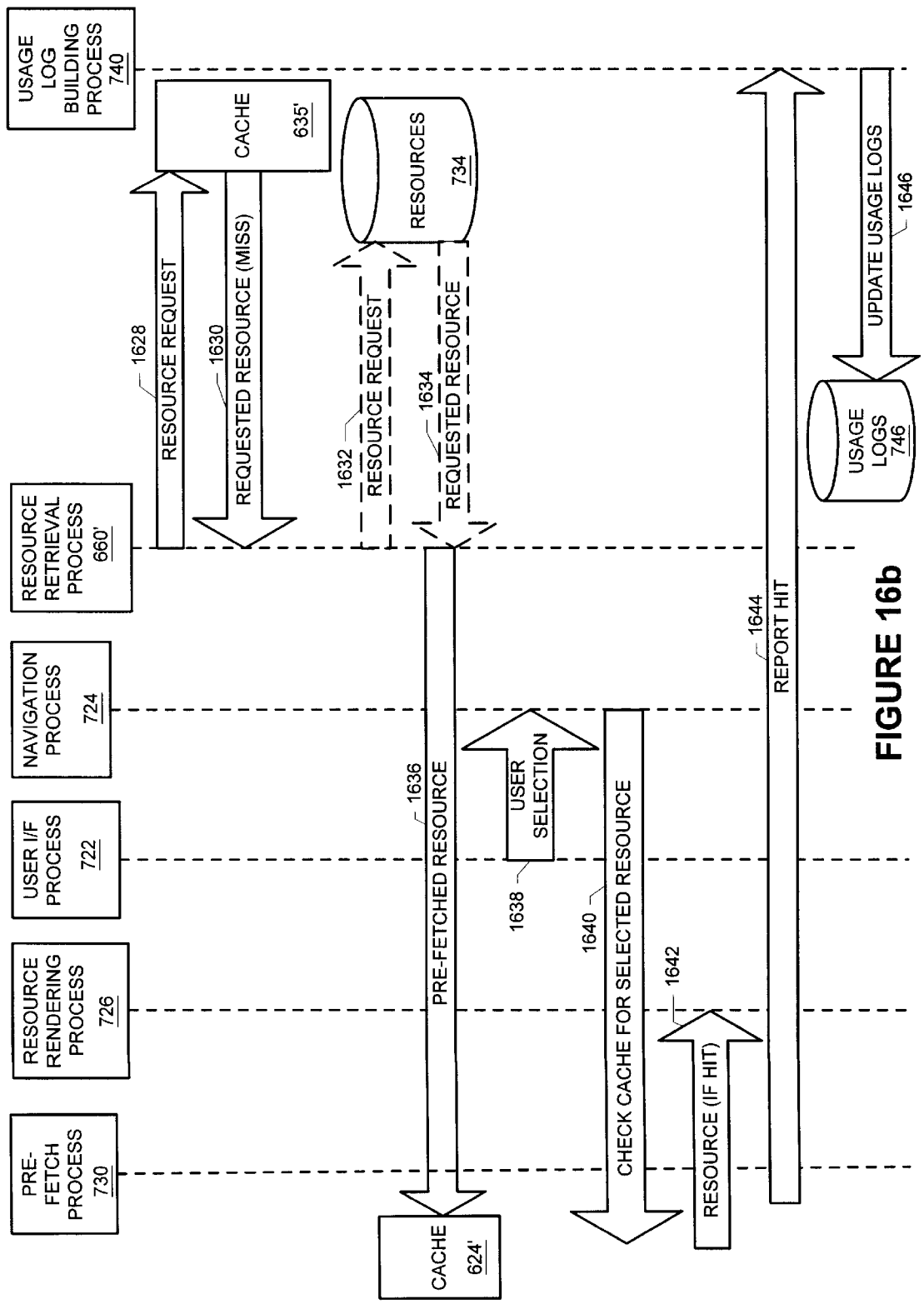

FIG. 14 is a high level messaging diagram of an exemplary process for pre-fetching resources based on a resource transition probability model. FIG. 15 is a high level messaging diagram of an exemplary process of logging resource transitions to cached resources. FIGS. 16a and 16b, collectively, are a messaging diagram of an exemplary process for pre-fetching resources based on a resource transition probability model. In the following description, for purposes of clarity, the input/output interface processes 610' and 650' and 752 of the client 702, resource server 704 and analysis server 950, respectively, and the networking process 640 are not shown in FIGS. 14, 15, 16a, and 16b.

Referring first to FIGS. 7 and 14, a client 702 desires a resource to render. The client 702 first submits a request 1402 to its own resource cache 624' to determine whether or not the resource is available at its resource cache 624'. If the resource is available at its resource cache 624', the resource is returned and rendered. However, in this example, it is assumed that the resource is not available from the resource cache 624'. Accordingly, a cache miss message 1404 is returned. In response, the client 702 then submits a request 1406 for the resource to the resource server 704. Referring back to FIG. 17, the request 1406 may be in the form of data structure 1700. In this case, the request type ID field 1710 will have data which indicates that the request was made pursuant to a user selection. The resource server 704 submits as shown in FIG. 14, a request 1408 for the resource. The requested resource is returned, either from the resource cache 635' or the resource storage area 734, in communication 1410. A log 1412 of the request and provision of the resource is provided to a usage log storage area 746. Before, after, or concurrently with communications 1408, 1410, and 1412, the server 704 submits a request 1414 for a rank ordered list of transition probabilities from the requested resource to other resources. In response, such a rank ordered transition probability list 1416 is returned.

The server 704 then returns the requested resource and the rank ordered transition probability list in communication 1418 to the client 702. Referring back to FIG. 18, the communication 1418 may be in the form of one or more data structures 1800. In a first data structure 1800, information in the data type ID field 1810 will indicate that the payload 1840 includes selected resource data. In a second data structure 1800, information in the data type ID field 1810 will indicate that the payload 1840 includes a resource transition probability list. The client 702 renders the resource and provides the list to the small model list storage area 732 in communication 1420, shown in FIG. 14.

Under certain circumstances (e.g., idle bandwidth available), the client 702 will submit a query 1422 for the most probable resource transition. In response, an identification of a resource to be pre-fetched is returned in communication 1424. The client 702 then submits a request 1426 for the pre-fetch resource to the resource server 704. Referring again to FIG. 17, if the communication 1426 is in the form of data structure 1700, the request type ID field 1710 will include data which identifies the resource request as being pursuant to a pre-fetch determination. In one embodiment, the resource server will only service a pre-fetch request if it has sufficient idle processing and/or data bus resources; the pre-fetch request has a lower priority than requests for resources resulting from a user selection. The resource server 704 then submits a request 1428 for the requested pre-fetch resource. The requested pre-fetch resource is returned, either from the resource cache 635' or the resource storage area 734, in communication 1430. Note that the resource server 704 does not, at this time, log the requested pre-fetch resource. This prevents the model building process of the present invention from creating a "self fulfilling prophecy". That is, the resource transition probability model should not be updated merely on the basis of its own predictions. The user of the client 702 must actually request rendering of the pre-fetched resource. The resource server 704 then communicates the pre-fetched resource, in communication 1432, to the client 702. If the communication 1432 is in the form of data structure 1800, the data type ID field 1810 will include information which indicates that the payload 1840 has pre-fetch resource data. The client 702 then sends the pre-fetched resource, in communication 1434, to the resource cache 624'. The pre-fetched resource is now available at the resource cache 624' of the client 702 should it be requested.

In a modified embodiment, the pre-fetched resource is marked as a "low priority" resource for purposes of cache flushing and cache replacement algorithms. That is, if the cache becomes full and more space is needed, pre-fetched resources are more likely to be removed from the cache 624' than other resources.

In addition to being cached, if processing resources of the client 702 are sufficiently idle, then the client 702 may begin pre-rendering processing of the pre-fetched resource.

Referring now to FIG. 15, data communications, which occur when a pre-fetched resource is requested to be rendered, are shown. Recall from the discussion of FIG. 14 above that the return of a requested pre-fetch resource is not logged when retrieved by the resource server 704 in order to prevent the predictions from reinforcing themselves. As shown in FIG. 15, a client 702 first requests a resource to be rendered. A request 1502 is first submitted to the resource cache 624' of the client 702. In this instance, it is assumed that the requested resource had been pre-fetched and stored at the client's resource cache 624'. Accordingly, a cache hit and the requested resource are returned in communication 1504. In order to permit the resource transition probability model to reflect this, the cache hit is reported in message 1506 from the client to the resource server 704. Referring to FIG. 19, the report hit message 1506 may be in the form of data structure 1900. In response to the hit message, the server 704 submits a log 1508 to the usage log storage area 746. In one embodiment, the resource server 704 will also return a resource transition probability list for the pre-fetched and rendered resource as shown in communications 1510, 1512, 1514 and 1516.

FIGS. 16*a* and 16*b*, collectively, are a messaging diagram of an exemplary process for pre-fetching resources based on a resource transition probability model. Referring now to FIGS. 7, 16*a*, and 16*b*, the operation of the exemplary system, in which resources are pre-fetched based on a resource transition probability model, is described.

The client 702 processes a user resource selection as follows. A user selection is made (e.g., via a graphic user interface by double clicking a mouse when an arrow is on a hyper-text link) and the user interface process 722 communicates the user selection, in communication 1602, to the navigation process 724. In response, the navigation process 724 submits a resource selection request 1604 (e.g., via input/output interface process 610', networking process 640, and input/output interface process 650') to the resource retrieval process 660' of the resource server 704. Referring again to FIG. 17, the resource selection 1604 may be in the form of data structure 1700. If so, the request type ID field 1710 should have information which identifies the resource request as being made pursuant to a user selection.

The server 704 services the resource selection 1604 as follows. The resource retrieval process 660' will submit a request 1606 for the selected resource to its resource cache 635'. If the selected resource is available from the resource cache 635', it is returned to the resource retrieval process 660' in communication 1608. If, on the other hand, the selected resource is not available from the resource cache 635', a cache miss indication is returned to the resource retrieval process 660' in communication 1608. In this latter case, the resource retrieval process 660' will submit a request 1610 for the selected resource (e.g., via input/output interface process 650') to the resource storage area 734. The requested resource is then returned to the resource retrieval process 660' in communication 1612. Thus, the resource retrieval process 660' will obtain the selected resource, either from the resource cache 635' or from the resource storage area 734.

The server 704 will also log the returned resource as follows. The resource retrieval process 660' will then report the accessed resource, as well as the user accessing the resource and time of the selection by the user and/or of the retrieval, to the usage log building process 740 via communication 1614. In response, the usage log building process 740 will update the usage logs 746 via communication 1616.

Before, after or concurrently with the communication 1616, the resource retrieval process 660' will return the requested resource (e.g., via input/output interface process 650', networking process 640, and input/output interface process 610'), in communication 1618, to the resource rendering process 726 of the browser process 620' of the client 702. Referring again to FIG. 18, the communication 1618 may be in the form of data structure 1800. In this case, the data type ID field 1810 will have information which indicates that the payload 1840 includes a selected resource. The resource is then rendered by the client 702.

Based on the selected resource retrieved, the resource retrieval process 660' will submit, as shown in FIG. 16*a*, a request 1620 for a small (ordered) transition probability list (e.g., via input/output interface processes 650' and 752, assuming separate resource and analysis servers) to the resource transition probability model storage area 758. The requested list is returned to the resource retrieval process 660' in communication 1622. The resource retrieval process then communicates the list (e.g., via input/output interface process 650', networking process 640, and input/output interface process 610') to the pre-fetch process 730 of the browser process 620' of the client 702. Alternatively, the request 1620 for the small list may include the resource and the network address of the client 702. In this case, the analysis server 750 can communicate the small list directly to the pre-fetch process 730 of the client 702. Naturally, the communication 1618 of the requested resource and the communication 1624 of the small list can be combined into one communication. Furthermore, if separate communications are made, the temporal order of the communications should not matter.

Resource pre-fetching may occur as follows. Thereafter, if idle bandwidth exists on the communications path between the client 702 and the resource server 704, the pre-fetch process 730 will formulate a pre-fetch resource request based on the small list storage at storage area 732. This pre-fetch resource request is communicated, as communication 1626, to the resource retrieval process 660'. Referring again to FIG. 17, the communication 1626 may be in the form of data structure 1700. In this case, the request type ID field 1710 will indicate that the resource request was made pursuant to a pre-fetch operation.

The resource server 704 may service the pre-fetch request as follows. As was the case with communications 1606, 1608, 1610, and 1612, discussed above, the resource retrieval process 660' will submit, as shown in FIG. 16*b*, a request 1628 for the pre-fetch resource to its resource cache 635'. If the pre-fetch resource is available from the resource cache 635', it is returned to the resource retrieval process 660' in communication 1630. If, on the other hand, the pre-fetch resource is not available from the resource cache 635', a cache miss indication is returned to the resource retrieval process 660' in communication 1630. In this latter case, the resource retrieval process 660' will submit a request 1632 for the pre-fetch resource (e.g., via input/output interface process 650') to the resource storage area 734. The requested resource is then returned to the resource retrieval process 660' in communication 1634. Thus, the resource retrieval process 660' will obtain the pre-fetch resource, either from the resource cache 635' or from the resource storage area 734. To reiterate, pre-fetch requests may be given low priority by the resource server 704. That is, resource requests resulting from user selections may be given higher priority than those resulting from pre-fetch determinations.

Since the rendering of the pre-fetch resource is merely a prediction at this point, rather than being provided to the resource rendering process 726 of the browser process 620' of the client 702, the pre-fetch resource is communicated, in communication 1636, (e.g., via input/output interface process 650', networking process 640, input/output interface process 610' and pre-fetch process 730) to the cache management process 728 (not shown in FIG. 16*b*) which stores the pre-fetched resource in resource cache 624'. Referring to FIG. 18, the communication 1636 may be in the form of data structure 1800. In this case, the data type ID field 1810 will indicate that the payload 1840 includes a pre-fetch resource. The pre-fetch resource may be (a) an entire HTML page with all associated resources, (b) resources, represented by large data files (e.g., large images), associated with the HTML page but not the page itself, or (c) the HTML page only. Thus, if a user selects a pre-fetch resource, other related resources may be needed. In such cases, the address of the pre-fetch resource must be stored so that the other related resources, which might, for example, only be addressed by a sub-directory, may be accessed. Notice also that the usage logs are not updated merely on the basis of the return of the requested pre-fetch resource. To reiterate, the usage logs are not updated at this time so that the resource transition prediction model will not be self-reinforcing.

Rendering of pre-fetched and cached resources may occur as follows. Later, the user at the client 702 may request another resource. This selection is indicated by communication 1638 from the user interface process 722 to the navigation process 724. In response the resource selection, the navigation process 724 will first want to check the resource cache 624' of the client 702. This check is made, in communication 1640, to the cache management process 728 (not shown in FIG. 16*b*). Assuming that the user has selected a resource that had been pre-fetched (see e.g., communication 1636), the cached and pre-fetched resource is provided, in communication 1642, to the resource rendering process 726 which renders the selected resource to the user. If only a portion of the selected resource was pre-fetched and cached, requests for other related resources may be issued to the server 704. The address information of the pre-fetched and cached resource and the address information (which might be only a partial address) of the related resource(s) are combined (e.g., concatenated) so that the related resource(s) may be accessed. In further response to the resource cache hit, the cache management process 728 (not shown in FIG. 16*b*) reports the cache hit, in communication 1644, to the user log building process 740. Referring back to FIG. 19, the communication 1644 may be in the form of data structure 1900. Only at this time does the usage log building process 740 update the user logs 746 via communication 1646. Recall from communications 1510, 1512, 1514 and 1516, that the resource server 704 may communicate a resource transition probability list to the client when the pre-fetched and cached resource is rendered.

As discussed above with reference to building server-side resource transition probability models, different resource transition probability models may be built based on different "clusters" of similar users. A user accessing the resources of the server may initially use weighted resource transition probability models (built from usage logs of clusters of similar users) based on a prior distribution of all users for pre-fetching resources. As more information is gathered about the user, the weighting is updated.

§3.2 SERVER PRE-FETCHING

§3.2.1 FUNCTION OF PRE-FETCHING USING SERVER SIDE MODEL

Referring to FIG. 7*a*, recall that the resource server 704 may also be provided with a resource cache 635'. During times when the server 504 has available (or idle) processing resources, the server may load resources into its resource cache 635' based on the resource transition model and based on the resource(s) most recently requested by a server. Whether or not data bus (e.g., a SCSI bus) resources are available may also be checked. In this way, resources likely to be requested are made available in faster cache memory.

§3.2.2 STRUCTURE OF PRE-FETCHING USING SERVER-SIDE MODEL

The present invention may operate in a system 500 shown in FIG. 5 when the processor(s) 532 execute appropriate program instructions. The storage devices(s) 534 should include a resource cache 635', a section 534'*a* for storing name(s) of resource(s) most recently requested by server(s), and a section 534'*b* for storing resource transition probability lists. The resource cache 635' and storage sections 534'*a* and 534'*b* (see FIG. 22) may be logically or physically segmented such that a logically or physically separate memory area is available for each of a number of clients 502 accessing the server 504.

§3.2.3 OPERATION OF PRE-FETCHING USING SERVER-SIDE MODEL

Figure 21:
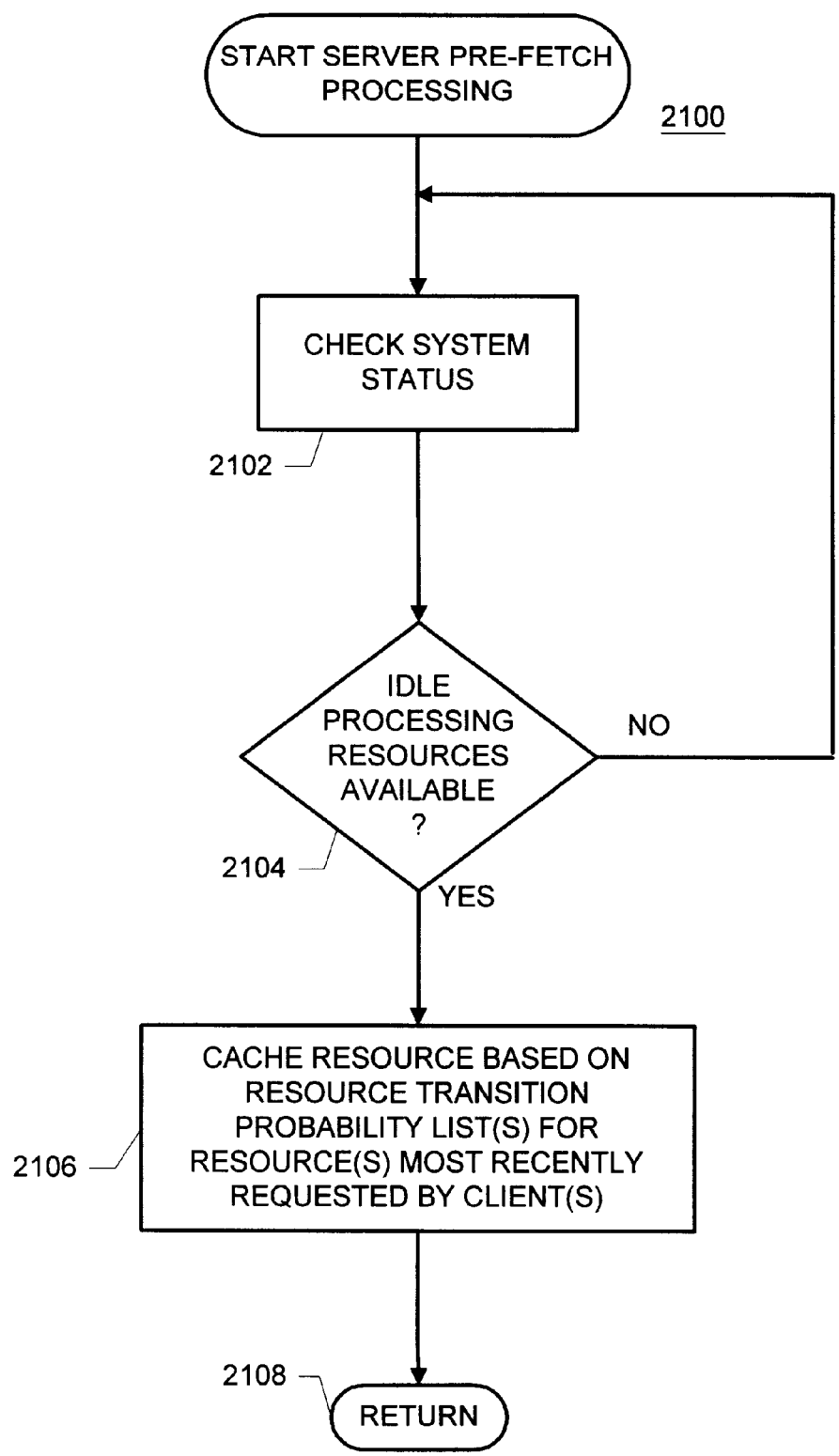
FIG. 21 is a flow diagram of a server pre-fetch process which uses a server-side resource transition probability model.

An example of the operation of server pre-fetching using a server-side resource transition probability model is described with reference to FIGS. 21 and 22. FIG. 21 is a flow diagram of a server pre-fetch process 2100 which utilizes the above discussed server-side resource transition probability model. First, as shown in step 2102, system status is checked. More specifically, whether or not processing (and/or data bus) resources are available (i.e., idle processing resources) is determined. Pre-fetch cache space availability may also be checked. The pre-fetch cache may: (a) be a predetermined size, or (b) share memory space, in which case such shared memory space is rationed based on hit-to-miss ratios of the pre-fetched resources. Referring now to decision step 2104 and step 2106, if idle processing (and/or data bus) resources are available, a resource is cached based on a resource transition probability list for a resource most recently requested by a client. Note that the step 2106 may be carried out for individual clients or for all clients collectively. Operation continues as shown by return step 2108.

Figure 22:
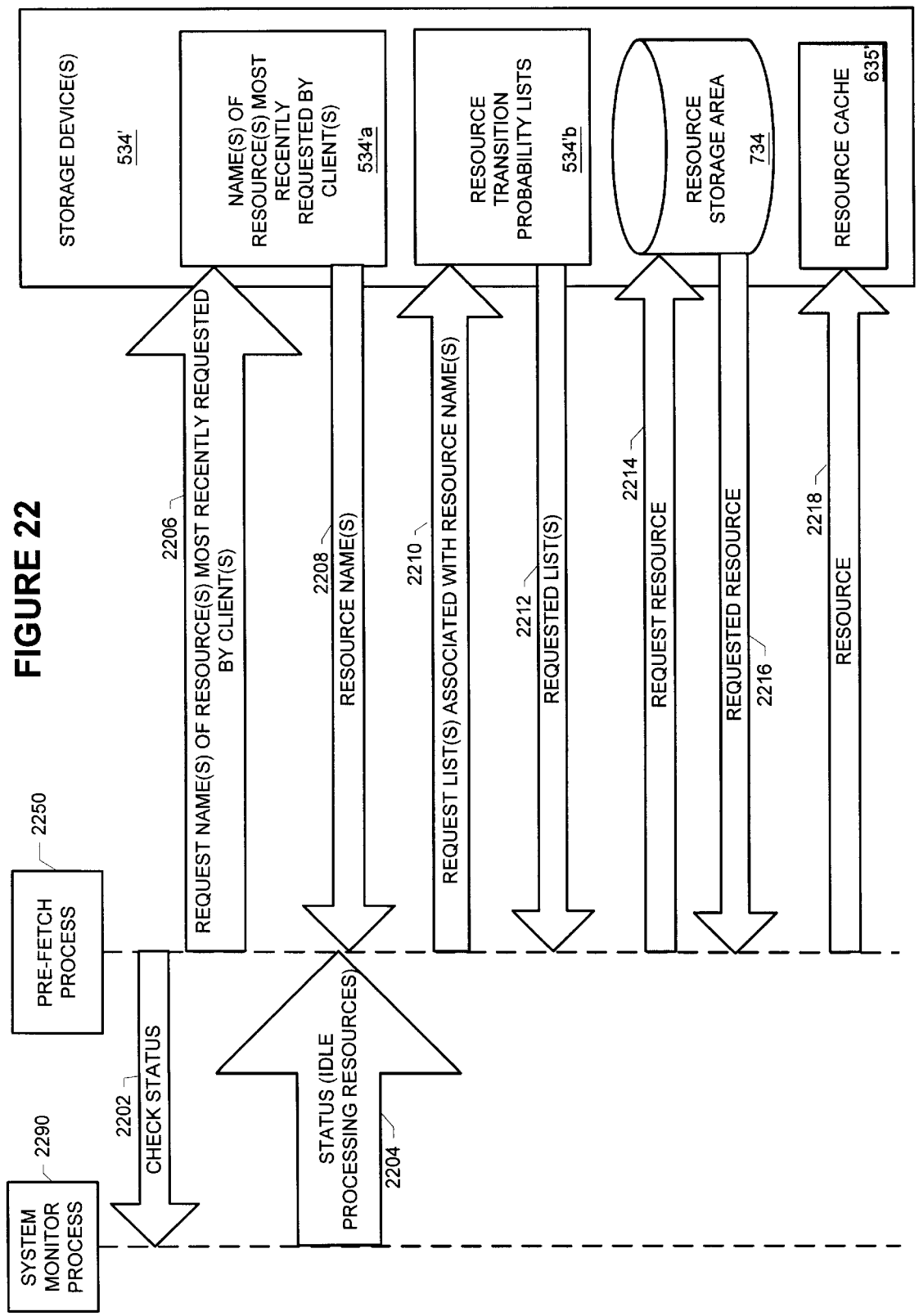
FIG. 22 is a messaging diagram of a server pre-fetch process which uses a server-side resource transition probability model.

FIG. 22 is a message flow diagram of a server pre-fetch process which uses the above discussed server-side resource transition probability model. In this example, also referring to FIGS. 6 and 7, it is assumed that the resource retrieval process 660/660' includes a pre-fetch process 2250. In addition, a system monitor process 2290, which may be carried out in a known way, is available. For example, an operating system may carry out system monitoring functions. First, as shown in communication 2202, the pre-fetch process 2250 queries the system monitor process 2290 regarding the system status, and in particular, whether or not idle processing (and/or data bus) resources are available. In response to this query, the system monitor process 2290 returns a status message which may include information which indicates whether or nor, or to what degree, idle processing (and/or data bus) resources are available. In the following, it is assumed that idle processing (and/or data bus) resources are available to such an extent that resources may be cached.

Since idle processing (and/or data bus) resources are available, the pre-fetch process 2250 will take this opportunity to pre-fetch resources likely to be requested. Note that the following pre-fetch processing may take place for clients on an individual basis or on a collective basis. More specifically, the pre-fetch process 2250 submits a request 2206 to storage section 534'$a$, for name(s) of resource(s) most recently requested by server(s). The requested resource name(s) are returned in communication 2208. The pre-fetch process then submits to storage section 534'$b$, a request 2210 for list(s) associated with the resource name(s) returned in communication 2208. The requested list(s) is return in communication 2212.

As discussed above, a resource transition probability list may be a rank ordered list of the probabilities of transiting from a given resource to other resources. The pre-fetch process 2250 uses this list to request, via request 2214, the resource most likely to be requested. This request 2214 is submitted to the resource storage area 734. The requested resource is returned in communication 2216. The returned requested resource is then stored in resource cache 635'. In this way, resource(s) likely to be requested are available in faster memory.

As discussed above with reference to FIG. 35, users may be clustered to define a number of transition probability matrices. To reiterate, free parameters of a probabilistic model that might have generated the usage log data are estimated. These free parameters are used to infer the cluster identifiers and the associated transition probability matrices. Thus, when a new user arrives at an Internet site, that user is classified into one (or more) of the clusters of users. The probability that the new user belongs to a given cluster k of the m clusters can be determined as follows:

$$\delta_l^{(k)} = P\left(l \to k | \underline{n}^{(k)}, (l)p, (l)P\right) \quad (13)$$

$$\propto P\left(\underline{n}^{(k)} | l \to k, (l)p, (l)P\right) P(l \to k)$$

$$= \left((l)p_{i_o}^{(k)} \prod_{i=0}^{s} \prod_{j=0}^{s} (l)P_{ij}^{n_{ij}^{(k)}}\right) \cdot \alpha_l$$

Thus, the new user may be determined to belong to the cluster having the maximum value for $\delta_1^{(k)}$. Alternatively, since all of the $\delta_1^{(k)}$ values should have a value between 0 and 1, the new user may be determined to partly belong to all of the clusters, in a proportion determined by the probability $\delta_1^{(k)}$.

Determining a pre-fetch resource occurs as follows. If the new user is determined to belong to only one cluster of users, the transition probability matrix from that cluster of users is used to determine the most likely resource to be requested given the last resource requested. If, on the other hand, the new user is determined to partially belong to all of the m clusters of users, the transition probability matrices associated with the clusters of users, as weighed by the probabilities $\delta_1^{(k)}$, are used to determine the most likely resource to be requested given the last resource requested.

§4. RESOURCE TOPOLOGY EDITTING USING SERVER-SIDE MODEL

As discussed above, Internet sites may include resources (such as HTML pages for example) that include one or more links (such as hyper-text links, for example) to other resources. The server-side resource transition model discussed above may be used to edit such Internet sites so that clients may navigate through server resources more efficiently. For example, if a resource (R1) has a link to another resource (R2) and the transition probability from R1 to R2 is low, that link may be removed. If, on the other hand, the resource R1 does not have a link to the other resource R2 and the transition probability from R1 to R2 is high, a link from resource R1 to resource R2 may be added to resource R1.

Figure 23:
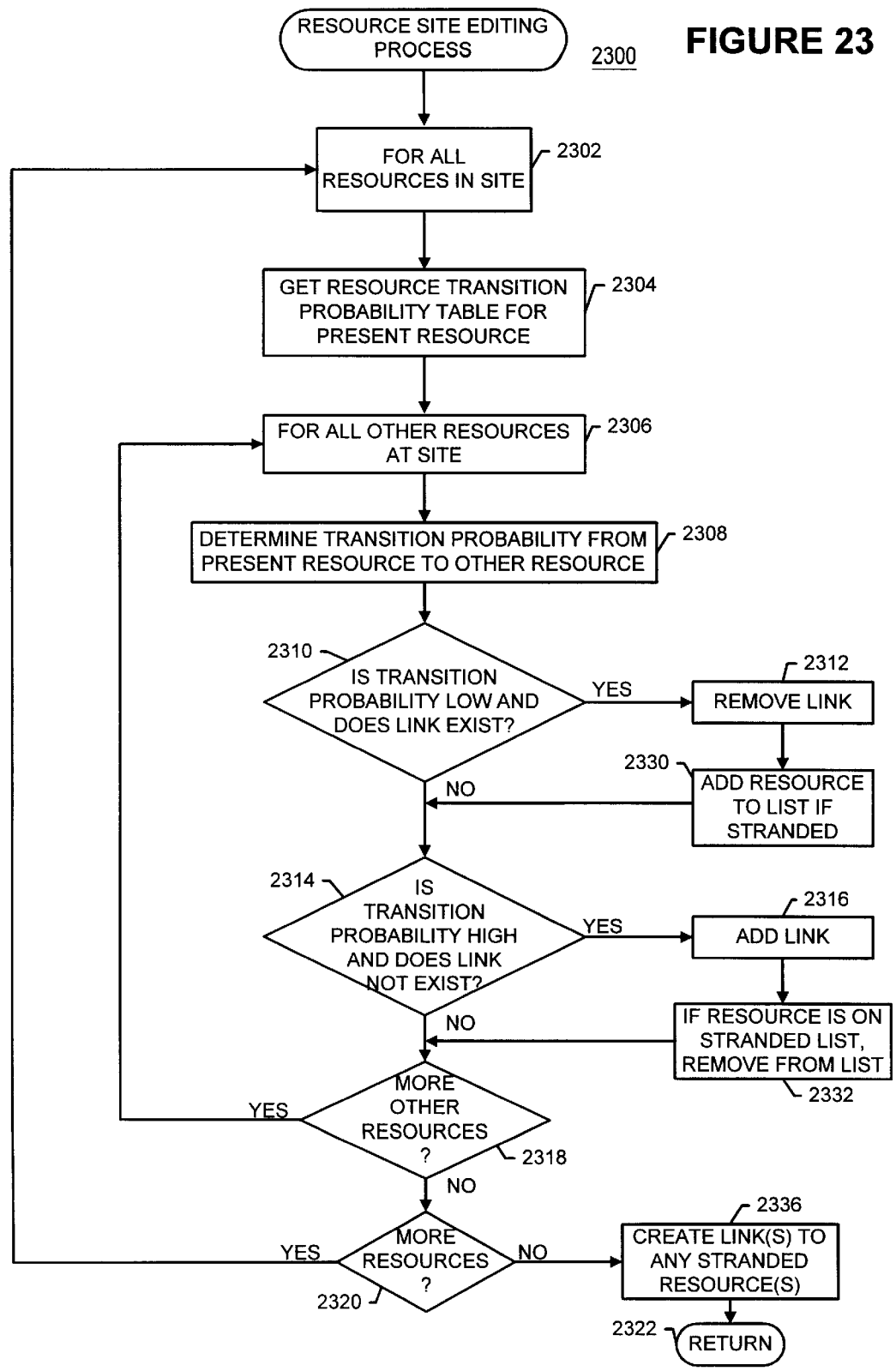
FIG. 23 is a flow diagram of a site topology editing process which uses a resource transition probability model.

FIG. 23 is a flow diagram of a site editing process 2300 which uses the resource transition probability model discussed above. The process 2300 can be used to edit links from all resources in a site as shown by the steps enclosed in loop 2302–2320. First, as shown in step 2304, a resource transition probability table for a given resource is retrieved. The following processing occurs for all other resources of the site as shown by the steps enclosed in loop 2306–2318. As shown in steps 2310 and 2312, if the transition probability between the given resource and the other resource is low (e.g., is below a predetermined threshold) and a link exists from the given resource to the other resource, then that link is removed. Alternatively, a suggestion to remove the link may be provided (e.g., to a site editor). If, after removing the link, there are no more links to the resource, the resource (name) is added to a list of stranded resources, as shown in step 2330. As shown in steps 2314 and 2316, if the transition probability between the given resource and the other resource is high (e.g., above a predetermined threshold) and a link does not exist from the given resource to the other resource, such a link is added. Alternatively, a suggestion to add the link may be provided (e.g., to a site editor) or the link may be provided to a client as a suggested "hot link". Further, as shown in step 2332, if the resource (name) was on the stranded list, it is removed from that list. The threshold may be adjusted based on the number of links already existing on a (starting) resource such that the threshold increases as the number of links increases. For example, if the (starting) resource has no other links, the threshold may be dropped. If on the other hand, the (starting) resource has many links, the threshold may be raised so that the resource does not become cluttered with links. Finally, as shown in step 2336, links may be created to any stranded resources. Processing continues at return node 2322.

Figure 24A:
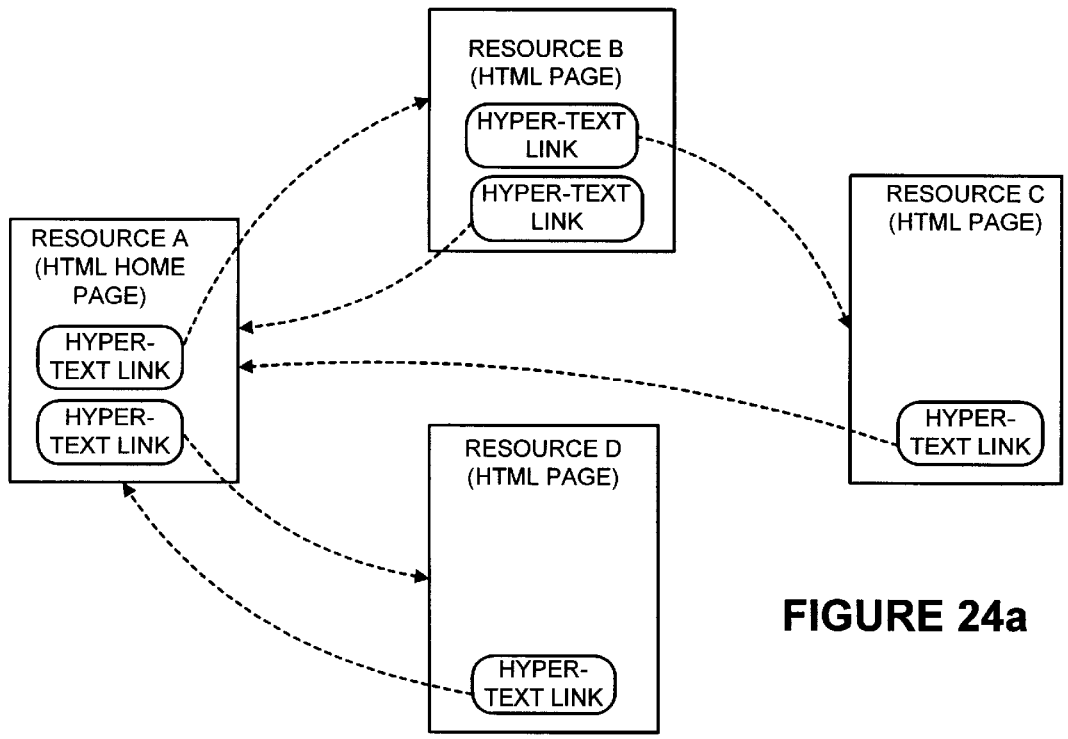
FIG. 24a depicts an exemplary Internet site topology.

FIG. 24$a$ illustrates an example of data operated on by the editing process 2300 of the present invention and FIG. 24$b$ illustrates the resulting data. As shown in FIG. 24$a$, resource A, which may be an HTML home page for example, includes hyper-text links to resources B and D but no link to resource C. Resource B has a hyper-text link to resource C and a hyper-text link back to resource A. Resources C and D only have hyper-text links back to resource A. Assume a threshold probability of 0.4 and assume that a part of the resource transition probability model is as shown in the following table.

| RESOURCE TRANSITION | PROBABILITY |
|---|---|
| A → B | 0.9 |
| A → C | 0.8 |
| A → D | 0.3 |
| B → C | 0.3 |
| C → D | 0.25 |

Figure 24B:
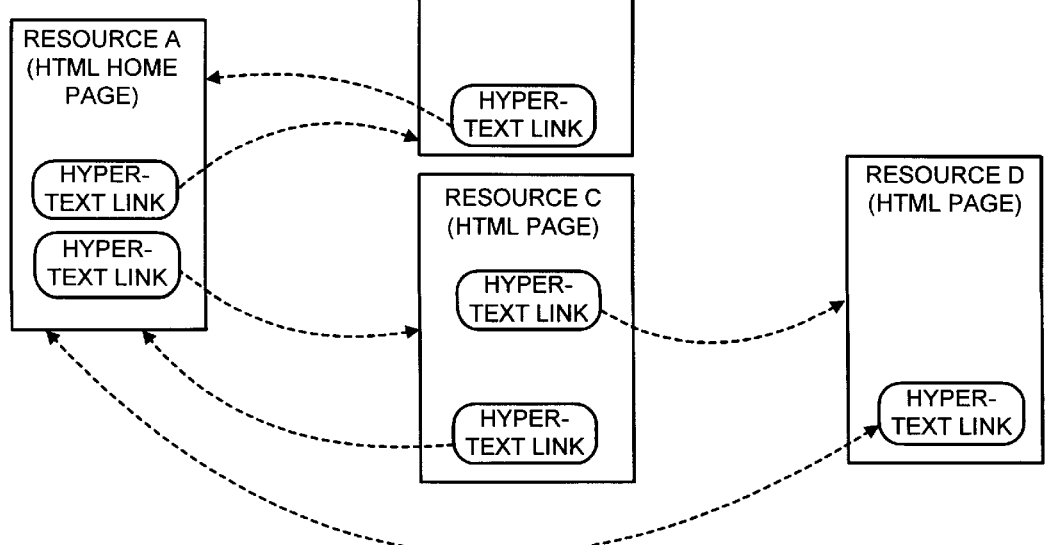
FIG. 24b depicts the Internet site topology of FIG. 24a after being edited by the site topology editing process of the present invention.

Since the resource transition probability from resource A to resource C is greater than the threshold (0.8>0.4) and a link does not exist, a hyper-text link is added from resource A to resource C. Since the resource transition probability from resource A to resource D is less than the threshold (0.3<0.4), the hypertext link from resource A to resource D is removed. These results are shown in FIG. 24B. Since the transition from resource B to resource C is less than the threshold (0.3<0.4), the hyper text link from resource B to resource C is removed.

Note that resource D is now stranded; there is no way for a client to navigate from resource A to resource D. In this case, the present invention will provide a link to otherwise stranded resources; in this example from resource C to resource D.

Templates of the link topology of resources at a site may be generated in a similar manner.

§5. CLIENT-SIDE MODEL BUILDING (ATTRIBUTE TRANSITION PROBABILITY MODEL)

In the following, the function, structure, and operation of an exemplary embodiment of a system for building a client-side attribute transition probability model will be described.

§5.1 FUNCTION OF CLIENT-SIDE MODEL (model building, pre-fetching, collaborative filtering)

In the foregoing, the generation and use of server-side, resource transition probability models were described. Basically, such models are generated based on a relatively large number of users and a relatively small number of resources. Furthermore, for the most part, all users are assumed to be interchangeable (unless the usage logs are filtered in some way to group users into certain categories). For example, if two users request a resource (at almost the same time), the resource transition probability list provided to each will be the same. While the above described server-side resource transition probability models are useful (and, on average, produce desired results) and are based on a relatively large amount of data, treating users the same does not always produce the best results with regard to predicting resources that a user will request and render. This is because an individual user may differ significantly from other users. Accordingly, building and or using client-side attribute transition models may be useful in some instances.

Client-side attribute transition models may be built at the client and are based on a relatively small number of users (e.g., one) but a relatively large number of resources (e.g., potentially all resources of the Internet). In the above described server-side resource transition probability models, though the number of users was large, this was not a problem because the model was used to model the behavior of an "average" or "typical" user. However, in the client-side attribute transition model discussed below, resources cannot be combined to an "average" or "typical" resource; such a model may used to pre-fetch resources which must therefore be distinguished in some way. However, given the almost infinite number of potential resources available on the Internet, a massive dimension reduction of resources is required. Such a dimension reduction is accomplished by classifying resources into one or more categories or "attributes". For example, a resource which describes how to photograph stars may be classified to include attributes of "photography" and "astronomy", or more generally (thereby further reducing dimensions), "hobbies" and "sciences".

As was the case with the server-side resource transition probability model discussed above, the client-side attribute transition probability model may be used to pre-fetch resources. The client-side attribute transition probability model may also be used to predict or suggest a resource which may be of interest to a user based on other, similar, users. Such predictions or suggestions are referred to as "collaborative filtering".

§5.2 STRUCTURE OF CLIENT-SIDE MODEL BUILDING SYSTEM

Figure 25:
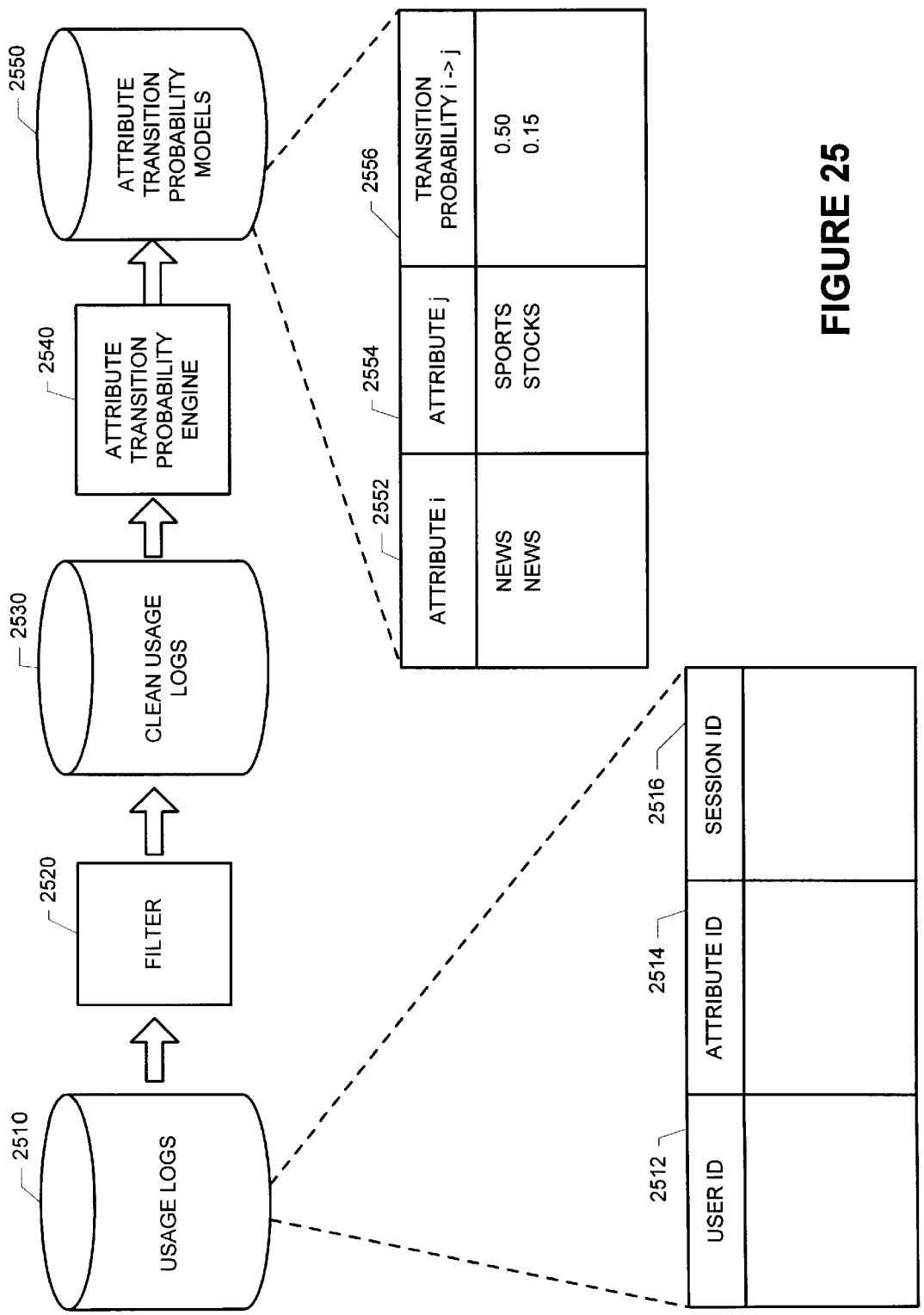
FIG. 25 is a high level diagram which depicts building client-side attribute transition probability models in accordance with the present invention.

FIG. 25 is a high level block diagram which illustrates a system for building a client-side attribute transition probability model. First, usage logs 2510, which may include user ID information 2512, attribute ID information 2514, and session ID information 2516 may be compiled at a client. The user ID information 2512 may include an identification of one or more users which use the client. The attribute ID information 2514 is associated with resources rendered by the client. XML may be used to embed semantic information, such as attributes, into HTML files. The session ID information 2516 may be defined, as described above, as activity by a user followed by a period of inactivity.

The usage logs 2510 may be applied to a filter 2520 which may filter out certain data. More specifically, as a result of the filter 2520, the clean usage logs 2530 may include only records of only certain users, at certain times, and/or of certain type of attributes. For example, since many Internet based resources may include a scroll control slider as a resource, attributes corresponding to such scroll control slider resources may be filtered out.

Periodically, at predetermined times, based on certain conditions or factors, or in response to a user command, the clean usage logs 2530 are provided to a transition probability engine 2540 which produces attribute transition probability models 2550 therefrom. As shown in FIG. 25, the attribute transition probability models 2550 may include information of a first attribute i 2552, information of a second attribute j 2554, and information relating to a transition probability that a user will request (or render) a resource having an attribute j after having requested (or rendered) a resource having an attribute i. In the exemplary data shown, if a user requests (or renders) a resource (e.g., the "USA Today" home page or "MS-NBC") having a "news" attribute, they are 50% likely to request a resource (e.g., "ESPN" home page, "NBA" home page, "USA Today's" Sports page) having a "sports" attribute in the same session and are 15% likely to request a resource (e.g., "USA Today's" Money page or the "NASDAQ" home page) having a "stocks" attribute in the same session.

The attribute transition probability determination is similar to the resource transition probability determination discussed above. That is, attribute transitions may be modeled as observing a first order Markov process. More specifically, the probability that a user will render a resource having an attribute B (e.g., sports) after rendering a resource having an attribute A (e.g., news) is defined by: {number of user-sessions requesting (or rendering) a resource having attribute A and then a resource having attribute B+K1} divided by {number of user-sessions requesting (or rendering) a resource having attribute A+K2}, where K1 and K2 are non-negative parameters of a prior distribution.

§5.3 OPERATION OF CLIENT-SIDE MODEL BUILDING SYSTEM

Figure 31:
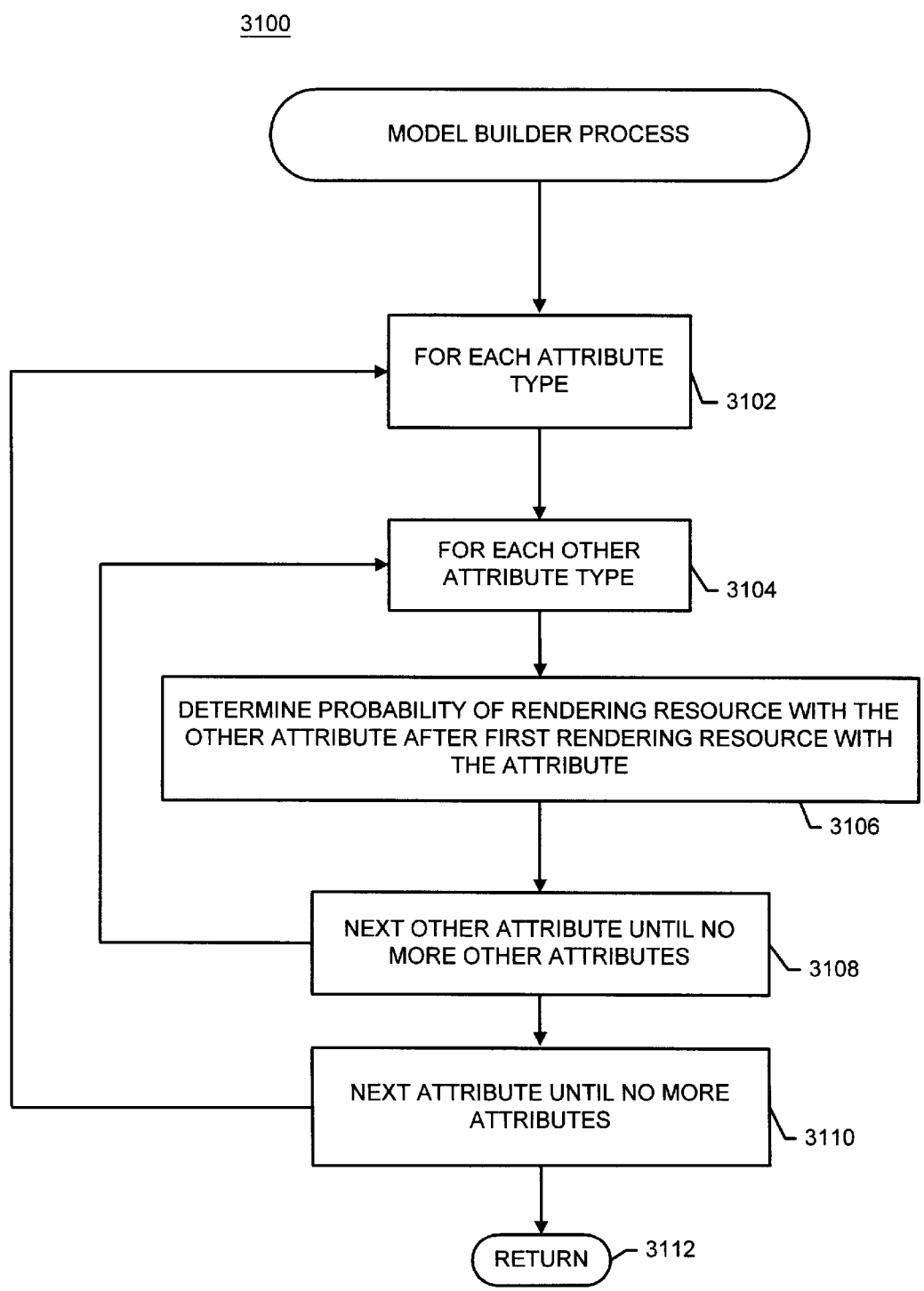
FIG. 31 is a flow diagram of a process for building a client-side attribute transition probability model in accordance with the present invention.

An example of the operation of the client-side attribute transition probability modeling process of the present invention is described below with reference to FIG. 31. FIG. 31 is a high level flow diagram of the client-side attribute transition probability modeling process 3100 of the present invention. As discussed above, a usage log including user ID data, attribute ID data, and session ID data is managed by the client. As shown in steps 3102, 3104, 3106 and 3108, for a given attribute, the probabilities of rendering a resource with other attributes after first rendering a resource with the given attribute is determined. As shown in step 3110, these steps are repeated for each attribute type. As a result of this processing, attribute transition probability models (See, e.g., 2550 of FIG. 25) are built.

§6. PRE-FETCHING USING CLIENT-SIDE MODEL

§6.1 FUNCTION OF PRE-FETCHING USING CLIENT SIDE MODEL

As mentioned above, the client-side attribute transition probability model may be used to predict the attribute of a resource to pre-fetch. Such pre-fetching may occur, for example, when a communications channel between a client and a server is relatively idle. The pre-fetched resource may be subjected to pre-rendering processing at the client if the processing resources of the client are sufficiently idle.

§6.2 STRUCTURE OF PRE-FETCHING USING CLIENT SIDE MODEL

Figure 26A:
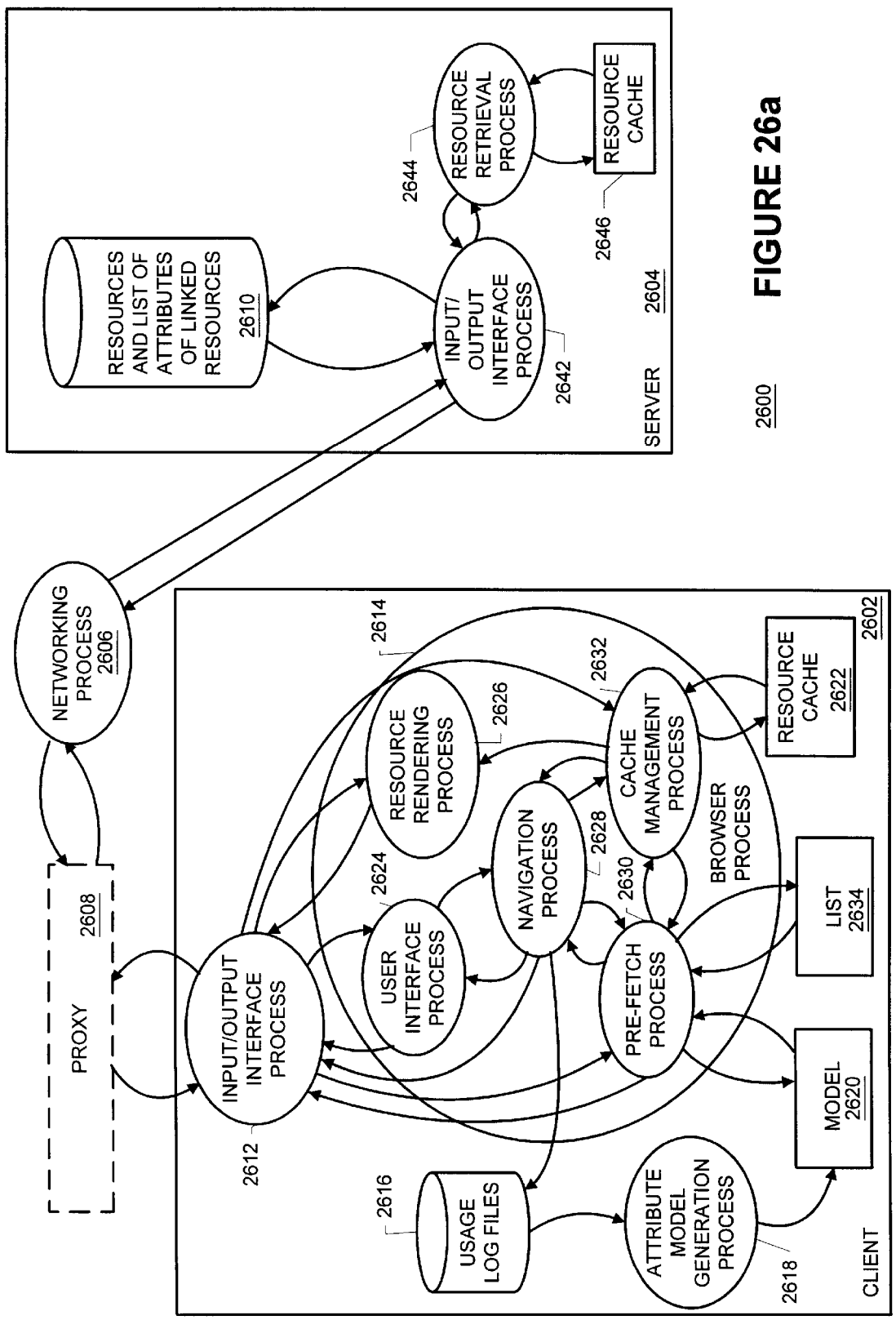
FIG. 26a is a process diagram of processes which may be used in exemplary client-side attribute transition probability model building and/or pre-fetching processes of the present invention.

FIG. 26a is process diagram which illustrates a system 2600 including a networked client 2602 and server 2604. In this system 2600, the client 2602 may browse resources 2610 of the server 2604. The system 2600 is configured so that attribute transition probability models may be generated, as described above, at the client. Although the source of the attribute transition probability model is not particularly relevant for purposes of resource pre-fetching (i.e., the model may be built at the client or purchased or rented from a third party), processes for building the model are shown in the system 2600.

The client 2602 includes an input/output interface process 2612, a browser process (or more generally, a resource requester) 2614, an attribute model generation process (or more generally, an attribute transition probability model generator; not needed for pre-fetch processing) 2618, a storage area 2616 for usage log files 2616, a storage area 2620 for attribute transition probability models, a storage area 2622 for resource caches, and a storage area 2634 for lists of attributes of resources linked to a rendered resource. The browser process 2614 may include a user interface process (or more generally, a user interface) 2624, a resource rendering process (or more generally, a resource renderer) 2626, a navigation process (or more generally, a navigator) 2628, a pre-fetch process (or more generally, a pre-fetcher) 2630, and a cache management process (or more generally, a cache manager) 2632. The input/output interface process 2612 may interact and exchange data with the user interface process 2624, the resource rendering process 2626, the pre-fetch process 2630, and the cache management process 2632. The user interface process 2624 may further interact with and receive data from the navigation process 2628. The resource rendering process 2626 may further interact with and receive data from the cache management process 2632. The navigation process may further interact and exchange data with the pre-fetch process 2630 and the cache management process 2632, and provide usage log data to the storage area 2616 of the usage log files. The pre-fetch process 2630 may further interact and exchange data with the storage area 2620 of the attribute transition probability models 2620, the storage area 2634 for lists of attributes of resources linked to a rendered resource and the cache management process 2632. Finally, the cache management process 2632 may interact and exchange data with the storage area 2622 for the resource cache.

Figure 26B:
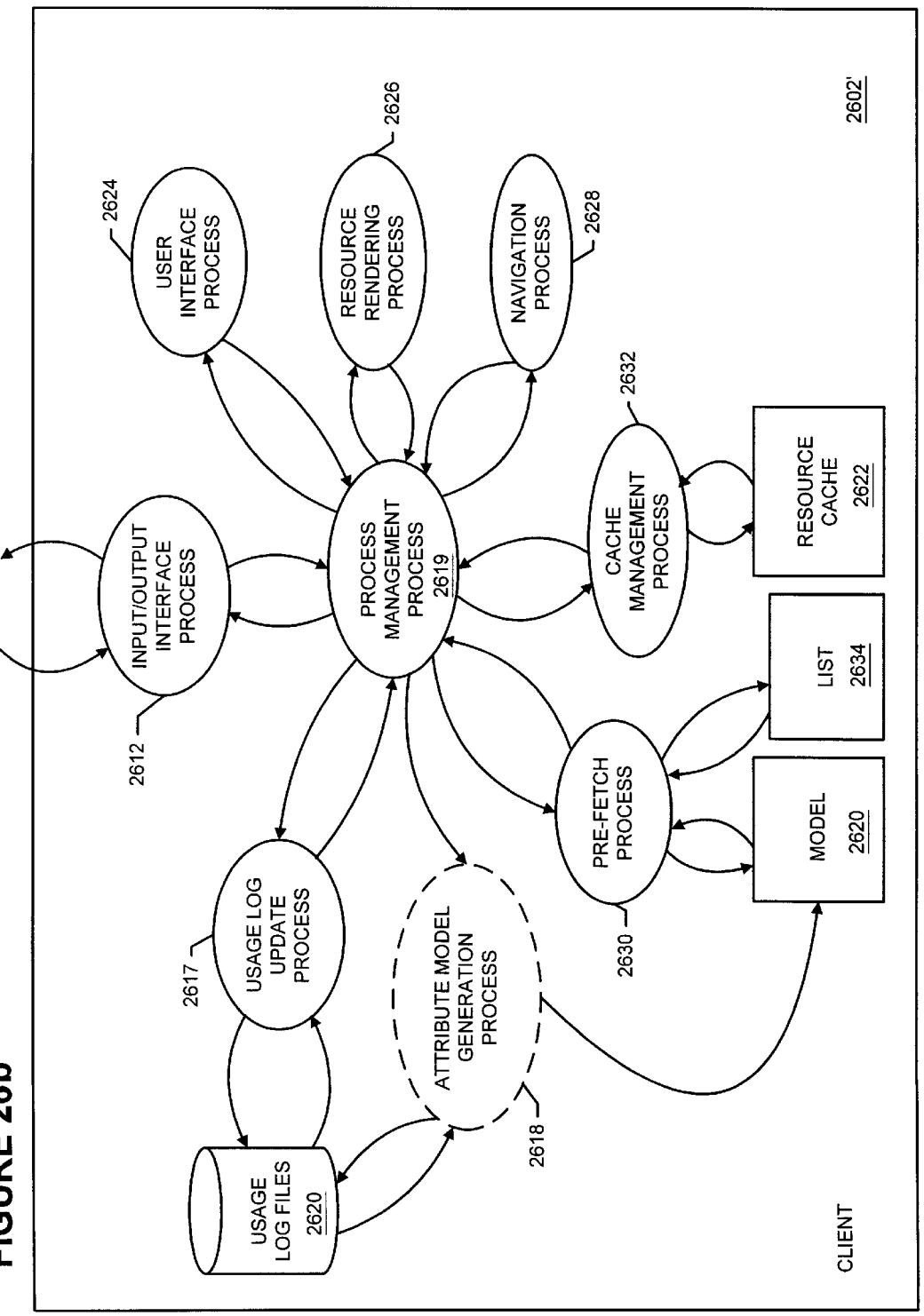

FIG. 26b is a process diagram of an alternative client 2602'. The alternative client 2602' is similar to the client 2602 of FIG. 26a, but differs in that a separate usage log update process (or more generally, a usage log updater) 2617 and a process management process (or more generally, a process manager) 2619 are provided. The process management process 2619 provides a centralized control of the input/output interface process 2612, the user interface process 2624, the resource rendering process 2626, the navigation process 2628, the pre-fetch process 2630, the cache management process 2632, the usage log update process 2617, and (if the client 2602' builds its own attribute transition probability model) the attribute transition probability model generation process 2618. Further, the process management process 2619 may facilitate inter-process communications.

The server 2604 may include an input/output interface process 2642, a resource retrieval process (or more generally, a resource retriever) 2644, a storage area 2646 for a resource cache, and a storage area 2610 for resources and lists of attributes of linked resources. As shown in FIG. 26a, the input/output interface process 2642 may interact and exchange data with the resource retrieval process 2644 and the storage area 2610 of resources and lists of attributes of linked resources. The resource retrieval process 2644 can interact and exchange data with the storage area 2646 serving as a resource cache 2646.

The input/output interface process 2612 of the client 2602 can communicate with the input/output process 2642 of the server 2604 via networking process 2606 and an optional proxy 2608.

In the system 2600, the browser process 2614 (as well as the attribute model generation process 2618) of the client 2602 may be carried out by one or more processors at the client executing stored (and/or downloaded) instructions. The resource cache 2622 may be implemented with a relatively low access time storage device. The usage log files 2616, attribute transition probability models 2620 and add lists 2634 may be stored in higher access time storage devices. The input/output interface process 2612 may be carried out by hardware and/or software for implementing known or proprietary communications protocols. The networking process 2606 may be carried out by routers, bridges, multiplexers, switches, and communications lines. The resource retrieval process 2644 of the server 2604 may be carried out by one or more processors at the server executing stored (and/or downloaded) instructions. The resource cache 2646 may be implemented in a relatively low access time memory. The resources and linked lists of attributes of linked resources 2610 may be stored in a relatively high access time storage device. The input/output interface process 2642 may be carried out by hardware and/or software for implementing known or proprietary communications protocols.

§6.3 OPERATION OF PRE-FETCHING USING CLIENT SIDE MODEL

The operation of a resource pre-fetching process in accordance with the present invention is described below with reference to FIGS. 27, 28, 29, 30, 32*a*, 32*b*, 32*c*, 33, 34*a* and 34*b*. Note that in the data flow diagram of FIGS. 32*a*, 32*b* and 32*c*, for clarity, the input/output interface process 2612 and 2642 of the client 2602 and server 2604, and the networking process 2606 are not shown.

Figure 30:
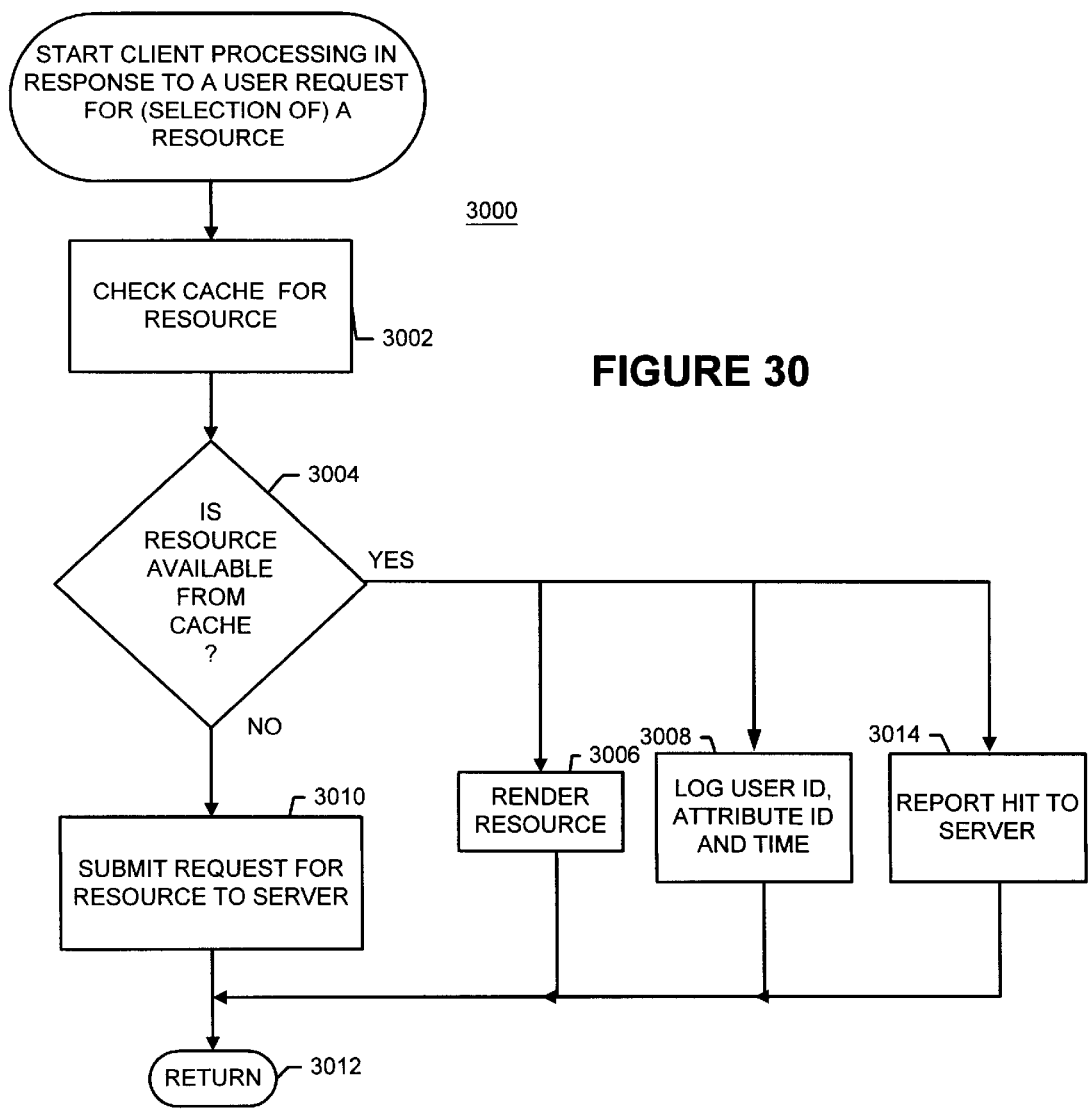
FIG. 30 is a flow diagram of a client processing in response to a user request for a resource.

FIG. 30 is a flow diagram of client processing 3000 in response to a user request for (or selection of) a resource. Referring back to FIG. 26*a*, this may occur when the user interface process 2624 provides a user input (e.g., a click of a mouse when an arrow is on a hyper-text link of an HTML page) to the navigation process 2628. First, as shown in step 3102, the client 2602 will determine whether the selected resource is available at its resource cache 2622. Referring again to FIG. 26*a*, the navigation process 2628 may submit a request to the cache management process 2632 for this purpose.

If, as shown in steps 3004, 3006 and 3008 the resource is available from the resource cache, the resource is rendered and the usage log is updated to reflect the rendering of the resource. Referring again to FIG. 26*a*, in this case the cache management process 2632 gets the resource from the resource cache 2622 and provides it to the resource rendering process 2626. The cache management process 2632 also reports the cache hit to the navigation process 2628 which, in turn, updates the usage log files 2616 accordingly. If, on the other hand, the selected resource is not available from the resource cache 2622 (i.e., a cache miss occurs), a request for the resource is submitted to the server as shown in steps 3004 and 3010. Processing continues as shown by return node 3012.

Figure 27A:
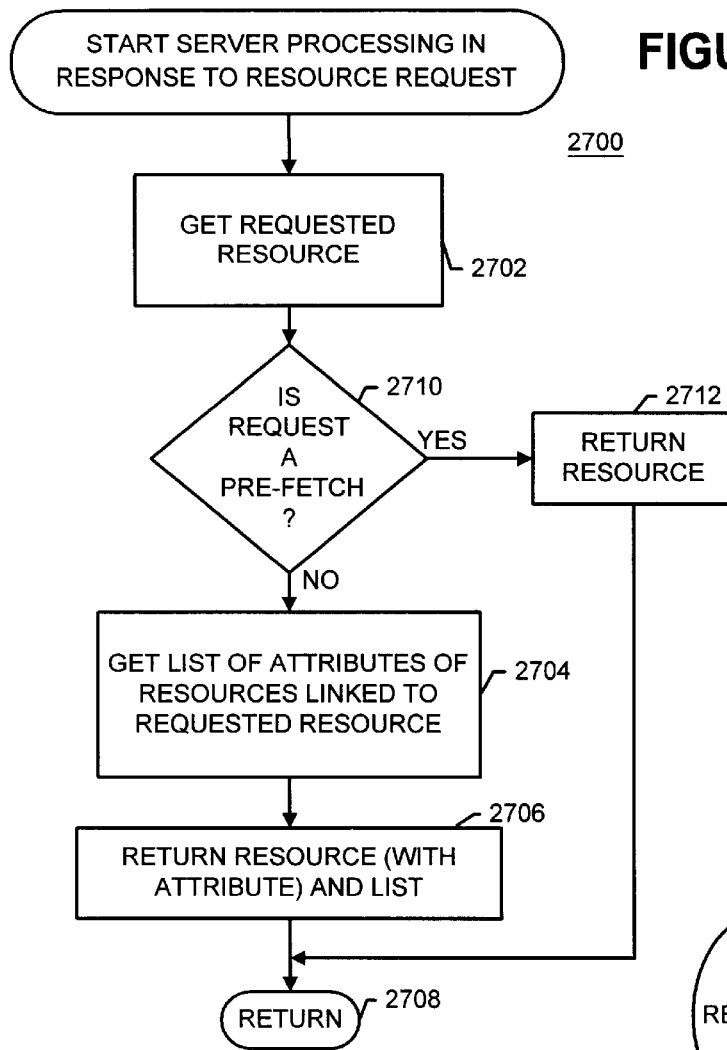
FIG. 27a is a flow diagram of server processing which occurs in response to a resource request in the client-side attribute transition probability model pre-fetch method of the present invention.
Figure 27B:
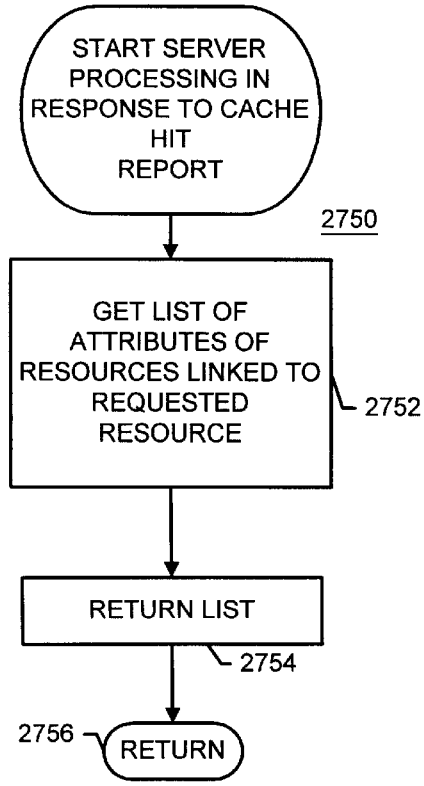
FIG. 27b is a flow diagram of server processing which occurs in response to a cache hit of a pre-fetched resource in a method of the present invention.

FIG. 27*a* is a flow diagram of server processing 2700 in response to a resource request from the client. First, as shown in step 2702, the server gets the requested resource. Referring back to FIG. 26*a*, this may be done by first checking the resource cache 2646 and, if the requested resource is not available, then getting the resource from the storage area 2610. A decision is then made, via decision step 2710, if the request is a pre-fetch request or not. If, it is not, then as shown in step 2704 in FIG. 27*a*, the server retrieves a list of attributes of resources linked with the requested resource. Referring again to FIG. 26*a*, this information may be retrieved from the storage area 2610. Finally, as shown in step 2706, the server returns the resource (with an attribute) and the list of resources linked to the requested resource to the client. Processing then continues as shown by return node 2708. Alternatively, if the request is a pre-fetch request, decision step 2710 routes execution, via its YES path, to step 2712 which returns the request resource. Thereafter, processing continues via return node 2708.

Figure 28:
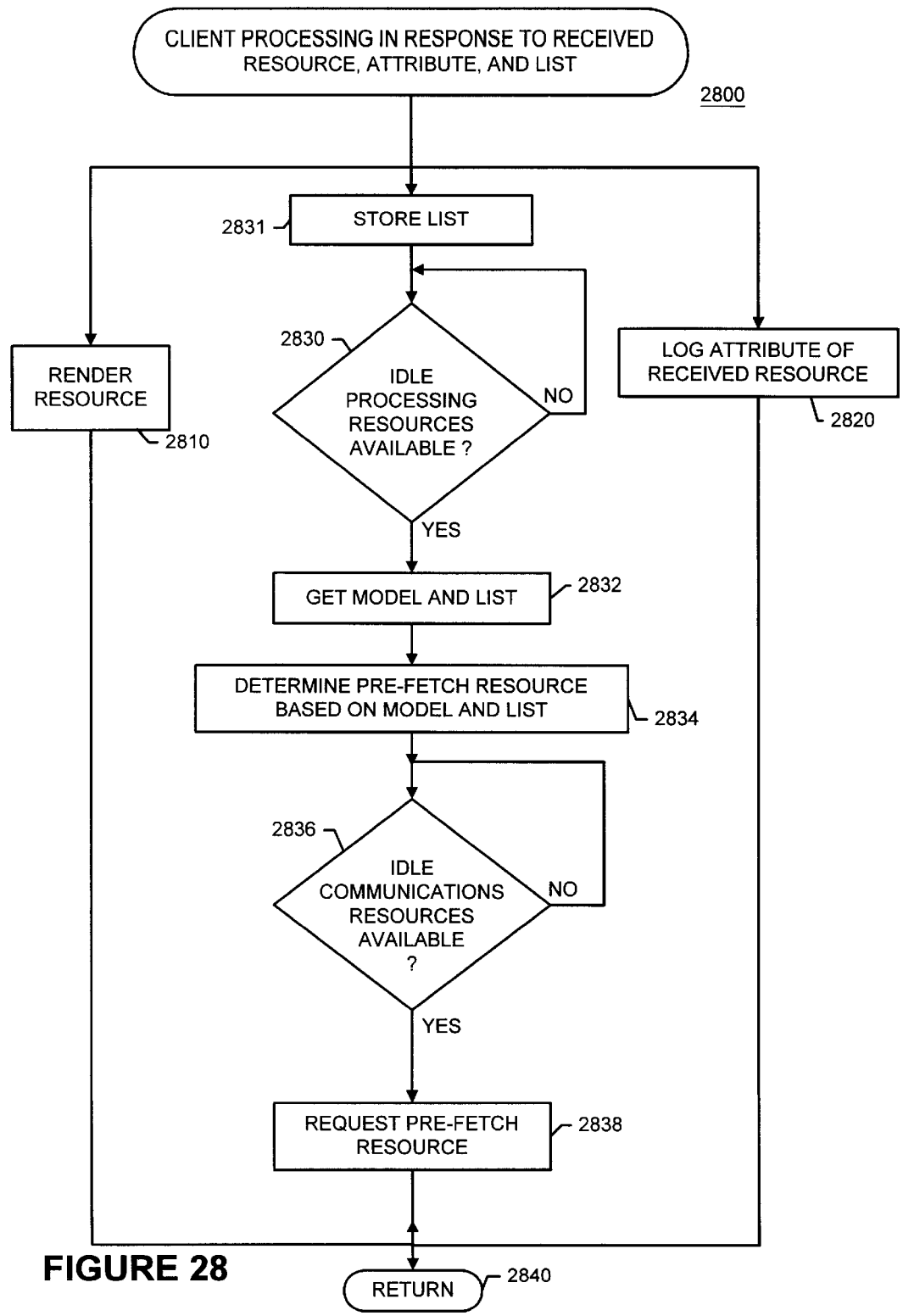
FIG. 28 is a flow diagram of client processing in response to a received resource, attribute, and list in a client-side attribute transition probability model pre-fetch method of the present invention.

FIG. 28 is a flow diagram of client processing 2800 in response to received resource (with attribute) and list of resources linked to the requested resource. As shown in step 2810, the returned resource is rendered. Referring back to FIG. 26*a*, this may be carried out by the resource rendering process 2614. Before, after or concurrently with the step 2810, as shown in step 2820, the attribute of the received resource is logged in the usage log files 2616. If a list of attributes of resources linked with the returned resource is returned, this list is stored as shown in step 2831. Furthermore, as shown in step 2830, the processing resources of the client are monitored to determine whether any idle processing resources are available. If such idle processing resources are available, the attribute transition probability model and the list of linked resources and their attributes is retrieved as shown in step 2832. Referring again to FIG. 26*a*, the pre-fetch process gets the model from storage area 2620 and the list from storage area 2634. Next, as shown in step 2834, a pre-fetch resource is determined based on the retrieved model and returned list. Referring once again to FIG. 26*a*, this step may be carried out by pre-fetch process 2630.

The operation of the pre-fetch determination step 2834 is illustrated with reference to FIGS. 34*a* and 34*b*. FIG. 34*a* is an exemplary partial attribute transition probability model 3410 which illustrates the probabilities that a particular user will transition from a resource having a news attribute to a resource having other attributes. As shown, the model 3410 includes attributes i 2552, attributes j 2554, and probabilities 2556 that the user will transition from a resource having attribute i to a resource having attribute j. FIG. 34*b* is an exemplary list 3450 of attribute types 3452 of resources 3450 linked to a returned resource. In this example, it is assumed that a resource returned to the client has a "news" attribute. Since, based on the probability model 3410, the user is most likely to transition to a resource having a "sports" attribute, the pre-fetch process 2630 looks through the list 3450 for the attribute type "sports". No such attribute exists on the list 3450. Accordingly, the pre-fetch process 2630 then looks through the list 3450 for a "financial" attribute. Since the list 3450 includes a "financial" attribute type, the pre-fetch process 2630 would like to pre-fetch the resource at $URL_6$.

Referring back to FIG. 28, the communications resources, i.e., the connection between the client and server, is monitored. Referring to steps 2836 and 2838, if idle communications resources are available, the client will submit a request for the pre-fetch resource ($URL_6$ in the above example). Processing continues at return node 2840.

Figure 29:
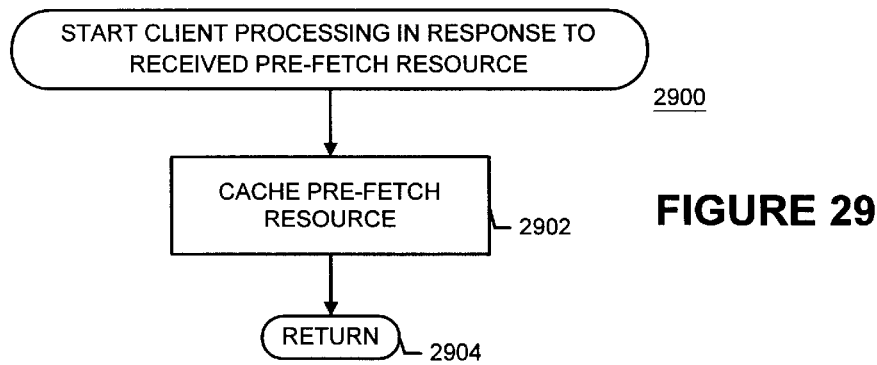
FIG. 29 is a flow diagram of client processing in response to a received pre-fetch resource in a client-side attribute transition probability model pre-fetch method of the present invention.

FIG. 29 is a flow diagram of client processing 2900 in response to receiving a pre-fetch resource. Quite simply, as shown in step 2902, the pre-fetched resource is stored in the resource cache of the client. Referring back to FIG. 26*a*, the pre-fetch process 2630 provides the pre-fetch resource to the cache management process 2632 which then stores the pre-fetch resource in the resource cache 2622.

Figure 32A:
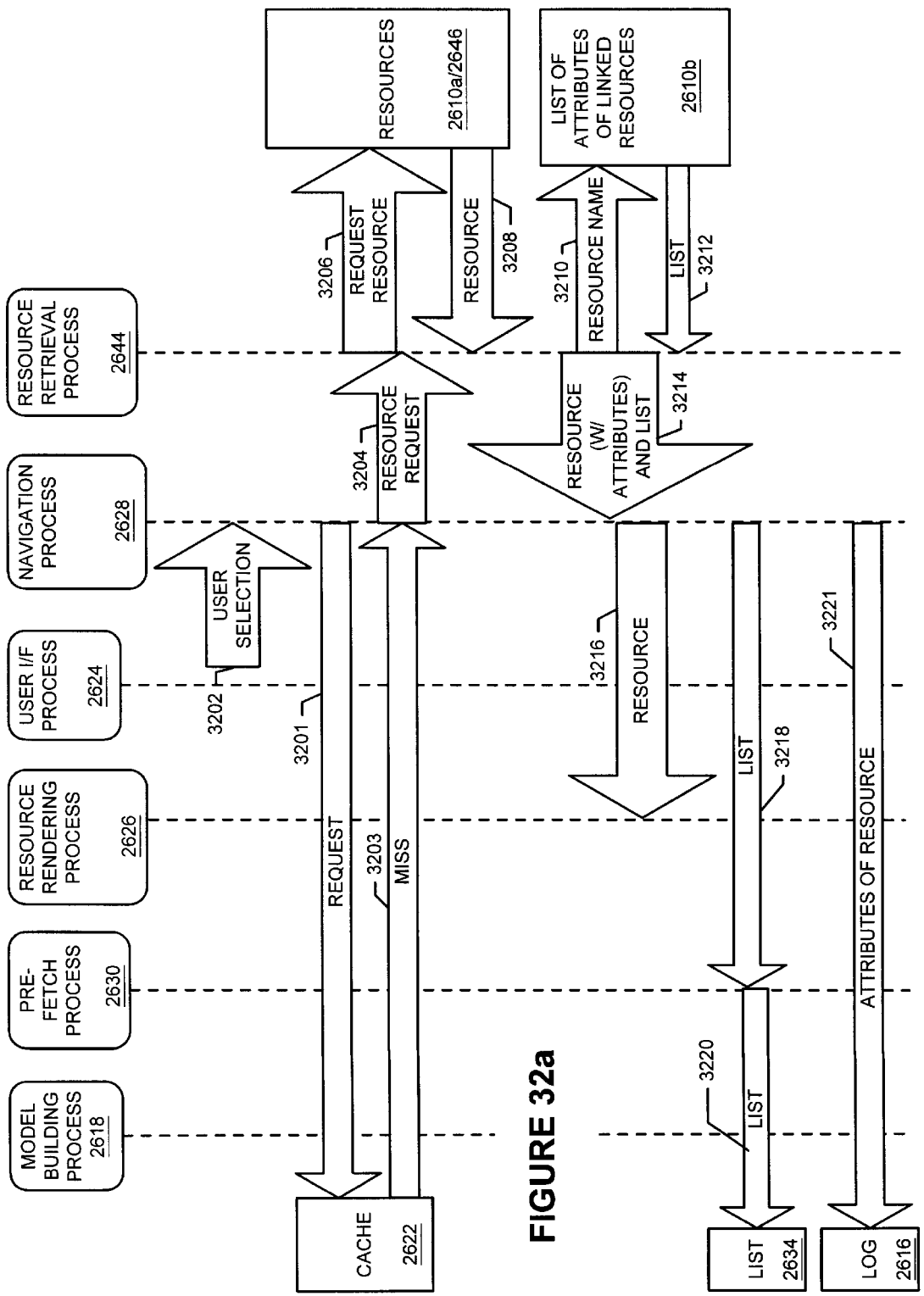
Figure 32B:
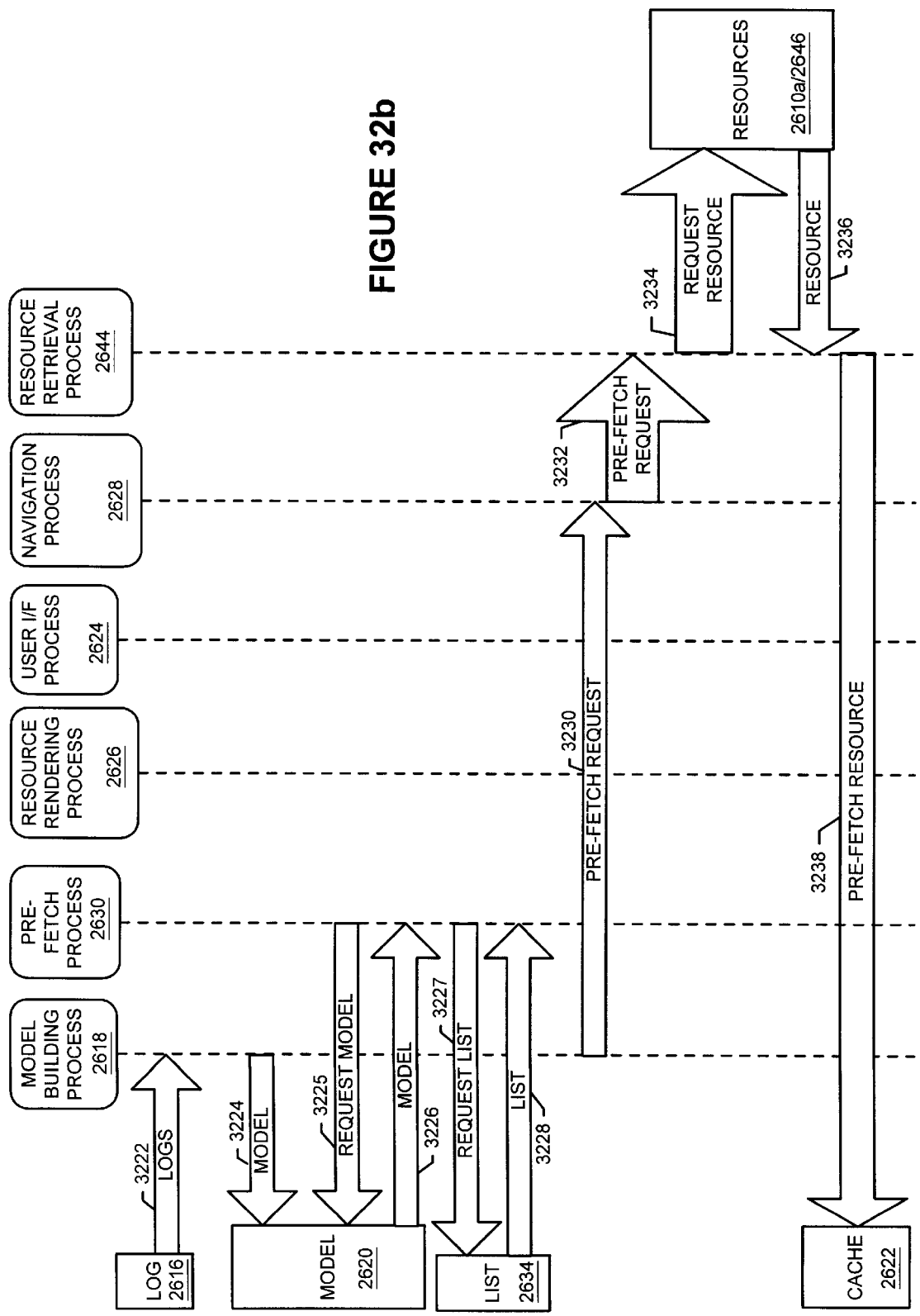

The data messaging and communications occurring during the above described processing is illustrated in FIGS. 32*a* and 32*b*. To reiterate, for purposes of clarity, FIGS. 32*a* and 32*b* do not show the input/output interface processes 2612 and 2642 of the client 2602 and server 2604, respectively, or the networking process 2606. Initially, a user selects a resource, e.g., by double clicking a mouse when an arrow is on a hyper-text link of an HTML page. The user interface process 2624 communicates this user selection to the navigation process 2628 in communication 3202. In response, (assuming that the resource is not available from the client's resource cache 2622) the navigation process 2628 submits a request 3204 for the selected resource to the resource retrieval process 2644 of the server 2604. Referring back to FIG. 17, this request 3204 may have the data structure 1700. If the request 3204 does have the data structure 1700, the information in the request type ID field 1710 will indicate that the request is a user selection request and the information in the return address field 1740 will have the address of the client 2602 (or the terminal of the proxy 2608 with which the client 2602 is connected).

The resource retrieval process 2644 will then submit a request 3206 for the resource, first to the resource cache 2646 and then, in the event of a cache miss, to the storage area 2610 of the resources. The resource is returned to the resource retrieval process 2644 in communication 3208. Before, after, or concurrently with the resource request 3206, the resource retrieval process 2644 also submits a request 3210 for a list of attributes of resources linked with the requested resource. The list is returned in communication 3212.

Figure 33:
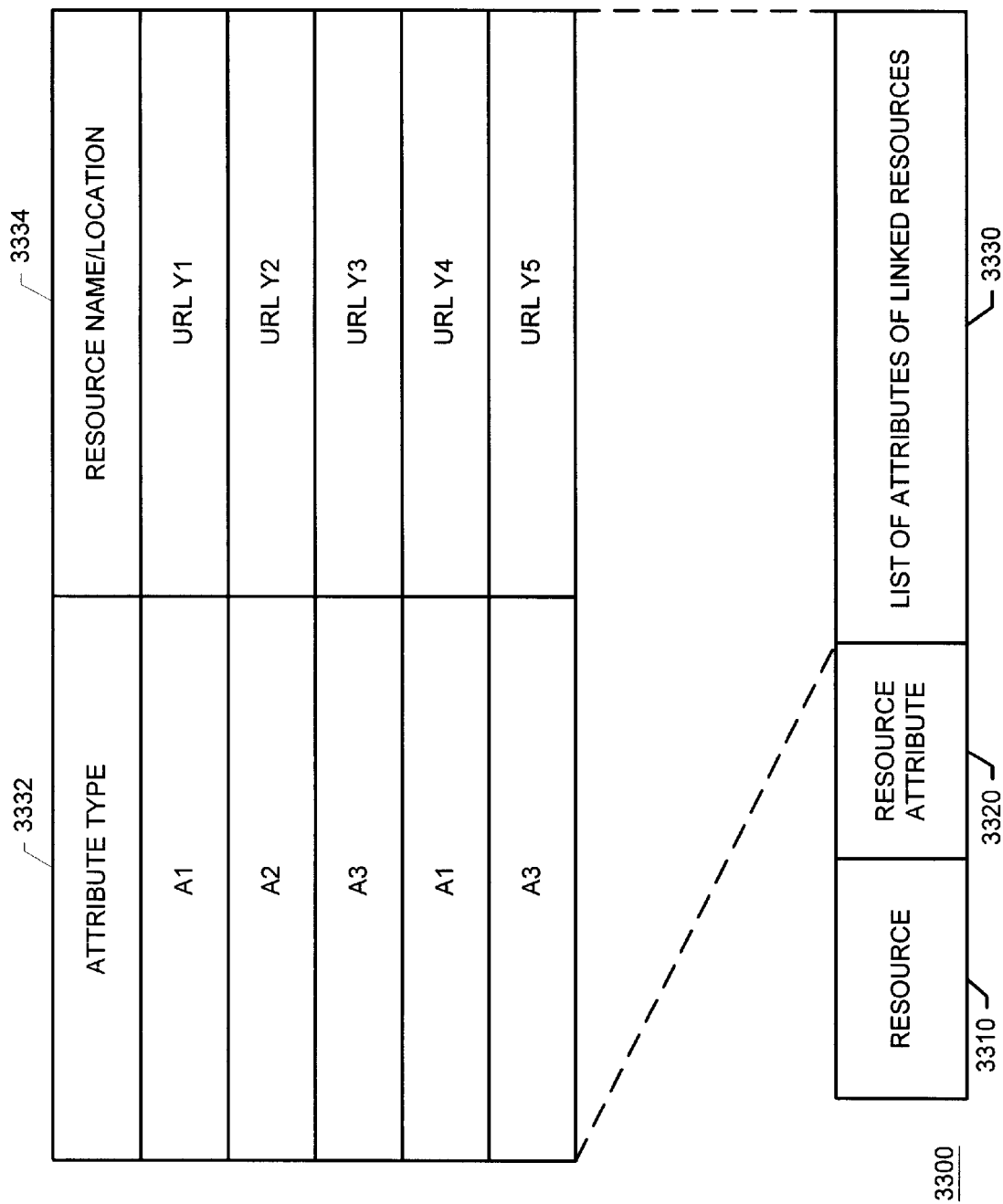
FIG. 33 is a data structure of a communication used in the client-side attribute transition probability model of the present invention.

Thereafter, the resource retrieval process 2644 returns the resource (with attribute(s)) along with the list in communication 3214. Referring to FIG. 18, the communication 3214 may have data structure 1800. If the communication 3214 does have the data structure 1800, information in the data type ID field 1810 will indicate that the payload 1840 includes a resource and a list. Referring to FIG. 33, the payload 1840 may include information having data structure 3300. The data structure 3300 may include a field 3310 for the resource, a field 3320 for the attribute(s) of the resource, and a field 3330 for the list of attributes of linked resources. The list may include the name and/or location of the linked resources 3334 and the attribute types 3332 of such linked resources. Alternatively, the resource and its attribute(s), and the list may be returned to the client 2602 in separate communications.

The returned resource is provided as shown in FIG. 32a, to the resource rendering process 2626 in communication 3216 and the list is provided to the pre-fetch process 2630 in communication 3218. As shown, the list may be stored to the list storage area 2634 in communication 3220. The attribute(s) of the resource, as well as the user ID and time stamp, are filed in usage log 2616 in communication 3221. At a predetermined time, or in response to a user command or system conditions, the model building process 2618 retrieves the usage logs in communication 3222 and updates the attribute transition probability model 2620, based on the usage logs, in communication 3224. Again, for purposes of the pre-fetch processing, the building and source of the attribute transition probability models 2620 is not particularly important.

While or after the resource is being rendered by the client 2602, if the client has sufficient processing resources available, the pre-fetch process 2626 will submit, as shown in FIG. 32b, a request 3225 for the attribute transition probability model. The requested model is returned in communication 3226. Similarly, the pre-fetch process 2630 will submit a request 3227 for the list. The list is returned in communication 3228. If sufficient processing and communications resources are available, the pre-fetch process 2630 will determine a resource to pre-fetch based on the list and the model as described above and will submit a pre-fetch request 3230 for the resource to the navigation process 2628. The navigation process 2628 (assuming that the pre-fetch resource is not available from the client's resource cache 2622) then submits a request 3232 for the pre-fetch resource to the resource retrieval process 2644 of the server 2604. Referring back to FIG. 17, the request 3232 may have the data structure 1700. If the request has such a data structure, information in the request type ID field 1710 will identify the request 3232 as a pre-fetch request.

The resource retrieval process 2644 will then submit a request 3234 for the resource, first to the resource cache 2646 and then, in the event of a cache miss, to the storage area 2610 of the resources. The resource is returned to the resource retrieval process 2644 in communication 3236. Since the resource is only a pre-fetch resource, at this time, the resource retrieval process 2644 only returns the resource (with attribute) in communication 3238; the list is not returned to the client 2602. Alternatively, a list may be returned with the pre-fetch resource. The pre-fetched resource is stored in cache 2622.

As shown in the messaging diagram of FIG. 32c, if the pre-fetch resource is requested from the cache 2622 and rendered, the client 2602 may communicate this fact to the server 2604 so that the server 2604 may return the list of attributes associated with resources linked to the rendered pre-fetch resource. More specifically, in response to a user selection of a resource, the user interface process 2624 submits a selection message 3240 to the navigation process 2628. In response, the navigation process 2628 first checks the client's resource cache 2622 for the selected resource. More specifically, the navigation process 2628 submits a resource request 3242 to the cache management process 2632. The cache management process 2632 then accesses the resource cache 2622 to attempt to retrieve the resource with communication 3244. In this example, it is assumed that the resource had been pre-fetched and cached. Accordingly, the resource is returned to the cache management process 2632 in communication 3246. The resource is provided to resource rendering process 2626 in communication 3248. Before, after or concurrent with communication 3248, the cache management process 2632 reports the pre-fetch cache hit to the navigation process 2628 in communication 3250. The navigation process 2628 forwards this information to the resource retrieval process 2644 in communication 3252. In response, the resource retrieval process 2644 will submit a request 3254 for the list of attributes of resources linked with the pre-fetched resource being rendered. The list is returned to the resource retrieval process 2644 in communication 3256, and from there, to the pre-fetch process 2630 (and then to list storage area 2684) in communication 3258. The pre-fetch process 2630 may then store the list in list storage area 2632 as shown by communication 3260.

§7. COLLABORATIVE FILTERING USING CLIENT-SIDE MODEL

The client-side attribute transition model may be compared with such models of other clients in a collaborative filtering process. In this way, resources may be pre-fetched or recommended to a user based on the attribute transition model of the client, as well as other clients. For example, client-side attribute transition models may be transmitted to and "clustered" at a proxy in accordance with the known Gibbs algorithm, the known EM algorithm, a hybrid Gibbs-EM algorithm discussed above, or another known or proprietary clustering algorithm.

§8. SUMMARY

As is apparent from the above description, the methods and apparatus of the present invention better utilize idle processing, data bus, and/or communications resources so that resources which a user is likely to request may be quickly rendered if and when such a user request is made.

What is claimed is:

1. In a system including
   a client having:
      a resource requester, a resource cache storage area, a cache manager for managing the resource cache storage area, a client list storage area for storing a list of resources available for pre-fetching and corresponding attributes of the available resources, an attribute transition probability model storage area, wherein the attribute transition probability model specifies probabilities associated with transitioning between first and second resources specified in the list as a function of the attribute associated with each of said first and second resources, the attribute being associated with and descriptive of a predefined characteristic, associated with the content, of an corresponding resource itself when the corresponding resource is rendered by the client, and a pre-fetcher for generating a pre-fetch resource request based on contents of the list and the attribute transition probability model, and a server having:
 a resource storage area,
 a server list storage area, and
 a resource retriever for servicing requests for resources, a method for pre-fetching resources comprising the steps of:

a) sending, in response to a resource request from the resource requester of the client, a list of resources available for pre-fetching and corresponding attributes of said available resources from the server list storage area to the client list storage area;

b) determining an attribute of a particular resource from the list to pre-fetch based on the attribute of a resource specified in the resource request and the attribute transition probability model; and c) determining the particular resource to pre-fetch based on the attribute determined in step (b) and the list sent in step (a).

2. The method of claim 1 further comprising a step of:
d) generating a request to pre-fetch the particular resource determined in step (c).

3. The method of claim 1 further comprising steps of:
d) determining whether a communications path between the client and the server is idle; and
e) generating a request to pre-fetch the particular resource determined in step (c) if the communications path has been determined to be idle in step (d).

4. The method of claim 3 further comprising a step of:
f) sending, in response to the request to pre-fetch the particular resource generated in step (e), the particular resource from the resource storage area of the server to the client.

5. The method of claim 4 further comprising a step of:
g) storing the particular resource in the resource cache storage area of the client.

6. The method of claim 5 further comprising a step of:
h) reporting, in response to a request from the resource requester for the particular resource stored in the resource cache storage area of the client, a cache hit of the pre-fetched resource to the server.

7. The method of claim 6 further comprising a step of:
i) sending, in response to the cache hit of the pre-fetched resource report of step (h), a list of at least one attribute of at least one resource linked with the pre-fetched resource, to the client.

8. The method of claim 7 further comprising a step of:
j) storing the list sent in step (i) in the list storage area of the client.

9. The method of claim 1 wherein the list comprises attributes of resources linked with a resource of the request, and information for addressing of the resources specified in the list.

10. The method of claim 1 wherein the attribute transition probability model comprises a first group of at least one attribute, a second group of at least one attribute, and associated probabilities that a second resource having an attribute of the second group will be referenced after a first resource having an attribute of the first group has been referenced.

11. The method of claim 10 wherein the client, in referencing the first or second resource undertakes an action, with respect to the first or second resource, selected from a group consisting of requesting, retrieving, returning, and rendering the first or second resource, respectively.

12. The method of claim 9 wherein the attribute transition probability model comprises a first group of at least one attribute, a second group of at least one attribute, and associated probabilities that a second resource having an attribute of the second group will be referenced after a first resource having an attribute of the first group has been referenced.

13. The method of claim 12 wherein the client, in referencing the first or second resource undertakes an action, with respect to the first or second resource, selected from a group consisting of requesting, retrieving, returning, and rendering the first or second resource, respectively.

14. The method of claim 10 further comprising the steps of:
d) sending, in response to the resource request from the resource requester of the client, a resource specified in the request, from the resource storage area of the server to a resource renderer of the client; and
e) rendering the resource specified in the request.

15. The method of claim 14 wherein the attribute transition probability model is updated based on the resource rendered.

16. In a system comprising:
 a server having:
  a resource storage area,
  a list storage area,
  a resource retriever for servicing requests for resources, and
  a server input/output interface unit for communicatively coupling the server to a network,
 a client comprising:
  a) a client input/output interface unit for communicatively coupling the client to the network;
  b) a resource requester for generating a resource request, the resource requester being able to communicate with the client input/output interface unit;
  c) a resource cache storage area;
  d) a cache manager for managing the resource cache storage area, the cache manager being able to communicate with the client input/output interface unit;
  e) a client list storage area for storing a list of resources available for pre-fetching and corresponding attributes of the resources;
  f) an attribute transition probability model storage area which stores an attribute transition probability model, wherein the attribute transition probability model specifies probabilities associated with transitioning between first and second resources specified in the list as a function of the attribute associated with each of said first and second resources, the attribute being associated with and descriptive of a predefined characteristic, associated with the content, of an corresponding resource itself when the corresponding resource is rendered by the client; and g) a pre-fetcher for generating a pre-fetch resource request based on contents of the list and the attribute transition probability model, the pre-fetcher being able to communicate with the client input/output interface unit.

17. The device of claim 16 wherein the client input/output interface unit receives, in response to a resource request from the resource requester of the client, the list from the server list storage area so as to define a received list, and wherein the received list is provided to the client list storage area.

18. The device of claim 17 wherein the pre-fetcher comprises:

i) a first determiner for determining an attribute of a particular resource to pre-fetch based on an attribute of a resource specified in the resource request and the attribute transition probability model, and ii) a second determiner for determining the resource to pre-fetch based on the attribute determined by the first determiner and the list provided to the client list storage area.

19. The device of claim 18 wherein the pre-fetcher further comprises:

iii) a generator for generating a request to pre-fetch the particular resource.

20. The device of claim 19 further comprising:

h) a monitor for determining whether a communications path between the client and the server is idle, wherein the generator generates a request to pre-fetch the particular resource if the communications path is idle.

21. The device of claim 20 wherein the client input/output interface receives, in response to the request to pre-fetch the particular resource, the particular resource from the resource storage area of the server.

22. The device of claim 21 wherein the resource cache storage area of the client stores the particular resource received by the client input/output interface unit.

23. The device of claim 22 wherein the cache manager, in response to a request for the particular resource from the resource requester, generates a cache hit report of a pre-fetched resource, wherein the cache hit is reported to the server.

24. The device of claim 23 wherein the client input/output interface unit receives, in response to the cache hit report sent to the server, a list of at least one attribute of at least one resource linked with a pre-fetched resource reported in the cache hit report.

25. The device of claim 24 wherein the client list storage area stores the list received by the client input/output interface unit.

26. The device of claim 17 wherein the list comprises attributes of resources linked with the particular resource specified in the request, and information for addressing the resources specified in the list.

27. The device of claim 16 wherein the attribute transition probability model comprises a first group of at least one attribute, a second group of at least one attribute, and associated probabilities that a second resource having an attribute of the second group will be referenced after a first resource having an attribute of the first group has been referenced.

28. The device of claim 27 wherein the client, in referencing the first or second resource undertakes an action, with respect to the first or second resource, selected from a group consisting of requesting, retrieving, returning, and rendering the first or second resource, respectively.

29. The device of claim 26 wherein the attribute transition probability model comprises a first group of at least one attribute, a second group of at least one attribute, and associated probabilities that a second resource having an attribute of the second group will be referenced after a first resource having an attribute of the first group has been referenced.

30. The device of claim 29 wherein the client, in referencing the first or second resource undertakes an action, with respect to the first or second resource, selected from a group consisting of requesting, retrieving, returning, and rendering the first or second resource, respectively.

31. The device of claim 16 further comprising:

i) a resource renderer, the resource renderer being able to communicate with the client input/output interface unit, wherein the client input/output interface unit receives, in response to a resource request from the resource requester of the client, the particular resource, from the resource storage area of the server, and wherein the particular resource is provided to the resource renderer.

32. The device of claim 27 further comprising:

j) an attribute transition probability model maintenance unit, wherein the attribute transition probability model is updated based on the particular resource.

33. In a system comprising:

a client having:

a client input/output interface unit for communicatively coupling the client to a network;

a resource requester for generating a resource request, the resource requester being able to communicate with the client input/output interface unit;

a resource cache storage area;

a cache manager for managing the resource cache storage area, the cache manager being able to communicate with the client input/output interface unit;

a client list storage area for storing a list of resources available for pre-fetching and corresponding attributes of said available resources;

an attribute transition probability model storage area which stores an attribute transition probability model, wherein the attribute transition probability model specifies probabilities associated with transitioning between first and second resources specified in the list as a function of the attribute associated with each of said first and second resources, the attribute being associated with and descriptive of a predefined characteristic, associated with the content, of an corresponding resource itself when the corresponding resource is rendered by the client; and a pre-fetcher for generating a pre-fetch resource request based on contents of the list and contents of the attribute transition probability model, the pre-fetcher being able to communicate with the client input/ output interface unit, and a server comprising:

a) a resource storage area for storing a plurality of resources, at least some of the resources stored therein having at least one attribute associated therewith;

b) a server list storage area for storing a plurality of lists, the lists including attributes of resources linked with the resources stored in the resource storage area;

c) a resource retriever for servicing requests for resources; and d) a server input/output interface unit for communicatively coupling the server to the network.

34. The device of claim 33 wherein the resource retriever, in response to a resource request from the resource requester of the client, sends a selected one of the plurality of lists from the server list storage area to the client.

35. The device of claim 33 wherein the resource retriever, in response to a pre-fetch resource request, sends a given resource specified in the pre-fetch resource request from the resource storage area to the client.

36. The device of claim 33 wherein the resource retriever, in response to a received cache hit report from the client, sends a list of at least one attribute of at least one resource linked with a pre-fetched resource identified in the received cache hit report.

37. A system for use in an environment having a network, the system comprising:

a) a server having:
 i) a server input/output interface unit for communicatively coupling the server to a network,
 ii) a resource storage area,
 iii) a server list storage area, and
 iv) a resource retriever for servicing requests for resources, the resource retriever being able to communicate with the server input/output interface unit; and b) a client having:
 i) a client input/output interface unit for communicatively coupling the client to the network;
 ii) a resource requester, the resource requester being able to communicate with the client input/output interface unit;
 iii) a resource cache storage area;
 iv) a cache manager for managing the resource cache storage area, the cache manager being able to communicate with the client input/output interface unit;
 v) a client list storage area for storing a list of resources available for pre-fetching and corresponding attributes of said available resources
 vi) an attribute transition probability model storage area which stores an attribute transition probability model, wherein the attribute transition probability model specifies probabilities associated with transitioning between first and second resources specified in the list as a function of the attribute associated with each of said first and second resources, the attribute being associated with and descriptive of a predefined characteristic associated with the content, of an corresponding resource itself when the corresponding resource is rendered by the client; and
 vii) a pre-fetcher for generating a pre-fetch resource request based on contents of the list and the attribute transition probability model, the pre-fetcher being able to communicate with the client input/output interface unit.

38. The system of claim 37 wherein the resource retriever, in response to a resource request from the resource requester of the client, sends a list from the server list storage area to the client, and wherein after the list is received by the client input/output interface unit, the list is provided to the client list storage area.

39. The system of claim 38 wherein the pre-fetcher comprises:

A) a first determiner for determining an attribute of a particular resource to pre-fetch based on an attribute of a resource specified in the resource request and the attribute transition probability model, and B) a second determiner for determining the particular resource to pre-fetch based on the attribute determined by the first determiner and the list provided to the client list storage area.

40. (amended) The system of claim 39 wherein the pre-fetcher further comprises:

C) a generator for generating a request to pre-fetch the particular resource.

41. The system of claim 40 wherein the client further comprises:

vii) a monitor for determining whether a communications path between the client and the server is idle, wherein the generator generates a request to pre-fetch the particular resource if the communications path is idle.

42. The system of claim 41 wherein the resource retriever sends from the resource storage area of the server to the client input/output interface, in response to the pre-fetch request, the particular resource.

43. The system of claim 42 wherein the resource cache storage area of the client stores the particular resource received by the client input/output interface.

44. The system of claim 43 wherein the cache manager, in response to a request for the particular resource stored in the resource cache storage area of the client from the resource requester, generates a cache hit report of the pre-fetched resource, wherein a cache hit is reported to the server.

45. The system of claim 44 wherein the resource retriever sends to the client input/output interface unit, n response to the cache hit report sent to the server, a list of at least one attribute of at least one resource linked with a pre-fetched resource reported in the cache hit report.

46. The system of claim 45 wherein the client list storage area stores the list received by the client input/output interface unit.

47. The system of claim 38 wherein the list comprises attributes of resources linked with the particular resource specified in the request, and information for addressing the resources specified in the list.

48. The system of claim 37 wherein the attribute transition probability model comprises a first group of at least one attribute, a second group of at least one attribute, and associated probabilities that a second resource having an attribute of the second group will be referenced after a first resource having an attribute of the first group has been referenced.

49. The system of claim 48 wherein the client, in referencing the first or second resource undertakes an action, with respect to the first or second resource, selected from a group consisting of requesting, retrieving, returning, and rendering the first or second resource, respectively.

50. The system of claim 48 wherein the attribute transition probability model comprises a first group of at least one attribute, a second group of at least one attribute, and associated probabilities that a second resource having an attribute of the second group will be referenced after a first resource having an attribute of the first group has been referenced.

51. The system of claim 50 wherein the client, in referencing the first or second resource undertakes an action, with respect to the first or second resource, selected from a group consisting of requesting, retrieving, returning, and rendering the first or second resource, respectively.

52. The system of claim 37 wherein the client further comprises a resource renderer, the resource renderer being able to communicate with the client input/output interface unit, wherein the resource retriever sends from the resource storage area of the server to the client input/output interface unit, in response to a resource request from the resource requester, the particular resource, and wherein the particular resource is provided to the resource renderer.

53. The system of claim 52 wherein the client further comprises an attribute transition probability model maintenance unit, wherein the attribute transition probability model is updated based on the particular resource.

* * * * *

UNITED STATES PATENT AND TRADEMARK OFFICE
CERTIFICATE OF CORRECTION

PATENT NO. : 6,154,767
DATED : November 28, 2000
INVENTOR(S) : Steven J. Altschuler, Greg Ridgeway It is certified that error appears in the above-identified patent and that said Letters Patent is hereby corrected as shown below:

Column 21,
Line 7, change "inter face" to -- interface --;

Column 40,
Line 39, change "2684" to -- 2634 --;

Column 46,
Line 15, delete "(amended)";
Line 39, change "a" to -- a --;
Line 41, change "n" to -- in --; and
Line 43, change "a" to -- a --.

Signed and Sealed this

Nineteenth Day of March, 2002

Attest:

Attesting Officer

JAMES E. ROGAN
Director of the United States Patent and Trademark Office